United States Patent
Yamamoto et al.

(10) Patent No.: US 10,142,653 B2
(45) Date of Patent: Nov. 27, 2018

(54) IMAGE DECODING APPARATUS, IMAGE CODING APPARATUS, AND CODED DATA TRANSFORMATION APPARATUS

(71) Applicant: Huawei Technologies Co., Ltd., Shenzhen (CN)

(72) Inventors: Tomoyuki Yamamoto, Osaka (JP); Tomohiro Ikai, Osaka (JP); Takeshi Tsukuba, Osaka (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 264 days.

(21) Appl. No.: 15/174,648

(22) Filed: Jun. 6, 2016

(65) Prior Publication Data

US 2016/0286235 A1    Sep. 29, 2016

Related U.S. Application Data

(63) Continuation of application No. PCT/JP2014/081033, filed on Nov. 25, 2014.

(30) Foreign Application Priority Data

Dec. 6, 2013    (JP) ................................ 2013-253259

(51) Int. Cl.
*H04N 7/12* (2006.01)
*H04N 11/02* (2006.01)
(Continued)

(52) U.S. Cl.
CPC ........... *H04N 19/59* (2014.11); *H04N 19/105* (2014.11); *H04N 19/167* (2014.11); *H04N 19/17* (2014.11);
(Continued)

(58) Field of Classification Search
None
See application file for complete search history.

(56) References Cited

U.S. PATENT DOCUMENTS 7,742,524 B2    6/2010  Jeon et al.
2006/0233249 A1  10/2006  Park et al.
(Continued)

FOREIGN PATENT DOCUMENTS

CN    101395921 A    3/2009
EP      3057327 A1    8/2016
(Continued)

OTHER PUBLICATIONS

Kwon, D., et al. "Reference-layer cropping offsets signaling in SHVC" JCTVC-M0219, Apr. 18-26, 2013, 6 pages.
(Continued)

*Primary Examiner* — Talha M Nawaz
(74) *Attorney, Agent, or Firm* — Conley Rose, P.C.

(57) ABSTRACT

A hierarchical image decoding apparatus, a hierarchical image coding apparatus, and a hierarchical coded data transformation apparatus where the hierarchical image decoding apparatus includes a parameter set decoder that decodes scale adjustment information, and a predictive image generator that generates a predictive image on the basis of the scale adjustment information, and the hierarchical image coding apparatus includes a parameter set encoder that encodes scale adjustment information, and the hierarchical coded data transformation apparatus includes a parameter set adjustor that transforms input hierarchically coded data based on inputted information of interest region, and adjusts scale adjustment information such that inter-layer scales derived from the hierarchically coded data before and after transformation coincide with each other.

17 Claims, 25 Drawing Sheets

(51) Int. Cl.
*H04N 11/04* (2006.01)
*H04N 19/59* (2014.01)
*H04N 19/70* (2014.01)
*H04N 19/17* (2014.01)
*H04N 19/187* (2014.01)
*H04N 19/167* (2014.01)
*H04N 19/33* (2014.01)
*H04N 19/105* (2014.01)
*H04N 19/182* (2014.01)
*H04N 19/51* (2014.01)

(52) U.S. Cl.
CPC ......... *H04N 19/182* (2014.11); *H04N 19/187* (2014.11); *H04N 19/33* (2014.11); *H04N 19/51* (2014.11); *H04N 19/70* (2014.11)

(56) References Cited

U.S. PATENT DOCUMENTS

| | | | |
|---|---|---|---|
| 2008/0056373 A1* | 3/2008 | Newlin ................ | H04N 19/91 375/240.23 |
| 2008/0126082 A1* | 5/2008 | Ehara ................... | G10L 19/24 704/205 |
| 2009/0110073 A1 | 4/2009 | Wu et al. | |
| 2012/0275437 A1* | 11/2012 | Chin .................... | H04W 52/58 370/336 |
| 2015/0103896 A1 | 4/2015 | Kim et al. | |
| 2016/0255354 A1 | 9/2016 | Yamamoto et al. | |

FOREIGN PATENT DOCUMENTS

| | | |
|---|---|---|
| JP | 2008536438 A | 9/2008 |
| JP | 5346198 B2 | 11/2013 |
| WO | 2006109988 A1 | 10/2006 |
| WO | 2013147557 A1 | 10/2013 |
| WO | 2015053287 A1 | 4/2015 |

OTHER PUBLICATIONS

Francois, E., et al. "Spatial scalable coding using cropped areas", JVT-0040, Oct. 18-22, 2004, 15 pages.
Foreign Communication From A Counterpart Application, Japanese Application No. 2015-551470, Japanese Office Action dated Jun. 20, 2017, 4 pages.
Foreign Communication From A Counterpart Application, Japanese Application No. 2015-551470, English Translation of Japanese Office Action dated Jun. 20, 2017, 5 pages.
Yamamoto, T., et al., "MV-HEVC/SHVC HLS: On Conversion to ROI-oriented multi-layer bitstream," JCTVC-O0056, JCT3V-F0033, Oct. 23-Nov. 1, 2013, 5 pages.
Chen, J., et al., "High Efficiency Video Coding (HEVC) Scalable Extension Draft 4," JCTVC-O1008_v1, Oct. 23-Nov. 1, 2013, 76 pages.
Tech, G., et al., "MV-HEVC Draft Text 5," JCT3V-E1004-v6, Jul. 27-Aug. 2, 2013, 65 pages.
Chen, J., et al., "SHVC Draft 3," JCTVC-N1008_v1, Jul. 25-Aug. 2, 2013, 71 pages.
"Series H: Audiovisual and Multimedia Systems, Infrastructure of Audiovisual services—Coding of moving video, High Efficiency Video Coding," ITU-T, H.265, Apr. 2013, 317 pages.
"Series H: Audiovisual and Multimedia Systems, Infrastructure of Audiovisual services—Coding of moving video, Advanced video coding for generic audiovisual services," ITU-T, H.264, Apr. 2013, 732 pages.
Sakazume, S., et al., "Extended Spatial Scalability with a Partial geometric transform," JVT-O025, Apr. 16-22, 2005, 20 pages.
Francois, E., et al., "Extended spatial scalability," ISO/IEC JTC1/SC29/WG11, MPEG2005/M11669, Jan. 2005, 17 pages.
Ugur, K., et al., "AHG9: On signaling of scaled reference layer offsets," JCTVC-O0098, Oct. 23-Nov. 1, 2013, 3 pages.
Foreign Communication From a Counterpart Application, European Application No. 14868412.9, Extended European Search Report dated Sep. 30, 2016, 12 pages.
Foreign Communication From a Counterpart Application, PCT Application No. PCT/JP2014/081033, English Translation of International Search Report dated Feb. 3, 2015, 2 pages.
Foreign Communication From a Counterpart Application, PCT Application No. PCT/JP2014/081033, English Translation of Written Opinion dated Feb. 3, 2015, 4 pages.
Foreign Communication From a Counterpart Application, Korean Application No. 10-2016-7016343, Korean Notice of Allowance and Brief Translation dated Aug. 16, 2017, 3 pages.
Machine Translation and Abstract of Chinese Publication No. CN101395921, Mar. 25, 2009, 32 pages.
Foreign Communication From a Counterpart Application, Chinese Application No. 201480061744.2, Chinese Search Report dated Jun. 12, 2018, 3 pages.
Foreign Communication From a Counterpart Application, Chinese Application No. 201480061744.2, Chinese Office Action dated Jun. 25, 2018, 4 pages.

\* cited by examiner

Picture and tile-slice relationship

Coded data and tile-slice relationship

| sps_extension() { | Descriptor |
|---|---|
| ... | |
| num_scaled_ref_layer_offsets | ue(v) |
| for( i = 0; i < num_scaled_ref_layer_offsets; i++) { | |
|   scaled_ref_layer_left_offset[ i ] | se(v) |
|   scaled_ref_layer_top_offset[ i ] | se(v) |
|   scaled_ref_layer_right_offset[ i ] | se(v) |
|   scaled_ref_layer_bottom_offset[ i ] | se(v) |
| } | |
| ... | |
| } | |

FIG. 9

| sps_extension() { | Descriptor |
|---|---|
| ... | |
| num_scale_adjust_info | ue(v) |
| for (i=0; i<num_scale_adjust_info; i++) { | |
| scale_adjust_ref_layer_id[i] | u(6) |
| srl_add_left_offset[i] | ue(v) |
| srl_add_top_offset[i] | ue(v) |
| srl_add_right_offset[i] | ue(v) |
| srl_add_bottom_offset[i] | ue(v) |
| rl_virtual_width[i] | ue(v) |
| rl_virtual_height[i] | ue(v) |
| } | |
| ... | |
| } | |

FIG. 11

| pic_parameter_set_rbsp( ) { | Descriptor |
|---|---|
| ... | |
| tiles_enabled_flag | u(1) |
| if( tiles_enabled_flag ) { | |
|   num_tile_columns_minus1 | ue(v) |
|   num_tile_rows_minus1 | ue(v) |
|   uniform_spacing_flag | u(1) |
|   if( !uniform_spacing_flag ) { | |
|     for( i = 0; i < num_tile_columns_minus1; i++ ) | |
|       column_width_minus1[ i ] | ue(v) |
|     for( i = 0; i < num_tile_rows_minus1; i++ ) | |
|       row_height_minus1[ i ] | ue(v) |
|   } | |
|   loop_filter_across_tiles_enabled_flag | u(1) |
| } | |
| ... | |
| } | |

FIG. 13

|        | TileCol0 | TileCol1 | TileCol2 | TileCol3 |
|--------|----------|----------|----------|----------|
| TileRow0 | T00 | T01 | T02 | T03 |
| TileRow1 | T10 | T11 | T12 | T13 |
| TileRow2 | T20 | T21 | T22 | T23 |

RowHeight[0] spans TileRow0. ColWidth[0] spans TileCol0.

FIG. 14

| sps_extension( ) { | Descriptor |
|---|---|
| ... | |
| num_scale_adjust_info | ue(v) |
| for (i=0; i<num_scale_adjust_info; i++) { | |
| scale_adjust_ref_layer_id[i] | u(6) |
| alt_scale_x[i] | u(16) |
| alt_scale_y[i] | u(16) |
| } | |
| ... | |
| } | |

FIG. 16

| sps_extension( ) { | Descriptor |
|---|---|
| ... | |
| num_scale_adjust_info | ue(v) |
| for (i=0; i<num_scale_adjust_info; i++) { | |
| scale_adjust_ref_layer_id[i] | u(6) |
| alt_scale_x_diff[i] | se(v) |
| alt_scale_y_diff[i] | se(v) |
| } | |
| ... | |
| } | |

FIG. 17

| sps_extension( ) { | Descriptor |
|---|---|
| ... | |
| num_scale_adjust_info | ue(v) |
| for (i=0; i<num_scale_adjust_info; i++) { | |
|     scale_adjust_ref_layer_id[i] | u(6) |
|     alt_scale_x_diff_present_flag[i] | u(1) |
|     if (alt_scale_x_diff_present_flag[i]) | |
|         alt_scale_x_diff_sign[i] | u(1) |
|     alt_scale_y_diff_present_flag[i] | u(1) |
|     if (alt_scale_y_diff_present_flag[i]) | |
|         alt_scale_y_diff_sign[i] | u(1) |
| } | |
| ... | |
| } | |

FIG. 18

IMAGE DECODING APPARATUS, IMAGE CODING APPARATUS, AND CODED DATA TRANSFORMATION APPARATUS

CROSS-REFERENCE TO RELATED APPLICATIONS

This application is a continuation of International Application No. PCT/JP2014/081033, filed on Nov. 25, 2014, which claims priority to Japanese Patent Application No. JP2013-253259, filed on Dec. 6, 2013, both of which are hereby incorporated by reference in their entireties.

TECHNICAL FIELD

The present disclosure relates to an image decoding apparatus that decodes hierarchically coded data where images are hierarchically coded, and to an image coding apparatus that generates hierarchically coded data by hierarchically coding images.

BACKGROUND

Information transmitted by a communication system or information recorded in a storage apparatus include images or video. Conventionally, techniques for coding images (including video, hereinafter) in order to transmit and store these images have been known.

Video coding schemes, such as Advanced Video Coding (AVC), (H.264/Moving Picture Experts Group (MPEG)-4 AVC) and its succeeding codec High-Efficiency Video Coding (HEVC) (Non-Patent Literature 1), have been known.

According to these video coding schemes, typically, a predictive image is generated on the basis of a local decoded image obtained by coding/decoding an input image, and a predictive residue (referred to as a "difference image" or a "residual image"), which is obtained by subtracting the predictive image from the input image (original image), is coded. Methods of generating a predictive image include inter-screen prediction (inter prediction), and intra-screen prediction (intra prediction).

In the intra prediction, based on locally decoded images in the same picture, predictive images in this picture are sequentially generated.

In the inter prediction, predictive images are generated through inter-picture motion compensation. The decoded picture used to generate the predictive image in the inter prediction is called a reference picture.

Furthermore, a technique has been known that classifies videos related to each other into layers (hierarchical layers) and codes the videos to generate coded data from the videos. This technique is called a hierarchical coding technique. The coded data generated by the hierarchical coding technique is also called hierarchically coded data.

As a representative hierarchical coding technique, HEVC-based scalable HEVC (SHVC) has been known (Non-Patent Literature 2).

SHVC supports spatial scalability, temporal scalability, and signal-to-noise ratio (SNR) scalability. For example, in the case of the spatial scalability, videos with different resolutions are classified into layers and coded to generate hierarchically coded data. For example, an image down sampled from an original image to have a desired resolution is coded as a lower layer. Next, inter-layer prediction is applied to the original image in order to remove inter-layer redundancy, and the image is coded as a higher layer.

As another representative hierarchical coding technique, HEVC-based multi view HEVC (MV-HEVC) has been known (Non-Patent Literature 3).

MV-HEVC supports view scalability. In the case of view scalability, videos corresponding to different viewpoints are classified into layers and coded to generate hierarchically coded data. For example, a video corresponding to a viewpoint serving as a basis (base view) is coded as a lower layer. Next, inter-layer prediction is applied to the videos corresponding to the different viewpoints, and the videos are coded as a higher layer.

Inter-layer predictions in SHVC and MV-HEVC include inter-layer image prediction and inter-layer motion prediction. In the inter-layer image prediction, a decoded image on a lower layer is used to generate a predictive image. In the inter-layer motion prediction, motion information on a lower layer is used to derive a predictive value of motion information. A picture used for prediction in the inter-layer prediction is called an inter-layer prediction picture. A layer including the inter-layer prediction picture is called a reference layer. In the following description, a reference picture used for the inter prediction, and a reference picture used for the inter-layer prediction are collectively and simply called reference pictures.

In SHVC and MV-HEVC, any of the inter prediction, intra prediction, and inter-layer image prediction can be used to generate a predictive image.

One of applications using SHVC or MV-HEVC is a video application that considers a region of interest. For example, a video reproduction terminal typically reproduces a video of the entire area at a relatively low resolution. When a viewer of the video reproduction terminal designates a part of a displayed video as a region of interest, this region of interest is displayed on the reproduction terminal at a high resolution.

The video application in consideration of the region of interest can be achieved using hierarchically coded data, in which the video of the entire area with a relatively low resolution is coded as lower layer coded data while the high resolution video of the region of interest is coded as higher layer coded data. That is, when the entire area is reproduced, only the lower layer coded data is decoded and reproduced. When the high resolution video of the region of interest is reproduced, the higher layer coded data is added to the lower layer coded data and transmitted. In such a case, the application can thus be achieved with a smaller transmission band than in the case where both the coded data on the low resolution video and the coded data on the high resolution video are transmitted. Coded data corresponding to an area including the region of interest may be extracted from the higher layer and the lower layer and transmitted, which allows the transmission band to be further reduced.

When the video application in consideration of the region of interest as described above generates coded data which is on the higher layer and the lower layer and covers the region of interest, the positional relationship between the higher layer pixels and the lower layer pixels is changed. Consequently, this change causes a problem of reducing the prediction correctness in the case of predicting the higher layer pixel values based on the lower layer pixel values.

Non-Patent Literature 4 discloses a method that transmits inter-layer phase correspondence information for the sake of adjusting the positional relationship between the higher layer pixels and the lower layer pixels, and calculates the pixel positions on the lower layer corresponding to the respective pixels on the higher layer using the inter-layer phase correspondence information.

CITATION LIST

Non-Patent Literature

Non-patent literature 1: "Recommendation H.265 (04/13)", International Telecommunication Union-Telecommunication Standardization Sector ITU-T (disclosed on Jun. 7, 2013)

Non-patent literature 2: Joint Collaborative Team on three dimensional (3D) Video Coding (JCT3V)-E1008_v6 "MV-HEVC Draft Text 5", Joint Collaborative Team on 3D Video Coding Extension Development of ITU-T SG 16 WP 3 and ISO/IEC JTC 1/SC 29/WG 11 5th Meeting: Vienna, AT, 27 Jul.-2 Aug. 2013 (published on Aug. 7, 2013)

Non-patent literature 3: JCTVC-N1008_v1 "SHVC Draft 3", Joint Collaborative Team on Video Coding (JCT-VC) of ITU-T SG 16 WP 3 and international Organization for Standardization (ISO)/International Electrotechnical Commission (IEC) JTC 1/SC 29/WG 11 14th Meeting: Vienna, AT, 25 Jul.-2 Aug. 2013 (published on Aug. 20, 2013)

Non-Patent Literature 4: JCTVC-O0056 "MV-HEVC/SHVC HLS: On conversion to ROI-capable multi-layer bitstream", Joint Collaborative Team on Video Coding (JCT-VC) of ITU-T SG 16 WP 3 and ISO/IEC JTC 1/SC 29/WG 11 15th Meeting: Geneva, CH, 23 Oct.-1 Nov. 2013 (published on Oct. 11, 2013)

SUMMARY

Technical Problem

However, according to the video application that considers the region of interest, generation of hierarchically coded data (region of interest hierarchically coded data) including coded data on the higher layer and the lower layer equivalent to the region of interest from hierarchically coded data including coded data on the higher layer and the lower layer equivalent to the entire area (entire-area hierarchically coded data) causes a problem in that the scale of the entire-area hierarchically coded data and the scale of the region of interest hierarchically coded data cannot be strictly maintained. Consequently, a problem further arises in that the correctness of the positional relationship between the higher layer pixels and the lower layer pixels may be insufficient in the region of interest hierarchically coded data.

The present disclosure is made in view of the above problems and has an object to achieve an image coding apparatus and an image decoding apparatus that can code and decode the region of interest coded data capable of deriving the positional relationship between the higher layer pixels and the lower layer pixels using the same scale as that of the entire-area hierarchically coded data.

In addition, the present disclosure has another object to achieve a coded data transformation apparatus that can generate the region of interest coded data capable of deriving the positional relationship between the higher layer pixels and the lower layer pixels using the same scale as that of the entire-area hierarchically coded data on the basis of the entire-area hierarchically coded data as an input.

Solution to Problem

To solve the problems, an image decoding apparatus according to the present disclosure is an image decoding apparatus that decodes coded data on a higher layer included in hierarchically coded data, and restores the decoded picture on the higher layer which is a target layer, including a parameter set decoding unit that decodes a parameter set, and a predictive image generating unit that generates a predictive image through inter-layer prediction according to a decoded pixel of a picture on a reference layer, wherein the parameter set decoding unit decodes scale adjustment information pertaining to the reference layer, and the predictive image generating unit derives a reference position on the reference layer corresponding to the pixel of the target layer, using the inter-layer scale derived based on the scale adjustment information.

In the image decoding apparatus, it is preferred that a virtual reference layer size difference be derived based on the scale adjustment information.

In the image decoding apparatus, it is preferred that a value of the inter-layer scale derived by the predictive image generating unit be an approximate value of a ratio between a virtual reference layer correspondence region size and a virtual reference layer size, and the virtual reference layer size be a sum of a reference layer picture size and the virtual reference layer size difference.

In the image decoding apparatus, it is preferred that when the scale adjustment information be not included in the parameter set, a value of the scale adjustment information be set such that the virtual reference layer size and the reference layer picture size are coincided with each other.

To solve the problems, an image coding apparatus according to the present disclosure is an image coding apparatus generating coded data on a higher layer from an input image, including a parameter set decoding unit that decodes a parameter set, and a predictive image encoding unit that generates a predictive image through inter-layer prediction according to a decoded pixel of a picture on a reference layer, wherein the parameter set decoding unit encodes scale adjustment information, the predictive image encoding unit derives a reference position corresponding to a decoded pixel of the target layer using an inter-layer scale value derived from the scale adjustment information, and a virtual reference layer size difference is derived based on the scale adjustment information.

To solve the problems, a hierarchical coded data transformation apparatus according to the present disclosure is a hierarchical coded data transformation apparatus that includes a parameter set adjusting unit that transforms input hierarchically coded data based on inputted information of interest region, and generates and outputs hierarchically coded data for the interest region, wherein the parameter set adjusting unit adjusts scale adjustment information such that inter-layer scales derived from the hierarchically coded data before and after transformation coincide with each other.

Advantageous Effects of Disclosure

The image decoding apparatus (image coding apparatus) according to the present disclosure includes the parameter set decoding unit (encoding unit) that decodes (encodes) the parameter set, and the predictive image generating unit that generates the predictive image through the inter-layer prediction according to the decoded pixel of the reference layer picture. The parameter set decoding unit (encoding unit) decodes (encodes) the scale adjustment information. The predictive image generating unit derives the reference position corresponding to the pixel on the target layer, using the value of the inter-layer scale derived from the scale adjustment information.

Consequently, the image decoding apparatus (image coding apparatus) can derive the same inter-layer scale before and after transformation even in the case of transforming the hierarchically coded data to be typified by the region of interest extraction. Thus, the correctness of the positional relationship between the higher layer pixel and the lower layer pixel is maintained in the transformed coded data, thereby reducing the predictive residue in the inter-layer prediction. Consequently, the image decoding apparatus according to the present disclosure can decode coded data with a smaller amount of code, and output the decoded picture on the higher layer. The image coding apparatus according to the present disclosure can output the coded data with a smaller amount of code.

BRIEF DESCRIPTION OF DRAWINGS

FIG. 2A shows a hierarchical video coding apparatus side, and FIG. 2B shows a hierarchical video decoding apparatus side;

FIG. 3A shows a sequence layer defining a sequence SEQ, FIG. 3B shows a picture layer defining a picture PICT, FIG. 3C shows a slice layer defining a slice S, FIG. 3D shows a coded tree unit CTU layer defining a CTU, and FIG. 3E shows a coding unit (CU) layer defining a CU included in the coded tree unit CTU;

FIG. 9 shows a part that is of the syntax table referred to during Sequence Parameter Set (SPS) decoding and pertains to the inter-layer pixel correspondence information;

FIG. 10A shows an example of the case where the entire picture on the reference layer corresponds to a part of the picture on the target layer, and FIG. 10B shows an example of the case where a part of the picture on the reference layer corresponds to the entire picture on the target layer;

FIG. 11 shows a part that is of the syntax table referred to during SPS decoding and pertains to scale adjustment information;

FIG. 13 shows a part that is of the syntax table referred to during Picture Parameter Set (PPS) decoding and pertains to tile information;

FIG. 14 is a diagram exemplifying tile rows and tile columns in the case where the picture is split into tiles;

FIG. 16 shows another example of a part that is of the syntax table referred to during SPS decoding and pertains to scale adjustment information;

FIG. 17 shows another example of a part that is of the syntax table referred to during SPS decoding and pertains to scale adjustment information;

FIG. 18 shows another example of a part that is of the syntax table referred to during SPS decoding and pertains to scale adjustment information;

FIG. 24A shows the transmitting apparatus mounted with the hierarchical video coding apparatus, and FIG. 24B shows the receiving apparatus mounted with the hierarchical video decoding apparatus; FIG. 25A shows the recording apparatus mounted with the hierarchical video coding apparatus, and FIG. 25B shows the reproducing apparatus mounted with the hierarchical video decoding apparatus.

DESCRIPTION OF EMBODIMENTS

Figure 1:
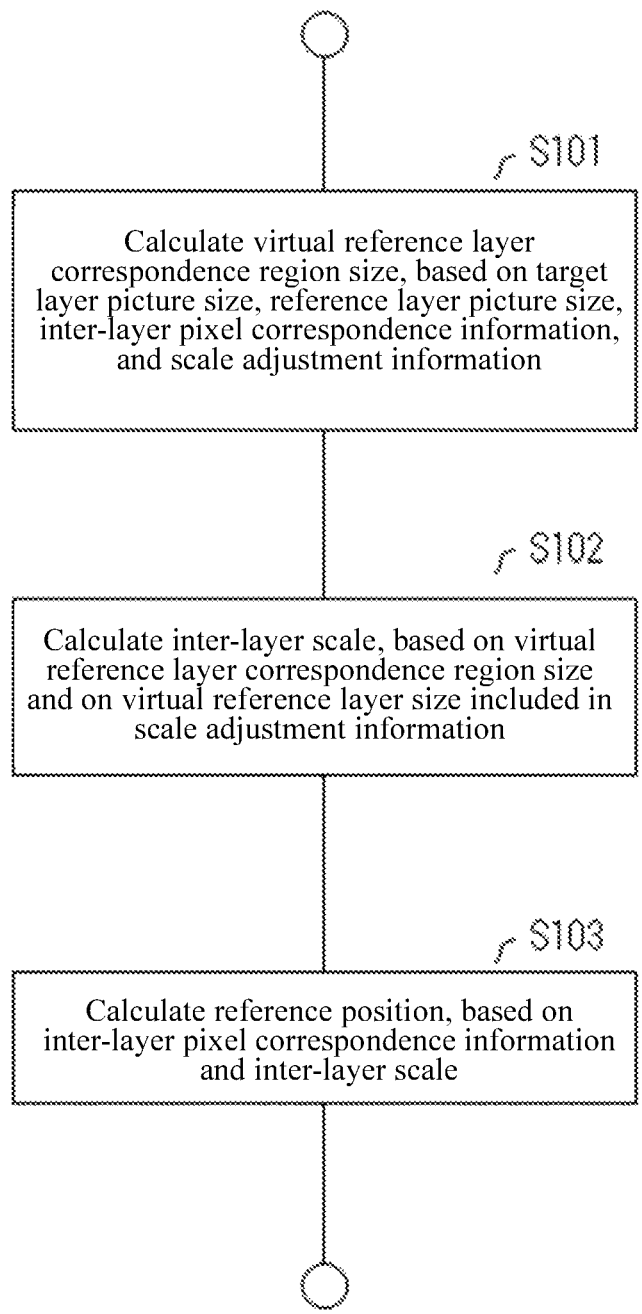
FIG. 1 is a flowchart of a corresponding reference position deriving process executed by a hierarchical video decoding apparatus and a hierarchical video coding apparatus according to this embodiment.

Referring to FIGS. 1 to 25, a hierarchical video decoding apparatus 1, a hierarchical video coding apparatus 2, and a coded data transformation apparatus 3 according to an embodiment of the present disclosure are described as follows.

The hierarchical video decoding apparatus (image decoding apparatus) 1 according to this embodiment decodes coded data hierarchically coded by the hierarchical video coding apparatus (image coding apparatus) 2. The hierarchical coding is a coding scheme that codes video hierarchically from a low-quality component to a high-quality component. The hierarchical coding is standardized in, for example, scalable video coding (SVC) and SHVC. Here, the quality of video broadly means elements that have effects on the appearance of video in subjective and objective viewpoints. The quality of video includes, for example, "resolution", "frame rate", "image quality", and "pixel representation accuracy". Consequently, difference in video quality hereinafter indicates difference in "resolution" etc. in an exemplary manner. However, the difference is not limited thereto. For example, also in the case of that video is quantized in different quantization steps (i.e., the case that video is coded with different coding noise), the video quality can be regarded to be different from each other.

The hierarchical coding technique may be classified into (1) spatial scalability (2) temporal scalability (3) SNR scalability, and (4) view scalability, in view of types of hierarchized information. The spatial scalability is a technique of hierarchization according to the resolution and the size of an image. The temporal scalability is a technique of hierarchization according to a frame rate (the number of frames per unit time). The SNR scalability is a technique of hierarchization according to coding noise. The view scalability is a technique of hierarchization according to viewpoint positions associated with respective images.

The coded data transformation apparatus 3 according to this embodiment transforms coded data which has been coded by the hierarchical video coding apparatus 2, and generates the coded data pertaining to a predetermined region of interest (region of interest coded data). The region of interest coded data can be decoded by the hierarchical video decoding apparatus 1 according to this embodiment.

Prior to detailed description on the hierarchical video coding apparatus 2, the hierarchical video decoding apparatus 1, and the hierarchical coded data transformation apparatus 3 according to this embodiment, (1) the layer structure of hierarchically coded data generated by the hierarchical video coding apparatus 2 or the hierarchical coded data transformation apparatus 3 and decoded by the hierarchical video decoding apparatus 1 is described, and subsequently (2) a specific example of data structures that can be adopted in respective layers is described.

Figure 2A:
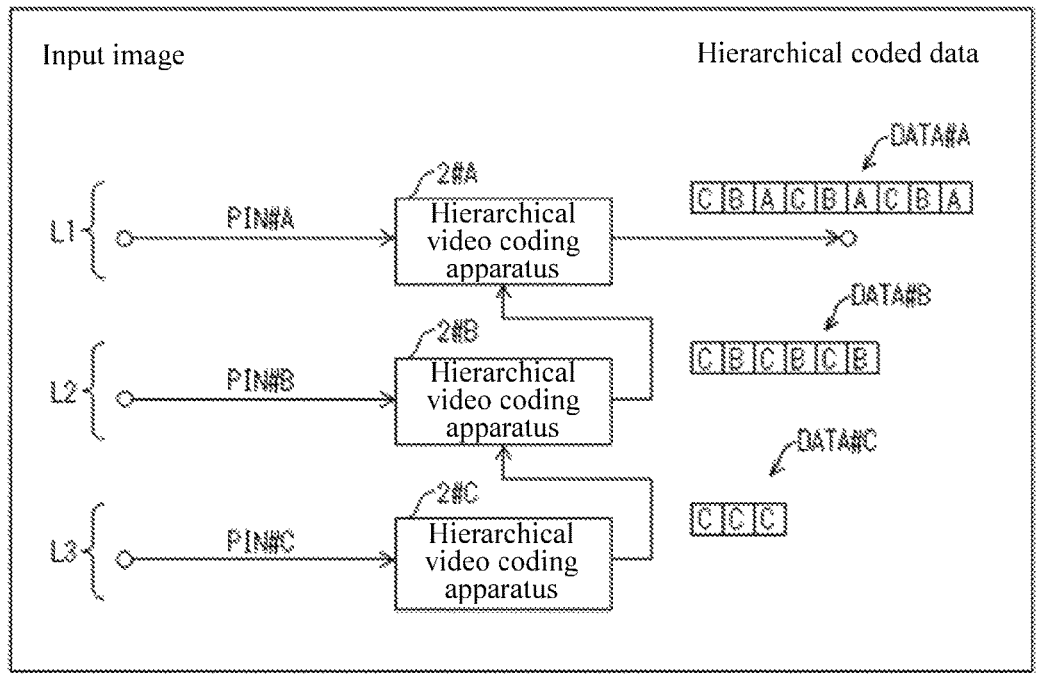
FIG. 2A and FIG. 2B diagrams are for illustrating a layer structure of hierarchically coded data according to the embodiment of the present disclosure, where
Figure 2B:
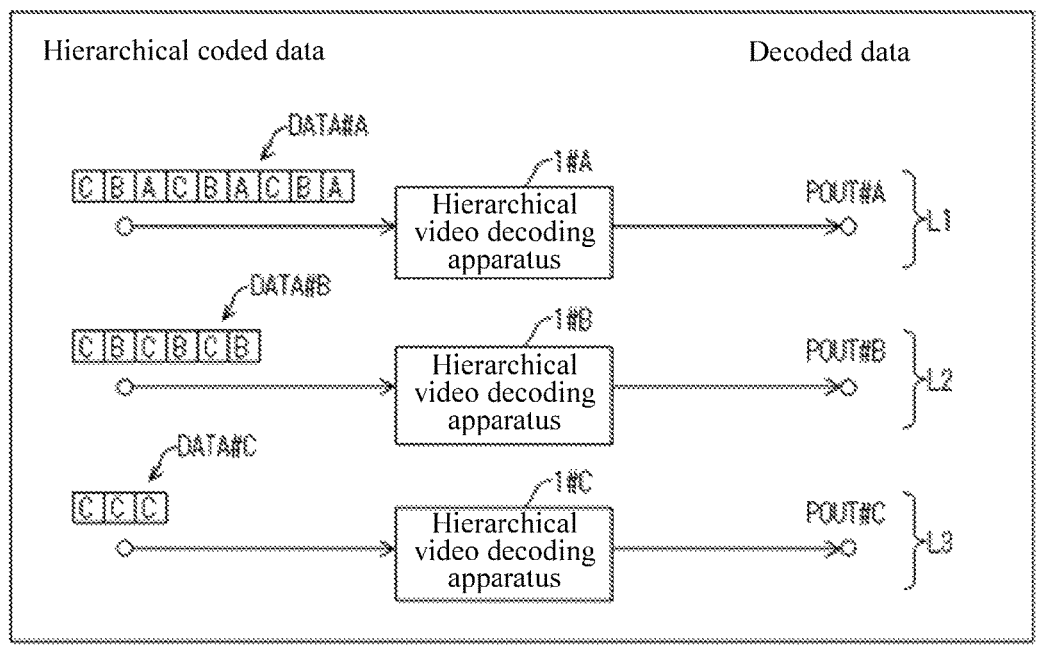

Here, referring to FIG. 2A and FIG. 2B, coding and decoding of hierarchically coded data are described as follows. FIG. 2A and FIG. 2B diagrams schematically showing the case of hierarchically coding/decoding video in three hierarchical layers of a lower hierarchical layer L3, a medium hierarchical layer L2, and a higher hierarchical layer L1. That is, in an example shown in FIGS. 2A and 2B, among the three hierarchical layers, the higher hierarchical layer L1 is the highest layer, and the lower hierarchical layer L3 is the lowest layer.

A decoded image corresponding to a specific quality that can be decoded from the hierarchically coded data is hereinafter called a decoded image on a specific hierarchical layer (or a decoded image corresponding to a specific hierarchical layer) (e.g., a decoded image POUT#A on the higher hierarchical layer L1).

FIG. 2A shows hierarchical video coding apparatus 2#A to 2#C that generate coded data DATA#A to DATA#C by hierarchically coding respective input images PIN#A to PIN#C. FIG. 2B shows hierarchical video decoding apparatus 1#A to 1#C that generate decoded images POUT#A to POUT#C by decoding respective coded data DATA#A to DATA#C having been hierarchically coded.

First, referring to FIG. 2A, the coding apparatus side is described. The input images PIN#A, PIN#B and PIN#C, which are to be inputs on the coding apparatus side, have been originated from the same image, but are different in quality of images (resolution, frame rate, image quality, etc.). The quality of images becomes lower in order of the input images PIN#A, PIN#B and PIN#C.

The hierarchical video coding apparatus 2#C on the lower hierarchical layer L3 codes the input image PIN#C on the lower hierarchical layer L3 to generate the coded data DATA#C on the lower hierarchical layer L3. Basic information required for decoding to obtain the decoded image POUT#C on the lower hierarchical layer L3 is included (indicated as "C" in FIG. 2A and FIG. 2B). The lower hierarchical layer L3 is the lowest hierarchical layer. Consequently, the coded data DATA#C on the lower hierarchical layer L3 is also called basic coded data.

The hierarchical video coding apparatus 2#B on the medium hierarchical layer L2 codes the input image PIN#B on the medium hierarchical layer L2 to generate the coded data DATA#B on the medium hierarchical layer L2 with reference to the coded data DATA#C on the lower hierarchical layer. The coded data DATA#B on the medium hierarchical layer L2 includes not only the basic information "C" included in the coded data DATA#C but also additional information (indicated as "B" in FIG. 2A and FIG. 2B) required for decoding to obtain the decoded image POUT#B on the medium hierarchical layer.

The hierarchical video coding apparatus 2#A on the higher hierarchical layer L1 codes the input image PIN#A on the higher hierarchical layer L1 to generate the coded data DATA#A on the higher hierarchical layer L1 with reference to the coded data DATA#B on the medium layer L2. The coded data DATA#A on the higher hierarchical layer L1 includes not only the basic information "C" required for decoding to obtain the decoded image POUT#C on the lower hierarchical layer L3 and the additional information "B" required for decoding to obtain the decoded image POUT#B on the medium hierarchical layer L2, but also additional information (indicated as "A" in FIG. 2A and FIG. 2B) required for decoding to obtain the decoded image POUT#A on the higher hierarchical layer.

As described above, the coded data DATA#A on the higher hierarchical layer L1 includes information pertaining to the decoded images with variable qualities.

Now, referring to FIG. 2B, the decoding apparatus side is described. On the decoding apparatus side, the decoding apparatus 1#A, 1#B and 1#C, which correspond to the higher hierarchical layer L1, the medium hierarchical layer L2 and the lower hierarchical layer L3, respectively, decode the coded data DATA#A, DATA#B and DATA#C to output the decoded images POUT#A, POUT#B and POUT#C.

Video with a specific quality can be reproduced by extracting a part of information on the higher hierarchically coded data and by decoding the extracted information in a specific decoding apparatus on a lower level.

For example, the hierarchical decoding apparatus 1#B on the medium hierarchical layer L2 may extract the information required for decoding to obtain the decoded image POUT#B (i.e., "B" and "C" included in the hierarchically coded data DATA#A) from the hierarchically coded data DATA#A on the higher hierarchical layer L1, and perform decoding to obtain the decoded image POUT#B. In other words, on the decoding apparatus side, the decoded images POUT#A, POUT#B and POUT#C can be obtained through decoding, on the basis of the information included in the hierarchically coded data DATA#A on the higher hierarchical layer L1.

The hierarchically coded data is not limited to the three-hierarchical-layered data described above. Alternatively, the hierarchically coded data may be hierarchically coded in two hierarchical layers, or hierarchically coded in layers that are more than three hierarchical layers.

A part or the entire coded data pertaining to the decoded image on a specific hierarchical layer may be coded independently of the other hierarchical layers to configure the hierarchically coded data so as to negate the need to refer to information on the other hierarchical layers during decoding on the specific hierarchical layer. For example, the description has been made such that in the example described above with reference to FIGS. 2A and 2B, "C" and "B" are referred to for decoding to obtain the decoded image POUT#B. However, the reference is not limited thereto. The hierarchically coded data can be configured in order to allow the decoded image POUT#B to be obtained through decoding only use of "B". For example, a hierarchical video decoding apparatus can be configured that receives, as input, hierarchically coded data consisting only of "B" and the decoded image POUT#C, for decoding to obtain the decoded image POUT#B.

In the case of achieving the SNR scalability, the hierarchically coded data may be generated so that even when the same original image is used as input images PIN#A, PIN#B and PIN#C, and the decoded images POUT#A, POUT#B and POUT#C have different image qualities. In this case, the hierarchical video coding apparatus on the lower hierarchical layer generates the hierarchically coded data by quantizing the predictive residue using a larger quantization width than the hierarchical video coding apparatus on the higher hierarchical layer does.

In this description, for the sake of illustration, terms are defined as follows. The following terms are used to represent technical issues described below if not otherwise specified.

Higher layer: a hierarchical layer disposed higher than a certain hierarchical layer is called a higher layer. For example, in FIG. 2A and FIG. 2B, the higher layers of the lower hierarchical layer L3 are the medium hierarchical layer L2 and the higher hierarchical layer L1. A decoded image on the higher layer means a decoded image with a higher quality (e.g., high resolution, high frame rate, high image quality, etc.).

Lower layer: a hierarchical layer disposed lower than a certain hierarchical layer is called a lower layer. For example, in FIG. 2A and FIG. 2B, the lower layers of the higher hierarchical layer L1 are the medium hierarchical layer L2 and the lower hierarchical layer L3. The decoded image on the lower layer means a decoded image with a lower quality.

Target layer: a hierarchical layer that is a target of decoding or coding. A decoded image corresponding to the target layer is called a target layer picture. Pixels constituting the target layer picture are referred to as target layer pixels.

Reference layer: a specific lower layer to be referred to for decoding to obtain the decoded image corresponding to the target layer is called a reference layer. The decoded image corresponding to the reference layer is called a reference layer picture. Pixels constituting the reference layer are referred to as reference layer pixels.

In the example shown in FIGS. 2A and 2B, the reference layers of the higher hierarchical layer L1 are the medium hierarchical layer L2 and the lower hierarchical layer L3. However, the configuration is not limited thereto. Alternatively, the hierarchically coded data may be configured so as to negate the need to refer to all the lower layers during decoding to obtain the specific layer. For example, the hierarchically coded data may be configured for the reference layer of the higher hierarchical layer L1 to be any of the medium hierarchical layer L2 and the lower hierarchical layer L3.

Basic layer: the hierarchical layer arranged on the lowest layer is called a basic layer. A decoded image on the basic layer is a decoded image into which the coded data is decoded and which has the lowest quality, and is called a basic decoded image. In other words, the basic decoded image is a decoded image corresponding to the lowest hierarchical layer. A partially coded data item of the hierarchically coded data required for decoding to obtain the basic decoded image is called basic coded data. For example, basic information "C" contained in hierarchically coded data DATA#A on the higher hierarchical layer L1 is the basic coded data.

Extended layer: a higher layer of the basic layer is called an extended layer.

Layer identifier: The layer identifier is for identifying a hierarchical layer, and corresponds to the hierarchical layer on a one-to-one basis. The hierarchically coded data contains a hierarchical identifier used to select partially coded data required for decoding to obtain a decoded image on a specific hierarchical layer. A subset of hierarchically coded data associated with a layer identifier corresponding to a specific layer is also called layer representation.

In general, for the sake of decoding to obtain a decoded image on a specific hierarchical layer, the layer representation on the hierarchical layer and/or the layer representation corresponding to the lower layer of the hierarchical layer concerned are used. That is, for the sake of decoding to obtain the decoded image on the target layer, the layer representation on the target layer and/or at least one layer representation included in a lower layer than the target layer are used.

Inter-layer prediction: the inter-layer prediction is prediction of the syntax element value on the target value, a coding parameter used to decode the target layer and the like, on the basis of the syntax element value included in the layer representation on the hierarchical layer (reference layer) different from the layer representation on the target layer, of a value derived from the syntax element value and of the decoded image. The inter-layer prediction that predicts information pertaining to the motion information from the information on the reference layer may be called motion information prediction. The inter-layer prediction from the decoded image on the lower layer may be called inter-layer image prediction (or inter-layer texture prediction). The hierarchical layer used for inter-layer prediction is exemplified as the lower layer of the target layer. Prediction in the target layer without using the reference layer may be called intra-layer prediction.

The terms described above are used for the sake of convenience for description. Consequently, the above technical matters may be represented in other terms.

The case of using HEVC and its extended scheme is exemplified as the coding scheme for generating coded data on the respective hierarchical layers. However, the example is not limited thereto. Alternatively, the coded data on the respective hierarchical layers may be generated according to a coding scheme, such as MPEG-2 or H.264/AVC.

The lower layer and the higher layer may be coded according to different coding schemes. The coded data on the respective hierarchical layers may be supplied to the hierarchical video decoding apparatus 1 through transmission paths different from each other, or to the hierarchical video decoding apparatus 1 through the same transmission path.

For example, in the case of scalable-coding ultrahigh-definition video (4 kilo (K) video data) through the basic layer and one extended layer and transmitting the coded video, the basic layer may code video data obtained by downscaling and interlacing 4K video data, according to MPEG-2 or H.264/AVC, transmit the coded data through a television broadcasting network, while the extended layer may code 4K video (progressive) through HEVC and transmit the coded video via the Internet.

FIG. 3A, FIG. 3B, FIG. 3C, FIG. 3D, and FIG. 3E diagrams exemplifying the data structure of coded data (hierarchically coded data DATA#C in the example of FIG. 2A and FIG. 2B) adopted for the basic layer. The hierarchically coded data DATA#C includes a sequence and multiple pictures configuring the sequence in an exemplary manner.

FIG. 3A, FIG. 3B, FIG. 3C, FIG. 3D, and FIG. 3E shows the hierarchical layer data structure of hierarchically coded data DATA#C. FIGS. 3A to 3E are diagrams showing a sequence layer defining a sequence SEQ, a picture layer defining a picture PICT, a slice layer defining a slice S, a coded tree unit (CTU) layer defining a CTU, and a coding unit (CU) layer defining a CU included in the CTU.

Figure 3A:
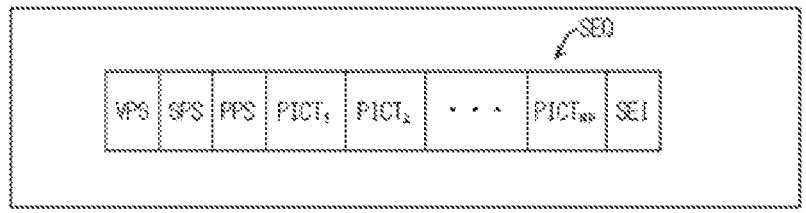
FIG. 3A, FIG. 3B, FIG. 3C, FIG. 3D, and FIG. 3E diagrams are for illustrating the configuration of hierarchically coded data according to the embodiment of the present disclosure, where

The sequence layer defines a set of data referred to by the hierarchical video decoding apparatus 1 to decode the processing target SEQ (a target sequence). As shown in FIG. 3A, a SEQ contains a video parameter set (VPS), a SPS, a PPS, pictures PICT1 to PICTNP (NP is the total number of pictures included in the SEQ), and supplemental enhancement information (SEI).

The VPS defines the number of layers included in the coded data, and the inter-layer dependency relationship.

The SPS defines a set of coding parameters referred to by the hierarchical video decoding apparatus 1 for decoding the target sequence. Multiple SPSs may be in the coded data. In this case, an SPS used for decoding is selected from among the SPSs for each target sequence. The SPS used to decode a specific sequence is also called an active SPS. Hereinafter, the SPS means the active SPS for the target sequence, if not otherwise specified.

The PPS defines a set of coding parameters referred to by the hierarchical video decoding apparatus 1 for decoding each picture in the target sequence. Note that multiple PPSs may be in the coded data. In this case, any of PPSs is selected from each picture in the target sequence. The PPS used for decoding to obtain a specific picture is also called an active PPS. Hereinafter, the PPS means the active PPS for the target picture, if not otherwise specified. The active SPS and the active PPS may be set to different SPS and PPS for each layer.

Figure 3B:
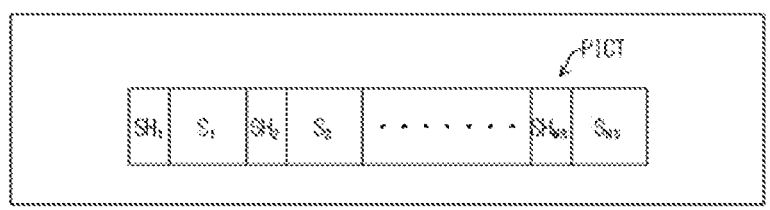

The picture layer defines a set of data referred to by the hierarchical video decoding apparatus 1 to decode the processing target PICT (target picture). As shown in FIG. 3B, the PICT includes slice headers SH1 to SHNS, and slices S1 to SNS (where NS is the total number of slices included in the PICT).

Hereinafter, in the case where the slice headers SH1 to SHNS and the slices S1 to SNS are not required to be discriminated from each other, the description may be made without the subscripts of symbols. This omission is also applicable to other data which are included in after-mentioned hierarchically coded data DATA#C and to which subscripts are added.

The slice header $SH_k$ includes a coding parameter group referred to by the hierarchical video decoding apparatus 1 to define the method of decoding the corresponding slice Sk. For example, this header includes an SPS identifier for designating SPS (seq_parameter_set_id), and a PPS identifier for designating PPS (pic_parameter_set_id). The slice type designation information (slice_type) that designates the slice type is an example of the coding parameter included in the SH.

Slice types that can be designated by the slice type designation information include (1) I slice that only uses intra prediction during coding, (2) P slice that uses mono-directional prediction or the intra prediction during coding, and (3) B slice that uses the mono-directional prediction, bi-directional prediction, or intra prediction during coding.

Figure 3C:
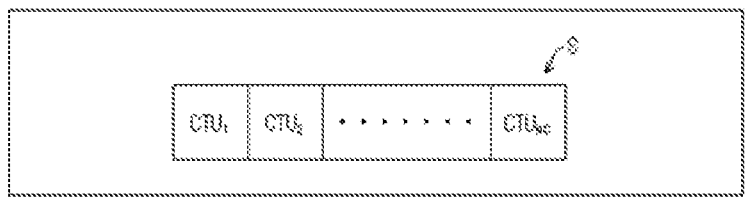

The slice layer defines a set of data referred to by the hierarchical video decoding apparatus 1 to decode the processing target slice S (target slice). As shown in FIG. 3C, the S includes CTUs CTU1 to CTUNC (NC is the total number of CTUs included in the S).

The CTU layer defines a set of data referred to by the hierarchical video decoding apparatus 1 to decode the coded tree unit CTU, which is the processing target, (target CTU). Alternatively, the CTU may be called a coded tree block (CTB) or a largest cording unit (LCU).

The CTU includes a CTU header (CTUH), and CU information 1 to NL (NL is the total number of pieces of coding unit information). First, the relationship between the CTU and the coding unit information is described.

The CTU is divided into units for determining the block size for each of intra prediction or inter prediction and transformation processes.

The unit of the CTU is split according to recursive quadtree splitting. The tree structure obtained by the recursive quadtree splitting is called a coding tree.

Hereinafter, a unit corresponding to a leaf, which is an end node of the coding tree, is referred to and regarded as a coding node. The coded node serves as a basic unit of the coding process. Consequently, the coded node is hereinafter also called CU.

That is, the pieces of coding unit information (CU information) 1 to NL are pieces of information corresponding to the respective coded nodes (CUs) obtained by applying recursive quadtree splitting to the CTU.

The root of the coded tree is associated with the CTU. In other words, the CTU is associated with the uppermost node of the tree structure which has been obtained through the quadtree splitting and recursively includes coded nodes.

The size of each coded node is longitudinally and laterally half the size of the coded node that is the parent node of each coded node (i.e., a node higher by one layer than each coded node).

The size of the CTU and the possible sizes of respective CUs depend on size designation information on the minimum coded node included in the SPS, and the difference in hierarchical depth between the maximum coded node and the minimum coded node. For example, in the case where the size of the minimum coded node is 8×8 pixels and the difference in hierarchical depth between the maximum coded node and the minimum coded node is three, the size of the CTU is 64×64 pixels and the size of the coded node may be any of four sizes, that is, 64×64 pixels, 32×32 pixels, 16×16 pixels, and 8×8 pixels.

Figure 3D:
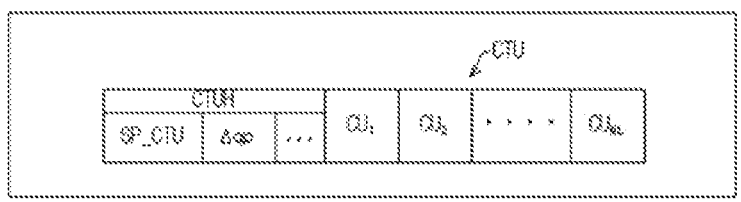

The CTUH includes a coding parameter referred to by the hierarchical video decoding apparatus 1 to define the method of decoding the target CTU. Furthermore, as shown in FIG. 3D, this header includes CTU splitting information (SP_CTU) for designating a splitting pattern for the target CTU into each CU, and quantization parameter difference qp_delta (Δqp) for designating the size of quantization step.

The SP_CTU is information that represents the coding tree for splitting CTU. Furthermore, this information designates the shape and size of each CU included in the target CTU and the position of this CU in the target CTU.

It is unnecessary that the SP_CTU explicitly include the shape and size of CU. For example, the SP_CTU may be a set of flags indicating whether or not to quadtree split the entire target CTU or a partial region of the CTU. In this case, combined use of the shape and size of CTU can determine the shape and size of each CU.

The CU layer defines a set of data referred to by the hierarchical video decoding apparatus 1 to decode the processing target CU.

Prior to specific description of the details of data contained in the CU information, the tree structure of data contained in CU is described. The coded node is a node which is along a root of a prediction tree (PT) and a transform tree (TT). The PT and the TT are described as follows.

The predictive tree has the coded node split into one or more predictive blocks, and defines the position and size of each predictive block. In other words, the predictive block is one or more region that do not overlap with each other and constitute the coded node. The PT includes one or more predictive blocks obtained through the aforementioned splitting.

The predicting process is performed for each predictive block. Hereinafter, the predictive block, which is the unit of prediction, is also called a prediction unit (PU).

The splitting types of the PT (PU splitting) are roughly classified into the case of intra prediction and the case of inter prediction.

In the case of intra prediction, the splitting methods are 2N×2N (the same size as that of the coded node) and N×N. In the case of inter prediction, the splitting methods are 2N×2N (the same size as that of the coded node), 2N×N, 2N×nU, 2N×nD, N×2N, nL×2N, nR×2N and the like, where n, U, D, L, and R are integers.

The transform tree has the coded node split into one or more transform blocks, and defines the position and size of each transform block. In other words, the transform block is one or more region that do not overlap with each other and constitute the coded node. The transform tree includes one or more transform blocks obtained through the aforementioned splitting.

Splitting in the transform tree is classified into splitting that assigns a region having the same size as the coded node as a transform block, and splitting according to recursive quadtree splitting as with the aforementioned tree block splitting.

The transform process is performed for each transform block. Hereinafter, the transform block, which is a unit of transform, is also called a transform unit (TU).

Figure 3E:
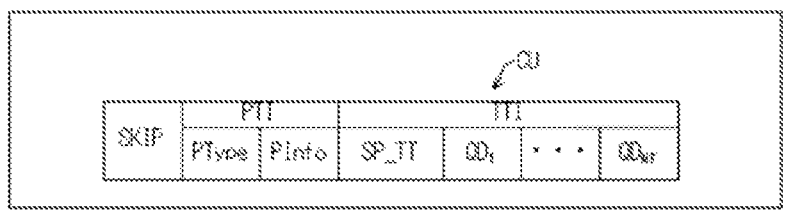

Subsequently, referring to FIG. 3E, the specific details of data contained in the CU information are described. As shown in FIG. 3E, the CU information includes a skip flag (SKIP), PT information (PTI), and TT information (TTI).

The SKIP is a flag indicating whether a skip mode is applied to the target PU or not. When the SKIP has a value of one, that is, when the skip mode is applied to the target CU, a part of the PTI in the CU information, and the TTI are omitted. The SKIP is omitted in the I slice.

The PTI is information pertains to the PT included in CU. In other words, the PTI is a set of pieces of information pertaining to one or more PUs included in PT, and is referred to by the hierarchical video decoding apparatus 1 when the predictive image is generated. As shown in FIG. 3E, the PTI contains prediction type information (PType), and predictive information (PInfo).

The PType is information that designates the predictive image generating method for the target PU. On the base layer, this information designates whether to use intra prediction or inter prediction.

The PInfo is predictive information used in the prediction method designated by the PType. On the base layer, the intra prediction information (PP_Intra) is contained in the case of the intra prediction. In the inter prediction, PP_Inter is contained.

The PP_Inter contains predictive information referred to by the hierarchical video decoding apparatus 1 when this apparatus generates an inter prediction image through the inter prediction. Furthermore, the PP_Inter contains inter PU splitting information that designates a splitting pattern for the target CU into each inter PU, and inter prediction parameters (motion compensation parameters) for each inter PU. The inter prediction parameters include, for example, a merge flag (merge_flag), a merge index (merge_idx), an estimated motion vector index (mvp_idx), a reference picture index (ref_idx), an inter prediction flag (inter_pred_flag), and a motion vector residue (mvd).

The PP_Intra contains a coding parameter referred to by the hierarchical video decoding apparatus 1 when this apparatus generates an intra prediction image through the intra prediction. Furthermore, the PP_Intra contains intra PU splitting information that designates a splitting pattern for the target CU into each intra PU, and an intra prediction parameter for each intra PU. The intra prediction parameter is a parameter for designating an intra prediction method (prediction mode) for each intra PU.

The transform tree information (TTI) is information pertains to the TT included in CU. In other words, the TTI is a set of pieces of information pertaining to one or more transform blocks included in TT, and is referred to by the hierarchical video decoding apparatus 1 when this apparatus performs decoding to obtain residual data.

As shown in FIG. 3E, the TTI contains TT splitting information (SP_TT) that designates a splitting pattern for the target CU into each transform block, and quantization predictive residues QD1 to QDNT (NT is the total number of blocks included in the target CU).

Furthermore, the SP_TT is information for determining the shape of each transform block included in the target CU, and the position in the target CU. For example, the SP_TT can be achieved using information (split_transform_unit_flag) indicating whether to split the target node or not, and information indicating the depth of splitting (trafoDepth).

For example, in the case where the CU size is 64×64, each transform block obtained by the splitting may be a size ranging from 32×32 pixels to 4×4 pixels.

Each QD is coded data generated by the hierarchical video coding apparatus 2 applying the following processes 1 to 3 to the target block, which is a transform block to be processed.

Process 1: apply frequency transform (e.g., discrete cosine transform (DCT) and discrete sine transform (DST), etc.) to the predictive residue obtained by subtracting the predictive image from the coding target image.

Process 2: quantize the transform coefficients obtained in the process 1.

Process 3: variable-length code the transform coefficients quantized in the process 2.

The aforementioned quantization parameter (qp) represents the magnitude of the quantization step (QP) used by the hierarchical video coding apparatus 2 to quantize the transform coefficients (QP=2qp/6).

Provided that the target CU has a size of 2N×2N pixels, the types of PU splitting designated by the PU splitting information include the following eight patterns in total. That is, four symmetric splittings which are of 2N×2N pixels, 2N×N pixels, N×2N pixels, and N×N pixels, and four asymmetric splittings which are 2N×nU pixels, 2N×nD pixels, nL×2N pixels, and nR×2N pixels. Note that N=2m (m is any integer at least one). Hereinafter, a prediction unit obtained by splitting the target CU is called a predictive block or a partition.

For example, a substantially same data structure as the data structure shown in FIG. 3 can be adopted for coded data included in the layer representation of the extended layer (hereinafter called extended layer coded data). Additional information may be added to and the parameters may be omitted from the extended layer coded data, as described below.

On the slice layer, pieces of identification information on hierarchical layers of spatial scalability, temporal scalability, SNR scalability, and view scalability, which are dependency_id, temporal_id, quality_id, and view_id, respectively, may be coded.

The PType included in the CU information is information that designates any of the intra prediction, the inter prediction, and the inter-layer image prediction as the predictive image generating method for the target CU. The PType contains a flag of designating presence or absence of application of the inter-layer image prediction mode (inter-layer image prediction flag). The inter-layer image prediction flag may be called texture_rl_flag, inter_layer_pred_flag, or base_mode_flag.

On the extended layer, the CU type of the target CU may be designated as any of the intra CU, inter-layer CU, inter-CU, and skip CU.

The intra CU can be defined in a manner similar to that of the intra CU on the base layer. In the intra CU, the inter-layer image prediction flag is set to "0", and the prediction mode flag is set to "0".

The inter-layer CU can be defined as a CU that uses a decoded image of a picture on the reference layer to generate a predictive image. In the inter-layer CU, the inter-layer image prediction flag is set to "1", and the prediction mode flag is set to "0".

The skip CU can be defined in a manner similar to that of the HEVC scheme. For example, in the skip CU, the skip flag is set to "1".

The inter-CU may be defined as a CU which is non-skip and to which motion compensation (MC) is applied. In the inter-CU, for example, the skip flag is set to "0", and the prediction mode flag is set to "1".

As described above, the coded data on the extended layer may be generated according to a coding scheme that is different from the coding scheme on the lower layer. That is, coding and decoding processes on the extended layer do not depend on the type of codec on the lower layer.

The lower layer may be coded according to the MPEG-2 or H.264/AVC scheme, for example.

The extended layer coded data may have an extended VPS, and contain a parameter that represents the inter-layer reference structure.

The extended layer coded data may have an extended SPS, PPS, and SH, and contain information pertaining to a decoded image on the reference layer used for inter-layer image prediction (e.g., a syntax for directly or indirectly deriving an inter-layer prediction picture set, base control information, etc., which will be described below).

Each of the parameters having been described above may be separately coded. Alternatively, the parameters may be integrally coded in a complex manner. In the case of integrally coding the parameters in a complex manner, an index is assigned to a combination of parameter values. The assigned index is coded. If a parameter can be derived from another parameter or decoded information, coding of the parameter concerned can be omitted.

Figure 4A:
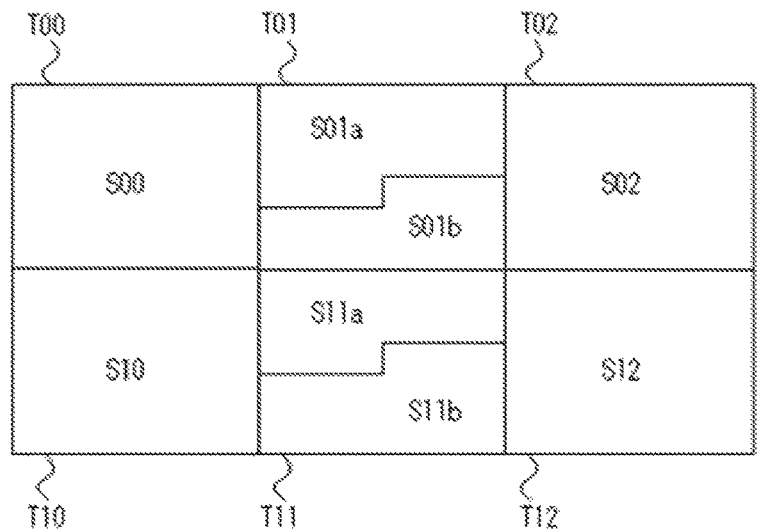
FIG. 4A and FIG. 4B diagrams are for illustrating the relationship between a picture, tiles and slices in hierarchically coded data according to the embodiment of the present disclosure, where FIG. 4A exemplifies a split region in the case of splitting the picture into tiles and slices, and FIG. 4B exemplifies the relationship between the tiles and slices in the structure of coded data.
Figure 4B:
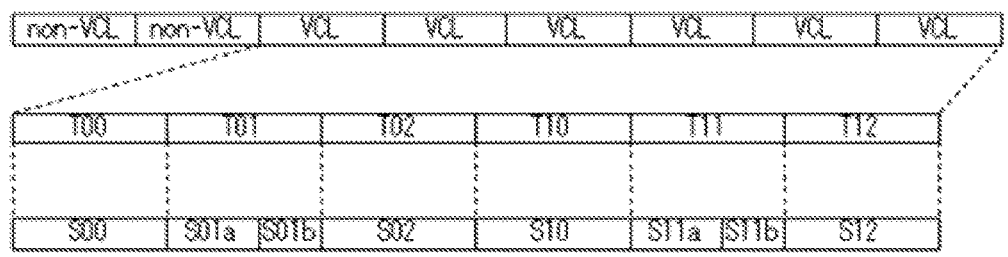

Next, as to the picture, tile, and slice, which are important concepts according to the present disclosure, the mutual relationship and the relationship with the coded data are described with reference to FIGS. 4A and 4B. FIG. 4A and FIG. 4B diagrams are for illustrating the relationship between the picture and the tile and slice in the hierarchically coded data. The tile is associated with a rectangular partial region in the picture, and coded data pertaining to this partial region. The slice is associated with a partial region in the picture, and coded data pertaining to this partial region, that is, associated with the slice header and slice data which pertain to this partial region.

FIG. 4A exemplifies a split region in the case of splitting the picture into tiles and slices. In FIG. 4A, the picture is split into six rectangular tiles (T00, T01, T02, T10, T11, and T12). The tile T00, tile T02, tile T10, and tile T12 each include one slice (sequentially, a slice S00, slice S02, slice S10, and slice S12). Meanwhile, the tile T01 includes two slices (a slice S01a and a slice S01b), and the tile T11 includes two slices (a slice S11a and a slice S11b).

FIG. 4B exemplifies the relationship between the tile and slice in the structure of the coded data. First, the coded data includes video coding layer (VCL) network abstraction layer (NAL) units and non-VCL NAL units. The coded data on the VCL equivalent to one picture includes VCL NALs. In the case where the picture is split into tiles, the coded data equivalent to the picture contains coded data equivalent to the tiles in the raster order of tiles. That is, as shown in FIG. 4A, in the case where the picture is split into tiles, the coded data equivalent to the tiles T00, T01, T02, T10, T11 and T12 are included in this order. In the case where the tile is split into multiple slices, as to the CTU of the leading slice, the coded data equivalent to the slice is contained in the coded data equivalent to the tile, from the slice positioned at front in the raster scanning order in the tile. For example, as shown in FIG. 4A, in the case where the tile T01 includes the slices S01a and S01b, the coded data equivalent to the slices are sequentially included in the coded data equivalent to the tile T01, in the order of the slice S01a and S01b.

As can be understood according to the above description, the coded data corresponding to one or more slices are associated with the coded data equivalent to a specific tile in the picture. Consequently, if a decoded image of the slices associated with the tile can be generated, a decoded image of the partial region in the picture that corresponds to the tile.

Hereinafter, the description is made assuming the relationship between the picture, tiles and slices and the coded data as described above, unless otherwise described.

Figure 5:
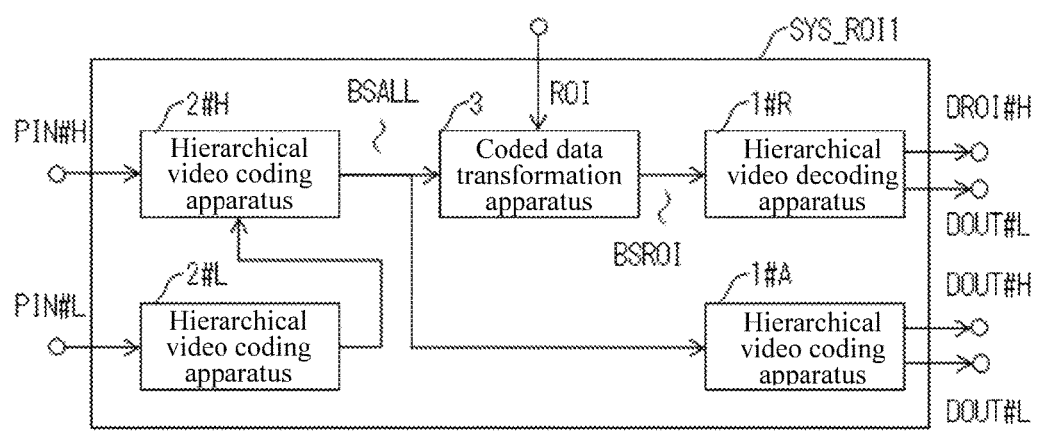
FIG. 5 is a diagram exemplifying a system that can be achieved by combining the hierarchical video decoding apparatus, the hierarchical video coding apparatus and the coded data transformation apparatus, and transmits and reproduces a hierarchical video.

Prior to description on the hierarchical video decoding apparatus 1, the hierarchical video coding apparatus 2 and the coded data transformation apparatus 3 according to this embodiment, an example of a system that can be achieved by combining the hierarchical video decoding apparatus 1, the hierarchical video coding apparatus 2 and the coded data transformation apparatus 3 is preliminarily described with reference to FIG. 5. FIG. 5 exemplifies a system SYS_ROI1 that can be achieved by combining the hierarchical video decoding apparatus 1, the hierarchical video coding apparatus 2 and the coded data transformation apparatus 3, and transmits and reproduces a hierarchical video.

The system SYS_ROI1 causes a hierarchical video coding apparatus 2#L and a hierarchical video coding apparatus 2#H to hierarchically code a low-quality input image PIN#L and a high-quality input image PIN#H, respectively, and generate hierarchically coded data BSALL.

The hierarchically coded data BSALL contains coded data corresponding to the entire high-quality input image PIN#H as hierarchically coded data on the higher layer (extended layer). The hierarchically coded data BSALL contains coded data corresponding to the entire low-quality input image PIN#L as hierarchically coded data on the lower layer (base layer). When the hierarchically coded data BSALL is input into the hierarchical video decoding apparatus 1#A, a high-quality reproduced image DOUT#H and a low-quality reproduced image DOUT#L are output.

When the hierarchically coded data BSALL is input into the coded data transformation apparatus 3, hierarchically coded data BSROI is generated on the basis of an input region of interest ROI. The hierarchically coded data BSROI contains coded data on a portion equivalent to the region of interest ROI in the high-quality input image PIN#H as hierarchically coded data on the higher layer (extended layer). Furthermore, the hierarchically coded data BSROI contains the coded data corresponding to the entire low-quality input image PIN#L as the hierarchically coded data on the lower layer (base layer). When the hierarchically coded data BSROI is input into the hierarchical video decoding apparatus 1#R, a decoded image DROI#H that corresponds to the high-quality input image PIN#H and to the region of interest ROI is output. In addition, the decoded image DOUT#L corresponding to the low-quality input image PIN#L is output.

In the following description on the hierarchical video decoding apparatus 1, the hierarchical video coding apparatus 2 and the coded data transformation apparatus 3, the description may be made assuming use in the system SYS_ROI1. However, the use of each apparatus is not necessarily limited to that in the system SYS_ROI1.

The configuration of the hierarchical video decoding apparatus 1 according to this embodiment is hereinafter described with reference to FIGS. 1 to 15.

Figure 6:
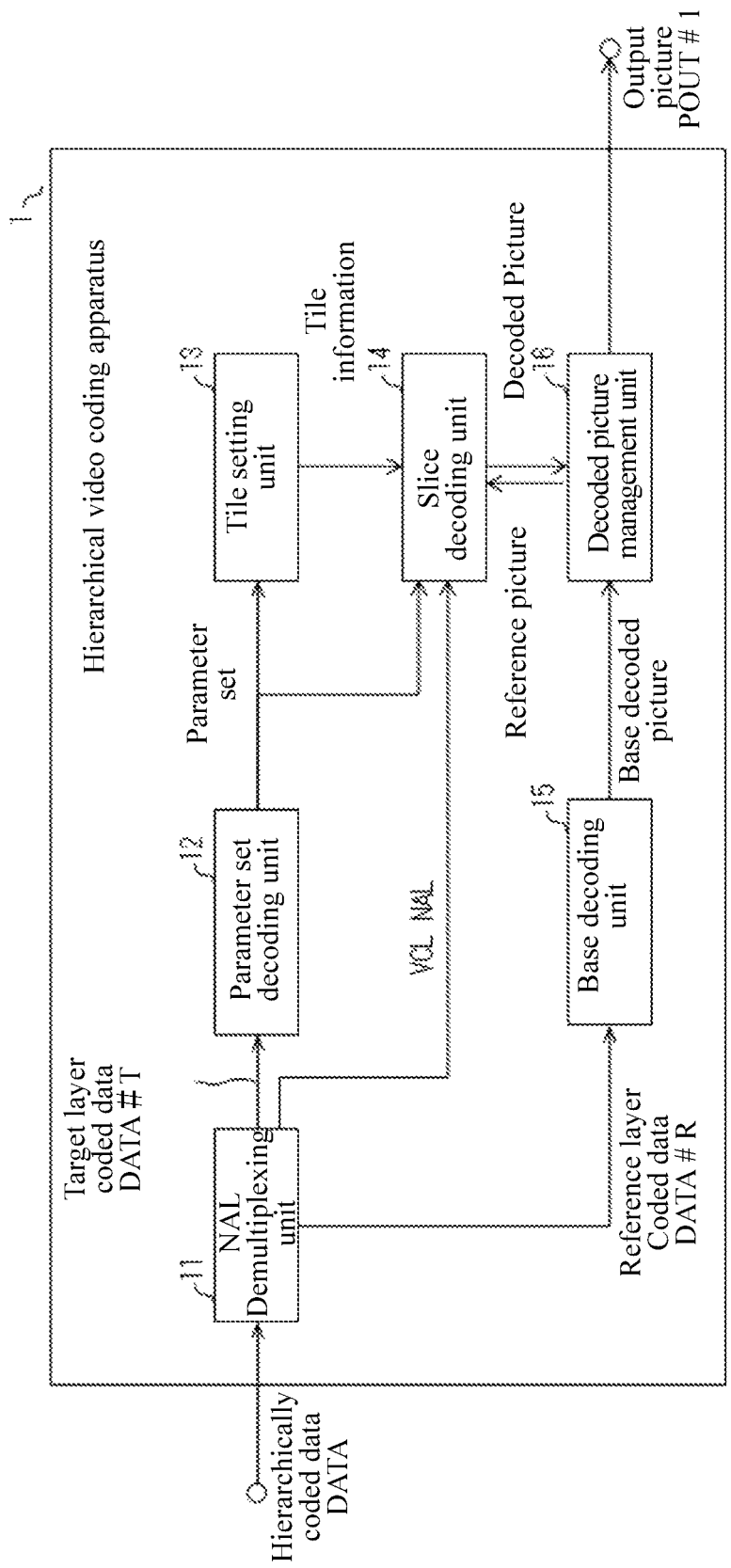
FIG. 6 is a functional block diagram showing the schematic configuration of the hierarchical video decoding apparatus.

Referring to FIG. 6, a schematic configuration of the hierarchical video decoding apparatus 1 is described as follows. FIG. 6 is a functional block diagram showing the schematic configuration of the hierarchical video decoding apparatus 1. The hierarchical video decoding apparatus 1 decodes the hierarchically coded data (DATA) (hierarchically coded data DATAF provided from the hierarchical video coding apparatus 2 or hierarchically coded data DATAR provided from the coded data transformation apparatus 3), and generates a decoded image POUT#T on the target layer. Hereinafter, the description is made assuming that the target layer is an extended layer where the basic layer is adopted as the reference layer. Consequently, the target layer is a higher layer with respect to the reference layer. On the contrary, the reference layer is a lower layer with respect to the target layer.

As shown in FIG. 6, the hierarchical video decoding apparatus 1 includes an NAL demultiplexing unit 11, a parameter set decoding unit 12, a tile setting unit 13, a slice decoding unit 14, a base decoding unit 15, and a decoded picture management unit 16.

The NAL demultiplexing unit 11 demultiplexes the DATA transmitted in units of the NAL unit on the NAL.

The NAL is a layer provided to abstract communication between a VCL and a lower system for transmitting and accumulating the coded data.

The VCL is a layer for performing a video coding process. On the VCL, coding is performed. Meanwhile, the so called lower system corresponds to the file formats of H.264/AVC and HEVC, and the MPEG-2 system.

In the NAL, a bit stream generated on the VCL is delimited in units that are NAL units, and transmitted to the lower system, which is the destination. The NAL unit includes coded data that is coded on the VCL, and a header for allowing this coded data to be appropriately delivered to the lower system, which is the destination. The coded data on each hierarchical layer is stored in the NAL unit to thus be NAL-multiplexed, and is transmitted to the hierarchical video decoding apparatus 1.

The DATA includes not only an NAL generated by the VCL, but also an NAL that includes parameter sets (VPS, SPS and PPS) and SEI. These NALs are called non-VCL NALs, which are discriminated from VCL NALs.

The NAL demultiplexing unit 11 demultiplexer the DATA, and picks out target layer coded data DATA#T and reference layer coded data DATA#R. The NAL demultiplexing unit 11 supplies the non-VCL NAL to the parameter set decoding unit 12, and supplies the VCL NAL to the slice decoding unit 14, among the NALs included in the target layer coded data DATA#T.

The parameter set decoding unit 12 decodes the input non-VCL NAL to obtain parameter sets, i.e., the VPS, SPS and PPS, and supplies the sets to the tile setting unit 13 and the slice decoding unit 14. The details of processes having high relationship with the present disclosure in the parameter set decoding unit 12 are described later.

The tile setting unit 13 derives tile information on the picture on the basis of the input parameter set, and supplies the information to the slice decoding unit 14. The tile information includes at least tile-split information on the picture. The details of the tile setting unit 13 are described later.

The slice decoding unit 14 generates a decoded picture or a partial region of the decoded picture on the basis of the input VCL NAL, the parameter set, the tile information and the reference picture, and records the decoded picture or its partial region in the buffer in the decoded picture management unit 16. The details of the slice decoding unit are described later.

The decoded picture management unit 16 records the input decoded picture and base decoded picture in the internal decoded picture buffer (DPB), while generating the reference picture list and determining the output picture. The decoded picture management unit 16 outputs the decoded picture recorded in the DPB, as an output picture POUT#T, at a predetermined timing, to the outside.

The base decoding unit 15 decodes the reference layer coded data DATA#R to obtain the base decoded picture. The base decoded picture is a decoded picture on the reference layer used during decoding the decoded picture on the target layer. The base decoding unit 15 records the decoded base decoded picture in the DPB in the decoded picture management unit 16.

Figure 7:
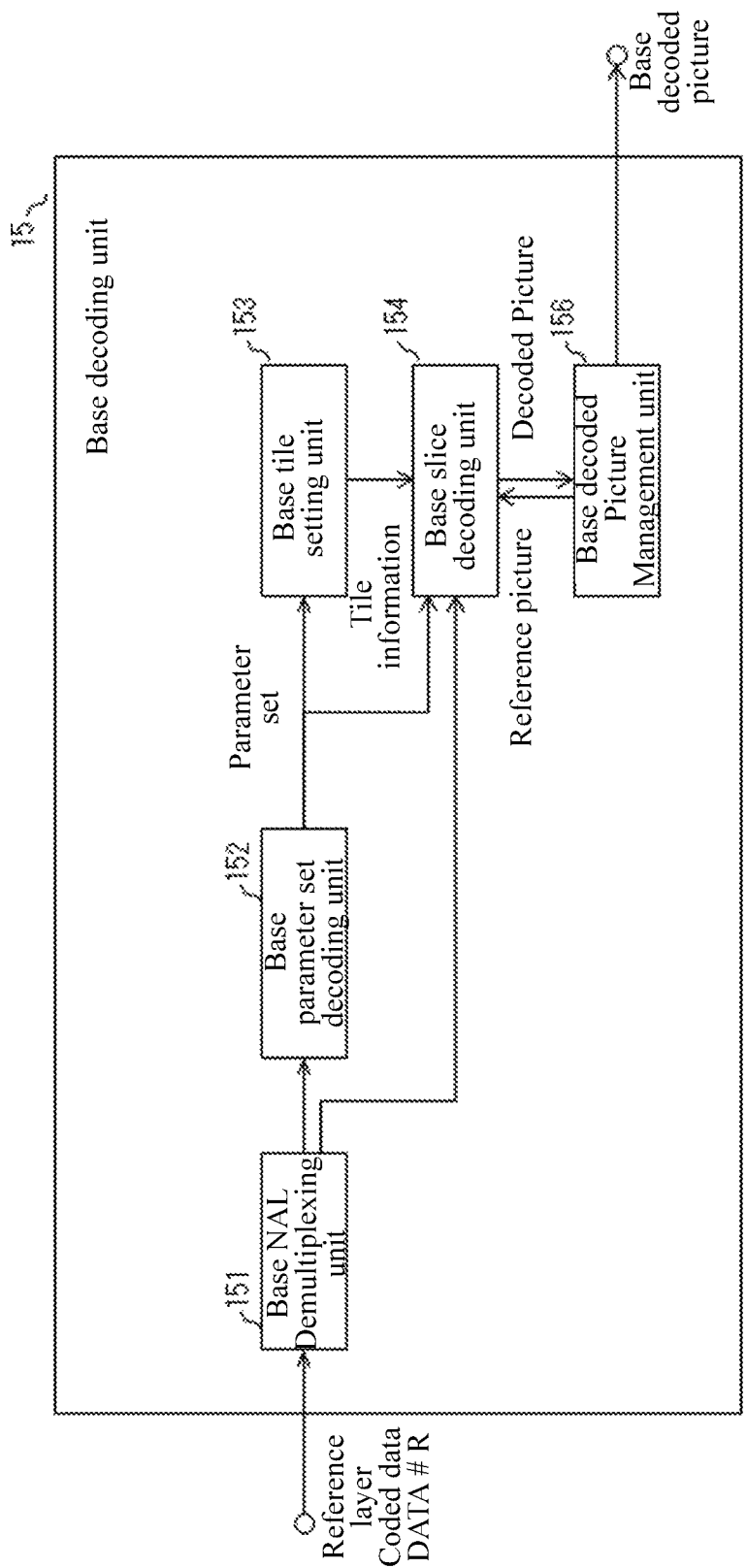
FIG. 7 is a functional block diagram exemplifying a configuration of a base decoding unit included in the hierarchical video decoding apparatus.

Referring to FIG. 7, the detailed configuration of the base decoding unit 15 is described. FIG. 7 is a functional block diagram that exemplifies the configuration of the base decoding unit 15.

As shown in FIG. 7, the base decoding unit 15 includes a base NAL demultiplexing unit 151, a base parameter set decoding unit 152, a base tile setting unit 153, a base slice decoding unit 154, and a base decoded picture management unit 156.

The base NAL demultiplexing unit 151 demultiplexer the reference layer coded data DATA#R, extracts the VCL NAL and non-VCL NAL, and supplies the non-VCL NAL to the base parameter set decoding unit 152 while supplying the VCL NAL to the base slice decoding unit 154.

The base parameter set decoding unit 152 decodes the input non-VCL NAL to obtain parameter sets, i.e., the VPS, SPS and PPS, and supplies the sets to the base tile setting unit 153 and the base slice decoding unit 154.

The base tile setting unit 153 derives tile information on the picture on the basis of the input parameter set, and supplies the information to the base slice decoding unit 154.

The base slice decoding unit 154 generates a decoded picture or a partial region of the decoded picture on the basis of the input VCL NAL, the parameter set, the tile information and the reference picture, and records the decoded picture or its partial region in the buffer in the base decoded picture management unit 156.

The base decoded picture management unit 156 records the input decoded picture in the internal DPB, while generating the reference picture list and determining the output picture. The base decoded picture management unit 156 outputs the decoded picture recorded in the DPB, as a base decoded picture, at a predetermined timing.

The parameter set decoding unit 12 decodes the input target layer coded data to obtain and output the parameter sets (VPS, SPS and PPS) to be used to decode the target layer. Typically, the parameter set is decoded on the basis of a predetermined syntax table. That is, a bit sequence is read from the coded data according to the procedures defined in the syntax table, and decoded to obtain the syntax value of the syntax included in the syntax table. A variable may be derived on the basis of the decoded syntax value and included into the parameter set to be output, if necessary. Consequently, the parameter set output from the parameter set decoding unit 12 can be represented as the syntax value of the syntax pertaining to the parameter sets (VPS, SPS and PPS) included in the coded data, and a set of variables derived from the syntax value.

Hereinafter, a part of a syntax table pertaining to the picture information and the inter-layer position correspondence information which have high relationship with the present disclosure among syntax tables used for decoding in the parameter set decoding unit 12 is described in detail.

The parameter set decoding unit 12 decodes the input target layer coded data to obtain picture information. The picture information is information that schematically defines the size of the decoded picture on the target layer. For example, the picture information includes information representing the width and height of the decoded picture on the target layer.

The picture information is included in SPS, for example. The picture information decoded from SPS contains the width of the decoded picture (pic_width_in_luma_samples) and the height of the decoded picture (pic_height_in_luma_samples). The value of the syntax pic_width_in_luma_samples corresponds to the width of the decoded picture in units of luma pixel. The value of the syntax pic_height_in_luma_samples corresponds to the height of the decoded picture in units of luma pixel.

The parameter set decoding unit 12 decodes the input target layer coded data to obtain display region information. The display region information is included in SPS. The display region information decoded from SPS includes a display region flag (conformance_flag). The display region flag indicates whether information representing the position of the display region (display region position information) is additionally included in SPS or not. That is, when the display region flag is one, this flag indicates that the display region position information is additionally included. When the display region flag is zero, this flag indicates that the display region position information is not additionally included.

When the display region information is one, the display region information decoded from SPS further includes a display region left offset (conf_win_left_offset), a display region right offset (conf_win_right_offset), a display region top offset (conf_win_top_offset), and a display region bottom offset (conf_win_bottom_offset), as the display region position information.

When the display region flag is zero, the entire picture is set as the display region. On the other hand, when the display region flag is one, the partial region in the picture that is indicated by the display region position information is set. The display region is also called a conformance window.

Figure 8:
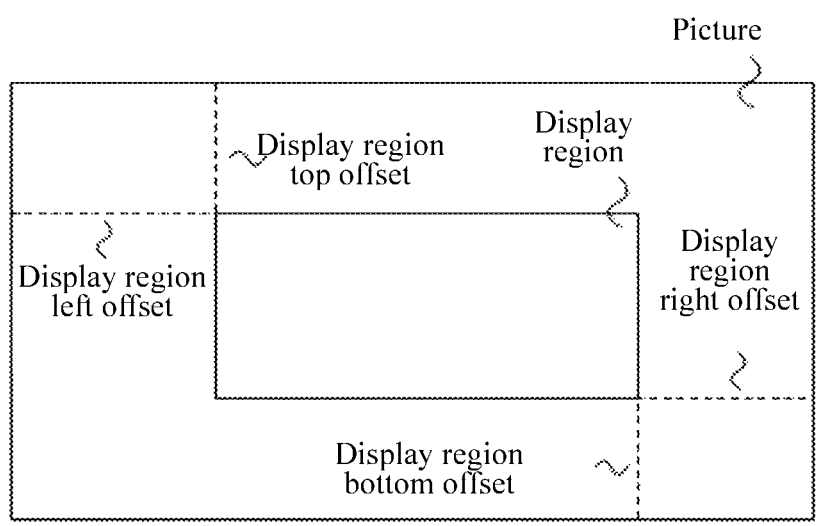
FIG. 8 is a diagram exemplifying the relationship between a display region, which is a partial region in the picture, and display region position information.

Referring to FIG. 8, the relationship between the display region position information and the display region is described. FIG. 8 is a diagram exemplifying the relationship between a display region, which is a partial region in the picture, and display region position information. As shown in the diagram, the display region is included in the picture. The display region top offset represents the distance between the top side of the picture and the top side of the display region. The display region left offset represents the distance between the left side of the picture and the left side of the display region. The display region right offset represents the distance between the right side of the picture and the right side of the display region. The display region bottom offset represents the distance between the bottom side of the picture and the bottom side of the display region. Consequently, the display region position information can uniquely identify the position and size of the display region in the picture. The display region information may be other information that can uniquely identify the position and size of the display region in the picture.

The parameter set decoding unit 12 decodes the input target layer coded data to obtain inter-layer position correspondence information. The inter-layer position correspondence information schematically represents the positional relationship between the corresponding regions on the target layer and the reference layer. For example, when a certain object (object A) is included in the picture on the target layer and the picture on the reference layer, the region corresponding to the object A in the picture on the target layer and the region corresponding to the object A in the picture on the reference layer are equivalent to the respective corresponding regions on the target layer and the reference layer. The inter-layer position correspondence information is not necessarily information that correctly represents the positional relationship between the corresponding regions on the target layer and the reference layer. In general, the information represents the positional relationship between the corresponding correct regions on the target layer and the reference layer to improve the correctness of the inter-layer prediction.

The inter-layer position correspondence information includes inter-layer pixel correspondence information. The inter-layer pixel correspondence information is information that represents the positional relationship between the pixels of the picture on the reference layer and the pixels of the picture on the target layer. The inter-layer correspondence information may additionally include inter-layer phase correspondence information. The inter-layer phase correspondence information is information that represents the phase difference of the pixels whose correspondence is indicated by the inter-layer pixel correspondence information.

The inter-layer pixel correspondence information is included, for example, in an SPS extension (sps_estension) which is a part of the higher layer SPS, and is decoded according to a syntax table shown in FIG. 9. FIG. 9 shows a part that is of the syntax table referred to by the parameter set decoding unit 12 during SPS decoding and pertains to the inter-layer pixel correspondence information.

The inter-layer pixel correspondence information decoded from SPS includes the number of pieces of inter-layer pixel correspondence information (num_scaled_ref_layer_offsets). In addition, the inter-layer pixel correspondence information includes inter-layer pixel correspondence offsets as many as the pieces of inter-layer pixel correspondence information. The inter-layer pixel correspondence offsets include an extended reference layer left offset (scaled_ref_layer_left_offset[i]), an extended reference layer top offset (scaled_ref_layer_top_offset[i]), an extended reference layer right offset (scaled_ref_layer_right_offset[i]), and an extended reference layer bottom offset (scaled_ref_layer_bottom_offset[i]). The inter-layer pixel correspondence offset is also called an extended reference layer offset.

Figure 10A:
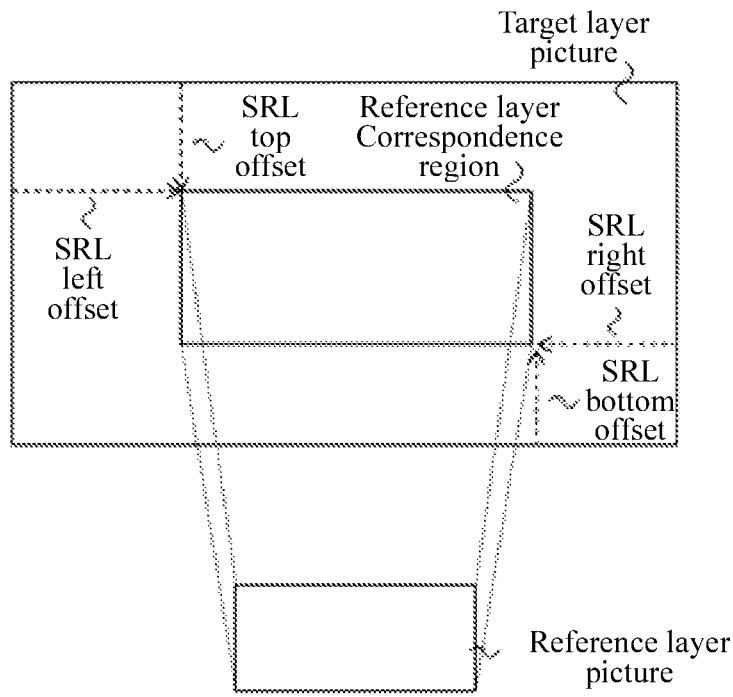
FIG. 10A and FIG. 10B diagrams are exemplifying the relationship between a picture on a target layer, a picture on a reference layer, and an inter-layer pixel correspondence offset.
Figure 10B:
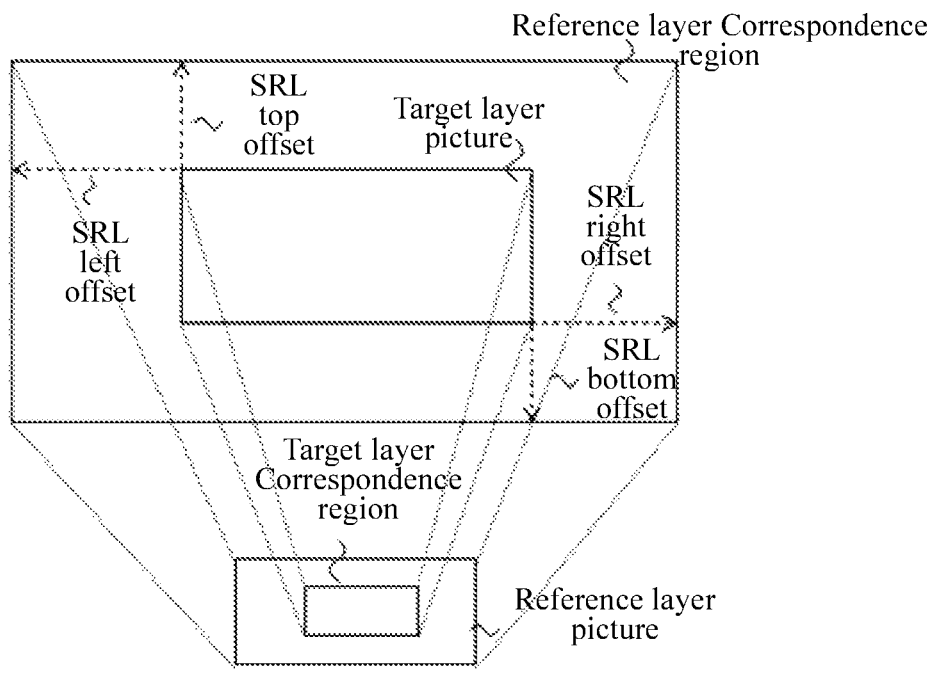

The meaning of each offset included in the inter-layer pixel correspondence offset is described with reference to FIG. 10A and FIG. 10B. FIG. 10A and FIG. 10B diagrams are exemplifying the relationship between the picture on the target layer, the picture on the reference layer, and the inter-layer pixel correspondence offset.

FIG. 10A shows an example of the case where the entire picture on the reference layer corresponds to a part of the picture on the target layer. In this case, the region on the target layer corresponding to the entire reference layer picture (target layer correspondence region) is included in the target layer picture. FIG. 10B shows an example of the case where a part of the picture on the reference layer corresponds to the entire picture on the target layer. In this case, the target layer picture is included in the reference layer correspondence region. The entire target layer picture includes the offsets.

As shown in FIG. 10A and FIG. 10B, the extended reference layer left offset (SRL left offset in the diagram) represents an offset to the left side of the target layer picture on the left side of the reference layer correspondence region. An SRL left offset larger than zero represents that the left side of the reference layer correspondence region is positioned on the right of the left side of the target layer picture.

The extended reference layer top offset (SRL top offset in the diagram) represents an offset of the top side of the reference layer correspondence region to the top side of the target layer picture. An SRL top offset larger than zero represents that the top side of the reference layer correspondence region is positioned below the top side of the target layer picture.

The extended reference layer right offset (SRL right offset in the diagram) represents an offset of the right side of the reference layer correspondence region to the right side of the target layer picture. An SRL right offset larger than zero represents that the right side of the reference layer correspondence region is positioned on the left of the right side of the target layer picture.

The extended reference layer bottom offset (SRL bottom offset in the diagram) represents an offset of the bottom side of the reference layer correspondence region to the bottom side of the target layer picture. An SRL bottom offset larger than zero represents that the bottom side of the reference layer correspondence region is positioned above the bottom side of the target layer picture.

The parameter set decoding unit 12 decodes the input target layer coded data to obtain scale adjustment information. For example, the scale adjustment information is included in the SPS extension, and decoded according to a syntax table shown in FIG. 11. FIG. 11 shows a part that is of the syntax table referred to by the parameter set decoding unit 12 during SPS decoding and pertains to the scale adjustment information.

The scale adjustment information decoded from SPS includes a syntax element (A0).

A0: scale adjustment information (num_scale_adjust_info)

In addition, the SPS includes a group of syntax elements (A1, A2L, A2T, A2R, A2B, A3W and A3H) as many as the number of elements indicated by the number of pieces of scale adjustment information.

A1: scale adjustment reference layer identifier (scale_adjust_ref_layer_id[i])

A2L: extended reference layer left additional offset (srl_add_left_offset[i])

A2T: extended reference layer top additional offset (srl_add_top_offset[i])

A2R: extended reference layer right additional offset (srl_add_right_offset[i])

A2B: extended reference layer bottom additional offset (srl_add_bottom_offset[i])

A3W: virtual reference layer width (rl_virtual_width[i])

A3H: virtual reference layer height (rl_virtual_height[i])

The A2L, A2T, A2R and A2B are also collectively called an extended reference layer additional offset. The A2L and A2T are also collectively called an extended reference layer top left additional offset. The A2R and A2B are also called an extended reference layer bottom right additional offset. The A3W and A3H are also collectively called a virtual reference layer size. In other words, through use of this definition, the scale adjustment information includes the extended reference layer additional offsets and the virtual reference layer sizes which are as many as the number of pieces of scale adjustment information.

The syntax elements A0, A2L, A2T, A2R, A2B, A3W and A3H are coded using non-negative integer order-0 exp-Golomb coding (ue(v)), which is defined also in HEVC. Meanwhile, the syntax element A1 is coded using 6-bit fixed-length coding (u(6)). The element may be coded using other coding that corresponds to the same range as that of these types of coding.

The scale adjustment information (A0) represents the number of items which are the scale adjustment reference layer identifier, the extended reference layer additional offset, and the reference layer adjustment size, and are included in the SPS. The number of pieces of scale adjustment information may be omitted. For example, this number is not required in the case where the number of reference layers for the target layer is fixed or has already been known. This number can be omitted even in the case where the number of reference layers for the target layer is unknown. In such a case, the additional syntax element is included in SPS even for an unnecessary reference layer, which unfortunately increases the amount of code.

The scale adjustment reference layer identifier (A1) is an identifier of a specific reference layer for the target layer. The specific reference layer is a reference layer to be subjected to a scale adjustment process.

The extended reference layer additional offsets (A2L, A2T, A2R and A2B) are parameters used to calculate an inter-layer scale (adjustment scale), and are parameters pertaining to extended reference layer adjustment size. The extended reference layer additional offset is schematically a parameter that represents the difference between the reference layer correspondence region in actuality (actual reference layer correspondence region) and the reference layer correspondence region (virtual reference layer correspondence region) used to calculate the inter-layer scale.

Figure 12:
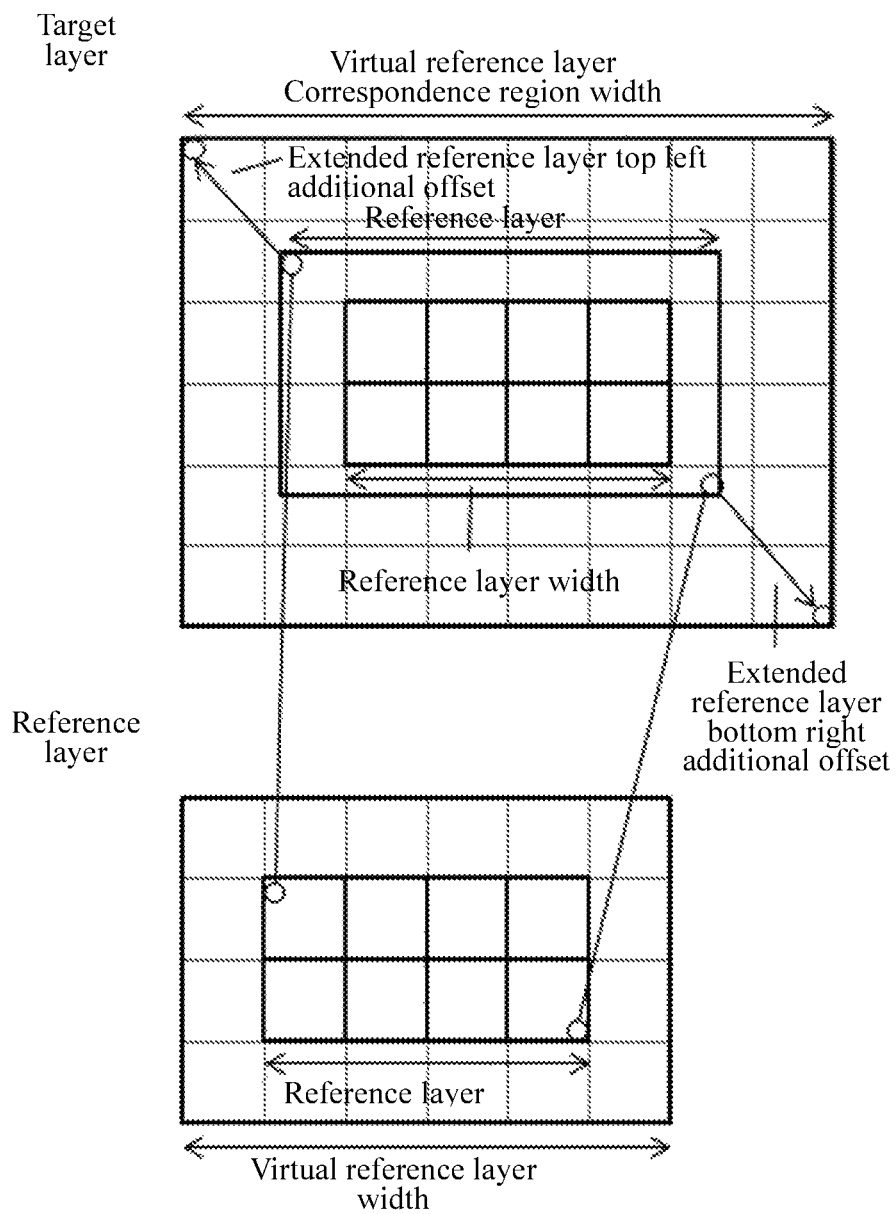
FIG. 12 is a diagram exemplifying the relationship between an actual reference layer correspondence region, a virtual reference layer correspondence region, and an extended reference layer additional offset.

A more specific definition of the extended reference layer additional offset is described with reference to FIG. 12. FIG. 12 is a diagram exemplifying the relationship between the actual reference layer correspondence region and the virtual reference layer correspondence region. As shown in the diagram, the extended reference layer top left additional offset (A2L and A2T) represents the position of the top left pixel of the virtual reference layer correspondence region with respect to the position of the top left pixel of the reference layer correspondence region (actual reference layer correspondence region). Likewise, the extended reference layer bottom right additional offset (A2L and A2T) represents the position of the bottom right pixel of the virtual reference layer correspondence region with respect to the position of the bottom right pixel of the actual reference layer correspondence region.

The virtual reference layer size (A3W and A3H) is parameters used to calculate the inter-layer scale (adjustment scale). In the virtual reference layer size, the reference layer width (reference layer picture width) before hierarchically coded data transformation is set.

In the case where the syntax element is not included in the SPS on a specific reference layer for the target layer, each of the values of the extended reference layer additional offset and each of the values of the virtual reference layer size are set to predetermined values. In this case, it is preferred that a value of zero be used as the predetermined value of the extended reference layer additional offset, and the reference layer size (the reference layer width and the reference layer height) be used as the predetermined value of the virtual reference layer size (the virtual reference layer width and the virtual reference layer height). In this case, the sizes of the virtual reference layer correspondence region and the reference layer correspondence region coincide with each other. In addition, the sizes of the virtual reference layer and the reference layer coincide with each other. This setting is a typical one. Consequently, in other words, in the typical setting, use of the predetermined value can omit the information on the extended reference layer additional offset and the virtual reference layer size, thereby allowing the amount of code to be reduced.

The tile setting unit 13 derives tile information on the picture on the basis of the input parameter set, and outputs the information.

In this embodiment, the tile information generated by the tile setting unit 13 schematically includes tile structure information and tile dependence information.

The tile structure information is information represented by the number of tiles in the picture and the sizes of these tiles. In the case of association with partial regions obtained by splitting the picture into tiles in a grid-like manner, the number of tiles in the picture is equal to the product of the number of tiles included in the horizontal direction and the number of tiles included in the vertical direction.

The tile dependence information is information that represents the dependence in the case of decoding the tiles in the picture. Here, the dependence in the case of decoding tiles represents the degree of dependence of the tile on the decoded pixels and syntax value pertaining to regions out of the tile. The regions out of the tile include regions that are in the target picture and out of the tiles, regions that are in the reference picture and out of the tiles, and regions that are in the base decoded picture and out of the tiles.

The details of the tile information generated by the tile setting unit 13, including a deriving process based on the input parameter set, are hereinafter described.

The tile information is derived on the basis of the syntax values that pertain to the tile information included in the SPS or PPS included in the parameter set. The syntax pertaining to the tile information is described with reference to FIG. 13.

FIG. 13 is a part of the syntax table referred to by the parameter decoding unit 12 during decoding the PPS included in the parameter set, and is a part pertaining to the tile information.

The syntax (PPS tile information) pertaining to the tile information included in PPS includes multiple tiles enabled flag (tiles_enabled_flag). When the value of the multiple tiles enabled flag is one, this flag indicates that the picture is made up of at least two tiles. When the value of the multiple tiles_enabled_flag is zero, this flag indicates that the picture is made up of one tile, that is, the picture and the tile coincide with each other.

When the multiple tiles are enabled (tiles_enabled_flag is true), the PPS tile information further includes information that represents the number of tile columns (num_tile_columns_minus1), information that represents the number of tile rows (num_tiles_rows_minus1), and a flag that represents uniformity of the tile size (uniform_spacing_flag).

The num_tile_columns_minus1 is a syntax equivalent to a value obtained by subtracting one from the number of tiles included in the picture in the horizontal direction. The num_tile_rows_minus1 is a syntax equivalent to a value obtained by subtracting one from the number of tiles included in the picture in the vertical direction. Consequently, the number of tiles included in the picture NumTilesInPic is calculated according to the following expression.

NumTilesInPic=(num_tile_columns_minus1+1)*
(num_tile_rows_minus1+1) when the value of uniform_spacing_flag is one, this flag indicates that the tile size included in the picture is uniform, that is, the width and height of each tile are equal to each other. When the value of uniform_spacing_flag is zero, this flag indicates that the tile size included in the picture is not uniform, that is, the width and height of tiles included in the picture do not necessarily coincide with each other.

When the tile sizes included in the picture are not uniform (uniform_spacing_flag is zero), the PPS tile information additionally includes information indicating the tile width (column_width_minus1[i]) for each tile column included in the picture, and information indicating the tile height (row_height_minus1[i]) for each tile row included in the picture.

When the multiple tiles are enabled, the PPS tile information additionally includes a flag indicating whether a loop filter across the tile boarder is applied or not (loop_filter_across_tiles_enabled_flag).

Here, referring to FIG. 14, the relationship between the tile row and the tile column and the picture is described. FIG. 14 is a diagram exemplifying the tile rows and the tile columns in the case where the picture is split into tiles. In the example of FIG. 14, the picture is split into four tile columns and three tile rows, the picture includes total 12 tiles. For example, the tile column 0 (TileCol0) includes tiles T00, T10 and T20. For example, the tile row 0 (TileRow0) includes tiles T00, T01, T02 and T03. The width of the tile column i is represented as ColWidth[i] in units of CTU. The height of the tile row j is represented as RowHeight[j] in units of CTU. Consequently, the width and height of the tile that belongs to the tile row i and to the tile column j are ColWidth[i] and RowHeight[j], respectively.

The tile setting unit 13 derives tile structure information on the basis of the PPS tile information. The tile structure information includes an array (CtbAddrRsToTs[ctbAddrRs]) for deriving the tile scanning CTB address from the raster scanning CTB address, an array (CtbAddrTsToRs[ctbAddrTs]) for deriving the raster scan CTB address from the tile scanning CTB address, the tile identifier of each tile scanning CTB address (TileId[ctbAddrTs]), and the width of each tile column (ColumnWidthInLumaSamples[i]), and the height of each row (RowHeightInLumaSamples[j]).

When the uniform_spacing_flag is one, the width of each tile column is calculated on the basis of the picture size and the number of tiles in the picture. For example, the width of the i-th tile column (ColumnWidthInLumaSamples[i]) is calculated according to the following expression. PicWidthInCtbsY represents the number of CTUs included in the horizontal direction in the picture.

ColWidth[i]=((i+1)*PicWidthInCtbsY)/(num_tile_columns_minus1+1)−(i*PicWidthInCtbsY)/(num_tile_columns_minus1+1) ColWidth[i] that is the width of the i-th tile column in units of CTU is calculated as the difference between the (i+1)-th and i-th boarder positions obtained by equally dividing the picture by the number of tile columns.

On the other hand, when uniform_spacing_flag is zero, the value of (column_width_minus1[i]+1) is set to the width ColWidth[i] of the i-th tile column in units of CTU.

The value of ColumnWidthInLumaSamples[i] is set to a value obtained by multiplying ColWidth[i] by the width of CTU in units of pixels.

The height of the tile row RowHeight[j] in units of CTU is also calculated by a method equivalent to that for the width of the tile column. Instead of PicWidthInCtbsY, PicHeightInCtbsY (the number of CTUs included in the vertical direction of the picture) is used. Instead of num_tiles_columns_minus1, num_tiles_row_minus1 is used. Instead of column_width_minus1[i], row_height_minus1[i] is used.

The value of RowHeightInLumaSamples[j] is set to a value obtained by multiplying RowHeight[j] by the height of CTU in units of pixels.

Next, a deriving method of an array (CtbAddrTsToRs[ctbAddrTs]) for deriving the raster scan CTB address from the tile scanning CTB address is described.

First, colBd[i] that represents the boarder position of the i-th tile column, and rowBd[j] that represents the boarder position of the j-th tile row are calculated according to the next expression. The values of colBd[0] and rowBd[0] are zero.

colBd[i+1]=colBd[i]+colWidth[i].

rowBd[j+1]=rowBd[j]+rowHeight[j].

Subsequently, the tile scan CTU address associated with the CTU identified by the raster scan CTU address (ctbAddrRs) included in the picture is derived according to the following procedures.

The positions (tbX, tbY) of the target CTU in unis of CTU in the picture are calculated from ctbAddrRs according to the following expressions. Here, the operator "%" is the remainder operator. "A % B" means the remainder of division of the integer A by the integer B.

tbX=ctbAddrRs % PicWidthInCtbsY, and
tbY=ctbAddrRs/PicWidthInCtbsY.

Subsequently, the position (tileX, tileY) of the tile including the target CTU in the picture in units of tiles is derived. The tileX is set to a value of the maximum i that causes an evaluation expression (tbX>=colBd[i]) to be true. Likewise, the tileY is set to a value of the maximum i that causes an evaluation expression (tbY>=rowBd[j]) to be true.

The value of CtbAddrRsToTs[ctbAddrRs] is set to a value obtained by adding the sum of CTUs included in the tile proceeding the tile (tileX, tileY) in a tile scanning order to the position of the CTU disposed on (tbX−colBd[tileX], tbY−rowBd[tileY]) in the tile (tileX, tileY) in the raster scanning order.

The value of CtbAddrTsToRs[ctbAddrTs] is set to the value of k in the case where CtbAddrRsToTs[k] coincides with ctbAddrTs.

The value of TileId[ctbAddrTs] is set to the tile identifier of the tile to which the CTU indicated by ctbAddrTs belongs. The tile identifier tileId (tileX, tileY) of the tile at the position (tileX, tileY) in units of tiles in the picture is calculated according to the following expression.

tileId(tileX,tileY)=(tileY*(num_tile_cols_minus1+1))+tileX.

The slice decoding unit 14 generates the decoded picture on the basis of the input VCL NAL, parameter set, and tile information, and outputs the picture.

Figure 15:
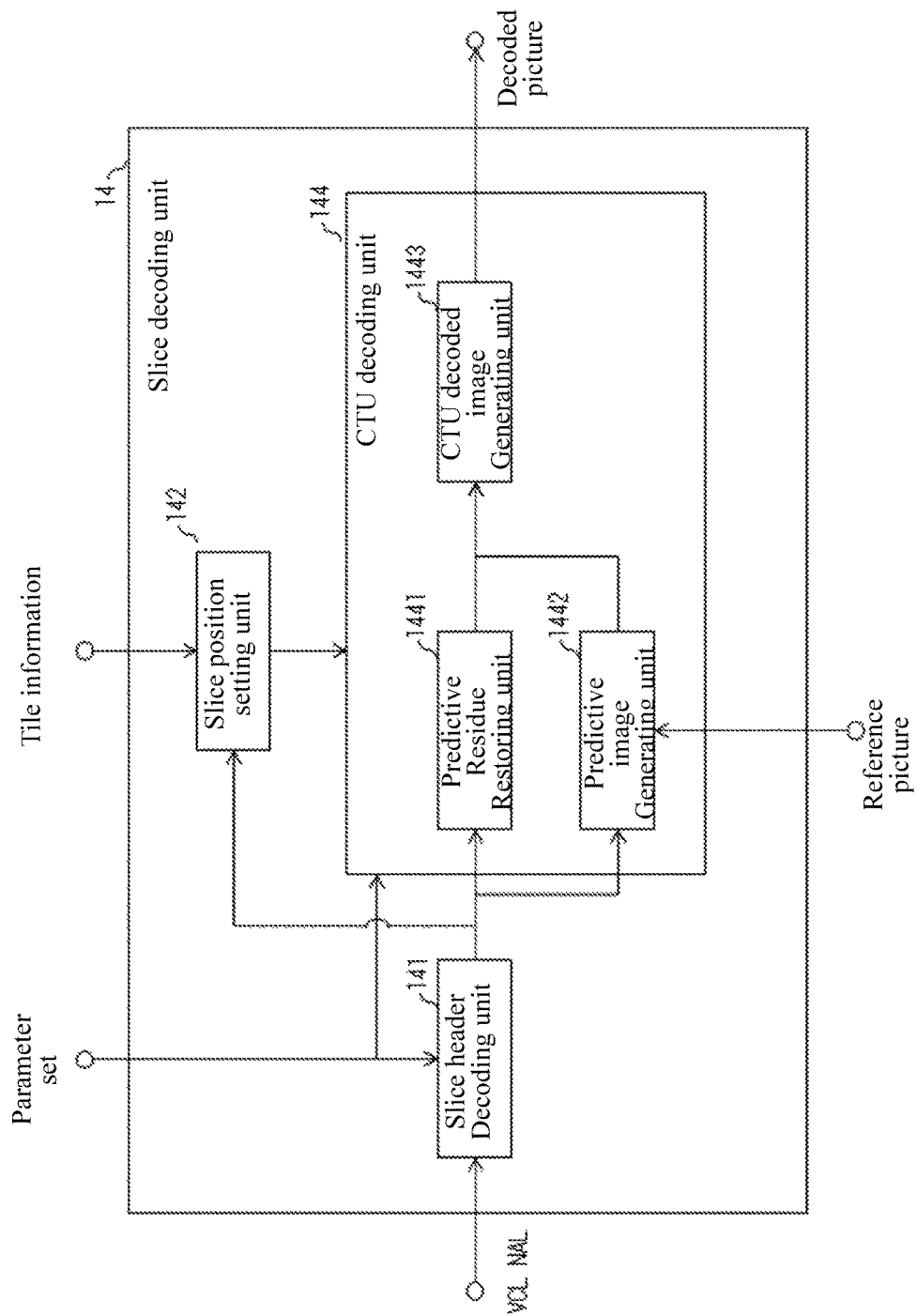
FIG. 15 is a functional block diagram exemplifying a configuration of a slice decoding unit included in the hierarchical video decoding apparatus.

Referring to FIG. 15, the schematic configuration of the slice decoding unit 14 is described. FIG. 15 is a functional block diagram showing the schematic configuration of the slice decoding unit 14.

The slice decoding unit 14 includes a slice header decoding unit 141, a slice position setting unit 142, and a CTU decoding unit 144. The CTU decoding unit 144 further includes a predictive residue restoring unit 1441, a predictive image generating unit 1442, and a CTU decoded image generating unit 1443.

The slice header decoding unit 141 decodes the slice header on the basis of the input VCL NAL and parameter set, and outputs the decoded header to the slice position setting unit 142, a skip slice determining unit (not shown), and the CTU decoding unit 144.

The slice header includes information pertaining to the slice position in the picture (SH slice position information), and information pertaining to the skip slice (SH slice position information).

The slice header includes the flag of the leading slice in the picture (first_slice_segment_in_pic_flag) as the slice position information. When the flag of the leading slice in the picture is one, this flag indicates that the target slice is positioned at the head in the decoding order in the picture. When the flag of the leading slice in the picture is zero, this flag indicates that the target slice is not positioned at the head in the decoding order in the picture.

The slice header includes the slice PPS identifier (slice_pic_parameter_set_id) as the slice position information. The slice PPS identifier is the identifier of the PPS associated with the target slice. Through this PPS identifier, the tile information to be associated with the target slice is identified.

The slice position setting unit 142 identifies the slice position in the picture on the basis of the input slice header and tile information, and outputs the position to the CTU decoding unit 144. The slice position in the picture derived by the slice position setting unit 142 includes the position of each CTU included in the slice in the picture.

In a schematic view, the CTU decoding unit 144 performs decoding to obtain a decoded image in a region corresponding to each of CTUs included in the slices on the basis of the input slice header, the slice data, and the parameter set, thus generating the decoded image of the slice. The decoded image of the slice is output, as a part of the decoded picture, to the slice position indicated by the input slice position. The decoded image of CTU is generated by the predictive residue restoring unit 1441, the predictive image generating unit 1442 and the CTU decoded image generating unit 1443 in the CTU decoding unit 144. The predictive residue restoring unit 1441 decodes the predictive residue information (TT information) contained in the input slice data, and generates and outputs the predictive residue of the target CTU. The predictive image generating unit 1442 generates the predictive image on the basis of the prediction method and prediction parameters indicated by the predictive information (PT information) contained in the input slice data, and outputs the image. In this case, the decoded image of the reference picture and the coding parameter are used if necessary. The CTU decoded image generating unit 1443 adds the input predictive image to the predictive residue, and generates and outputs the decoded image of the target CTU.

The details of a predictive image generating process in the case where the inter-layer image prediction is selected, among the predictive image generating processes by the predictive image generating unit 1442 and described.

The process of generating the predictive pixel value of the target pixel included in the target CTU to which the inter-layer image prediction is applied is executed according to the following procedures. First, the reference picture position deriving process is executed to derive the corresponding reference position. Here, the corresponding reference position is a position on the reference layer that corresponds to the target pixel on the target layer picture. The pixels on the target layer and the reference layer do not necessarily correspond to each other on a one-to-one basis. Consequently, the corresponding reference position is represented in an accuracy less than units of pixels on the reference layer. Next, the derived corresponding reference position is received as an input, and an interpolation filter process is executed, thereby generating the predictive pixel value of the target pixel.

The corresponding reference position deriving process derives the corresponding reference position on the basis of the picture information, inter-layer pixel correspondence information, and scale adjustment information, which are included in the parameter set. The detailed procedures of the corresponding reference position deriving process are described with reference to FIG. 1. FIG. 1 is a flowchart of the corresponding reference position deriving process. The corresponding reference position deriving process is achieved by sequentially executing the processes specified in the following steps.

Step S101: The virtual reference layer correspondence region size is calculated on the basis of the target layer picture size, the reference layer picture size, the inter-layer pixel correspondence information, and the scale adjustment information.

The virtual reference layer correspondence region size, that is, the width VSRLW and the height VSRLH of the virtual reference layer correspondence region are calculated according to the following expressions.

VSRLW=currPicW−SRLLOffset+SRLAddLOffset−SRLROffset+SRLAddROffset, and
VSRLH=currPicH−SRLTOffset+SRLAddTOffset−SRLBOffset+SRLAddB Offset.

Here, currPicW and currPicH are the height and width of the target picture, and coincide with the respective syntax values, or pic_width_in_luma_samples and pic_height_in_luma_samples, included in the SPS picture information on the target layer, in case where the target of the corresponding reference position deriving process is a luma pixel. In the case where the target is a color-difference, values obtained by transforming the syntax values according to a type of color format are used. For example, when the color format is 4:2:2, values of half the syntax values are used. Here, rePicW and rePicH are the height and width of the reference picture, and coincide with the respective syntax values, or pic_width_in_luma_samples and pic_height_in_luma_samples, included in the SPS picture information on the reference layer, in the case where the target is a luma pixel.

SRLLOffset is a value of the extended reference layer left offset. SRLROffset is a value of the extended reference layer right offset. SRLTOffset is a value of the extended reference layer top offset. SRLBOffset is a value of the extended reference layer bottom offset.

SRLAddLOffset is a value of the extended reference layer left additional offset. SRLAddROffset is a value of the extended reference layer right additional offset. SRLAddTOffset is a value of the extended reference layer top additional offset. SRLAddBOffset is a value of the extended reference layer bottom additional offset.

According to the expression, the virtual reference layer correspondence region size is schematically calculated by summing the current picture size, the extended reference layer offset, and the extended reference layer additional offset.

Step S102: Next, the inter-layer scale horizontal component scaleX and the inter-layer scale vertical component scaleY are calculated, on the basis of the virtual reference layer correspondence region size derived in step S101, and of the virtual reference layer size included in the scale adjustment information, according to the following expressions.

scaleX=rlVirtualW÷VSRLW, and scaleY=rlVirtualH÷VSRLH, where rlVirtualW is the virtual reference layer width, and rlVirtualH is the virtual reference layer height. These width and height are included in the scale adjustment information decoded by the parameter set decoding unit 12. That is, the variable rlVirtualW is set to the value of rl_virtual_width[i]. The variable rlVirtualH is set to the value of rl_virtual_height[i].

According to the above expression, the inter-layer scale is schematically obtained by dividing the virtual reference layer size (the virtual reference layer width or the virtual reference layer height) by the virtual reference layer correspondence region size (the virtual reference layer correspondence region width or the virtual reference layer height). In other words, the inter-layer scale is calculated as the ratio between the inter-layer scale and the virtual reference layer correspondence region size.

Note that an approximate value of the division may be set as the value of the inter-layer scale. For example, the inter-layer scale (scaleIntX, scaleIntY) can be derived in an integer representations according to the following expressions.

scaleIntX=((rlVirtualW<<16)+(VSRLW>>1))/VSRLW, and scaleIntY=((rlVirtualH<<16)+(VSRLH>>1))/VSRLH, where the operator "/" represents the quotient of the division. The left shift operation "<<16" is a process for maintaining the accuracy of the integer representation of the calculated inter-layer scale. The operation is not necessarily limited to 16. Alternatively, a left shift operation with another positive integer value may be adopted.

Step S103: The reference position is calculated on the basis of the inter-layer pixel correspondence information and the inter-layer scale. The horizontal component xRef and the vertical component yRef of the reference position corresponding to the target layer pixel are calculated according to the following expressions. Note that xRef is a representation of the position of the reference layer picture in the horizontal direction with reference to the top left pixel of the reference layer picture, and yRef is a representation of the position in the vertical direction with reference to the same top left pixel. These representations are according to units of pixels of the reference layer picture.

xRef=(xP−SRLLOffset)*scaleX, and yRef=(yP−SRLTOffset)*scaleY, where xP and yP are representations of the horizontal component and the vertical component of the target layer pixel, respectively, with reference to the top left pixel of the target layer picture, in units of pixels of the target layer picture.

In the above expression, the value obtained by scaling, with the inter-layer size ratio, the position of the target pixel with reference to the top left pixel of the reference layer correspondence region is adopted as the reference position. The above calculation may be performed through an approximation operation in an integer representation. For example, the reference position xRef16 and yRef16 in 1/16-pixel accuracy can be calculated using the aforementioned scaleIntX and scaleIntY according to the following expressions.

xRef16=(xP−SRLLOffset)*scaleIntX+(1<<11))>>12, and yRef16=((yP−SRLTOffset)*scaleIntY+(1<<11))>>12. In the case where the target is the color-difference pixel, adjustment in consideration of the phase difference in luma and color-difference may be performed.

The corresponding reference position deriving process described above can derive the position on the reference layer corresponding to the target pixel on the target layer picture as the corresponding reference position. The corresponding reference position deriving process derives the inter-layer scale as the ratio between the virtual reference layer size derived based on the scale adjustment information and the virtual reference layer correspondence region size, instead of the ratio between the actual reference layer picture and the reference layer correspondence region size. Consequently, in the case of transforming the hierarchically coded data to be typified by region of interest extraction, the virtual reference layer size equal to the reference layer size in the hierarchically coded data before transformation, and the virtual reference layer correspondence region size equal to the reference layer correspondence region size in the hierarchically coded data before transformation can be derived when the hierarchically coded data after transformation is decoded, and the inter-layer scale can be derived. Consequently, the inter-layer scales before and after transformation can be maintained to have the same value.

The interpolation filter process generates the pixel value at the position equivalent to the corresponding reference position derived by the corresponding reference position deriving process by applying the interpolation filter to the decoded pixel of the pixel adjacent to the corresponding reference position on the reference layer picture.

The process in the predictive image generating unit 1442 of the hierarchical video decoding apparatus 1, and the processes described in variation examples 1 and 2 multiply the distance on the extended layer (target layer) by the inter-layer scale, and derive, as the reference position, the value where the unit is adjusted, in a schematic view. In the case where a phase difference equal to or less than an integer pixel is between the pixel on a specific reference layer and the pixel on the target layer, the reference position may be calculated by adding a parameter for adjusting the phase difference. For example, the reference position with 1/16-pixel accuracy exemplified in the description of the predictive image generating unit 1442 can be calculated according to the following expressions.

xRef16=((xP−SRLLOffset)*scaleIntX+addX+(1<<11))>>12, and yRef16=((yP−SRLTOffset)*scaleIntY+addY+(1<<11))>>12, where addX and addY are amounts corresponding to the deviations in phase in the vertical direction and the horizontal direction, and calculated using phaseX which is the phase difference in the vertical direction represented in 1/4-pixel accuracy and phaseY which is analogously the phase difference in the horizontal direction, according to the following expressions.

addX=(ScaleFactorX*phaseX+2)>>2, and addY=(ScaleFactorY*phaseY+2)>>2. When the target layer and the reference layer have a phase difference, a correct reference position can be calculated by deriving the reference position according to the above procedures.

The hierarchical video decoding apparatus 1 (hierarchical image decoding apparatus) according to this embodiment described above includes the parameter set decoding unit 12 that decodes the parameter set, and the predictive image generating unit 1442 that refers to the decoded pixel of the reference layer picture and generates the predictive image through the inter-layer prediction. The parameter set decoding unit 12 decodes the scale adjustment information. The predictive image generating unit 1442 derives the corresponding reference position to the pixel on the target layer, using the value of the inter-layer scale derived from the scale adjustment information.

Consequently, the hierarchical video decoding apparatus 1 can derive the same inter-layer scale before and after transformation even in the case of transforming the hierarchically coded data to be typified by the region of interest extraction. Thus, the correctness of the positional relationship between the higher layer pixel and the lower layer pixel is maintained in the transformed coded data, thereby reducing the predictive residue in the inter-layer prediction. Consequently, the coded data with a smaller amount of code is decoded, thereby allowing the decoded picture on the higher layer to be output.

In the description of the hierarchical video decoding apparatus 1, the example of calculating the inter-layer scale on the basis of the following parameters included in the scale adjustment information has been described.

A2TL: extended reference layer top left additional offset;

A2BR: extended reference layer bottom right additional offset; and

A3WH: virtual reference layer size.

Alternatively, parameters different from the above parameters may be decoded as the scale adjustment information from the parameter set, and the inter-layer scale may be calculated on the basis of the parameters. For example, the following parameters may be used.

A4S: alternative inter-layer scale;

A4Sd: alternative inter-layer scale difference;

A5WH: virtual reference layer correspondence region size;

A5WHd: virtual reference layer correspondence region size difference; and

A3WHd: virtual reference layer size difference.

The details of each parameter are hereinafter described.

The parameter set decoding unit 12 decodes the input target layer coded data to obtain scale adjustment information. For example, the scale adjustment information is included in the SPS extension, and decoded according to a syntax table shown in FIG. 16. FIG. 16 shows a part that is of the syntax table referred to by the parameter set decoding unit 12 during SPS decoding and pertains to the scale adjustment information.

The alternative inter-layer scale (A4S) is a parameter used to calculate the inter-layer scale. In a schematic view, the alternative inter-layer scale is used as the value of a direct inter-layer scale. The SPS includes alternative inter-layer scale horizontal component (alt_scale_x[i]) corresponding to a specific reference layer, and the alternative inter-layer scale vertical component (alt_scale_y[i]), as the alternative inter-layer scale. The subscript ([i]) of the array represents the sequential order of the parameter in the SPS. The alternative inter-layer scale with the subscript i is the alternative inter-layer scale in the case where the layer indicated by the scale adjustment reference layer identifier with the subscript i is adopted as the reference layer.

The scale deriving process in the predictive image generating unit 1442 calculates the inter-layer scale according to the procedures specified in the following steps.

Step S201: It is determined whether the alternative inter-layer scale is transmitted or not for the reference layer used for the inter-layer prediction. Furthermore, in the case where the scale adjustment reference layer identifier included in the scale adjustment information includes the layer identifier of the reference layer, it is determined that the alternative inter-layer scale has been transmitted. In other cases, it is determined that the alternative inter-layer scale has not been transmitted. In the case where the alternative inter-layer scale has been transmitted, the processing proceeds to step S202. In the case where the scale has not been transmitted, the processing proceeds to step S203.

Step S202: The inter-layer scale is set using the alternative inter-layer scale corresponding to the reference layer, and the processing is finished. The inter-layer scale is derived according to the following expressions.

scaleX=alt_scale_x[i], and scaleY=alt_scale_y[i], where in the case of the inter-layer identifier of the reference layer being ref_layer_id, i satisfies ref_layer_id=scale_adjust_ref_layer_id[i].

Step S203: The inter-layer scale is calculated as the ratio of the reference layer size to the reference layer correspondence region size, and the processing is finished. The inter-layer scale is calculated according to the following expressions.

scaleX=((rlW<<16)+(srlW>>1))/srlW, and scaleY=((rlH<<16)+(srlH>>1))/srlH, where rlW and rlH represent the width and height of the reference layer picture, respectively, and srlW and srlH represent the width and height of the reference layer correspondence region, respectively.

The ranges of the alternative inter-layer scale horizontal component and the alternative inter-layer scale vertical component are required to be equivalent to the inter-layer scale in the case without using the alternative inter-layer scale. In the case where the inter-layer scale is derived according to the expression described in the above procedure step S203, a configuration with the maximum width of the reference layer picture being rlMaxW causes the range of scaleX to be integers which are at least zero and equal to or less than (rlMaxW<<16). Consequently, the alternative inter-layer scale is required to be included in the parameter set with a code that can represent an equivalent range. In the case with a limitation that the scaling of the spatial scalability is at least one, the width rlW (height rlH) of the reference layer picture is at least the width srlW (height srlH) of the reference layer correspondence region. Consequently, the maximum amount of scaleX is achieved in the case where srlW is equal to rlW. In this case, scaleX=1<<16. Therefore, the range of the alternative inter-layer scale is limited to an integer of at least zero and (1<<16). Consequently, in such a case, it is preferred that the alternative inter-layer scale be included in the parameter set using a 16-bit fixed length code. In the case where the maximum amount of the scaling of the spatial scalability (the ratio of the resolution of the target layer to the resolution of the reference layer) is limited, the alternative inter-layer scale of the range corresponding to the limitation may be decoded and used. For example, in the case with a limitation that the spatial scalability has a scaling of four or less, the minimum amount of scaleX is achieved in the case of srlW is equal to (rlW<<4). In this case, scaleX=1<<12. Consequently, the range of scaleX is at least 1<<12 and equal to or less than 1<<16. Likewise, scaleY has an analogous range. In the case where the minimum amounts of scaleX and scaleY are set to minScale, values obtained by subtracting minScale from the values of the final alternative inter-layer scales may be coded as alt_scale_x[i] and alt_scale_y[i]. In this case, alternative inter-layer scales AltScaleX[i] and AltScaleY[i] to be actually used are derived from the alternative inter-layer scales alt_scale_x[i] and alt_scale_y[i] included in the coded data. In this case, the predictive image generating unit 1442 uses step S202' instead of step S202.

Step S202': The inter-layer scale is set using the alternative inter-layer scale corresponding to the reference layer, and the processing is finished. The inter-layer scale is derived according to the following expressions.

scaleX=alt_scale_x[i]+minScale, and scaleY=alt_scale_y[i]+minScale. The alternative inter-layer scale from which the value of minScale is subtracted is thus decoded from the SPS as described above, thereby allowing the range of the alternative inter-layer scale to be reduced. Consequently, the amount of code of the alternative inter-layer scale can be reduced.

In the case of using the alternative inter-layer scale, an advantageous effect of simplifying the inter-layer scale deriving process during decoding can be exerted in addition to the advantage that the inter-layer scales before and after transformation of the hierarchically coded data can be maintained.

The parameter set decoding unit 12 decodes the input target layer coded data to obtain scale adjustment information. For example, the scale adjustment information is included in the SPS extension, and decoded according to a syntax table shown in FIG. 17. FIG. 17 shows a part that is of the syntax table referred to by the parameter set decoding unit 12 during SPS decoding and pertains to the scale adjustment information.

The alternative inter-layer scale difference (A4Sd) are parameters used to calculate the inter-layer scale. In a schematic view, the final inter-layer scale is calculated by adding the alternative inter-layer scale difference to the inter-layer scale derived through the ratio between the reference layer correspondence region size and the reference layer size. The parameter set includes alternative inter-layer scale horizontal component difference (alt_scale_x_diff[i]) corresponding to a specific reference layer, and the alternative inter-layer scale vertical component difference (alt_scale_y_diff[i]), as the alternative inter-layer scale differences. The meaning of the subscript i is the same as that in the case of the alternative inter-layer scale.

The scale deriving process in the predictive image generating unit 1442 calculates the inter-layer scale according to the following expressions.

scaleX=(((rlW<<16)+(srlW>>1))/srlW)+alt_scale_x_diff [i], and scaleY=(((rlH<<16)+(srlH>>1))/srlH)+alt_scale_y_diff[i]. That is, the sum of the ratio between the reference layer correspondence region size and the reference layer size and the alternative inter-layer scale difference is set as the inter-layer scale.

The case of using the alternative inter-layer scale difference has an amount of operation more than that in the case of using the alternative inter-layer scale, but has an advantageous effect that the amount of code of the alternative inter-layer scale difference included in the SPS is smaller than that in the case of the alternative inter-layer scale. In general, in the case of performing region of interest extraction, transformation is performed so that the ratios between the reference layer correspondence region sizes and the reference layer sizes before and after transformation can have values close to each other. Consequently, the value of the alternative inter-layer scale difference is reduced. The alternative inter-layer scale difference can have a negative value. Consequently, it is preferred that the alternative inter-layer scale difference be included in the parameter set with a code which can represent any of positive and negative integers and with which a code value having a smaller length is assigned to a value having a smaller absolute value. For example, the horizontal and vertical components of the alternative inter-layer scale difference can be included in the parameter set (SPS or VPS) using the exp-Golomb coding (se(v)) for a signed integer defined in HEVC.

The minimum amount and maximum amount of the alternative inter-layer scale difference can be considered −1 and 1, respectively. Consequently, coding may be performed in a manner separating the flags alt_scale_x_diff_present_flag[i] and alt_scale_y_diff_present_flag[i] which indicate whether or not to use the alternative inter-layer scale difference instead of the alternative inter-layer scale difference alt_scale_x_diff[i] and alt_scale_x_diff[j], from the flags alt_scale_x_diff_sign_flag[i] and alt_scale_y_diff_sign_flag[i] which indicate the sign of the alternative inter-layer scale difference in the case of using the alternative inter-layer scale difference.

The scale deriving process in the predictive image generating unit 1442 calculates the inter-layer scale according to the following expressions.

scaleX=(((rlW<<16)+(srlW>>1))/srlW)+alt_scale_x_diff_present_flag[i] ? 1−alt_scale_x_diff_sign_flag[i]*2:0, and scaleY=(((rlH<<16)+(srlH>>1))/srlH)+alt_scale_y_diff_present_flag[i] ? 1−alt_scale_y_diff_sign_flag[i]*2:0, where "?" is a conditional operator, and the value "a?b:c" is b when a is true, and this value is c when a is false.

For example, the scale adjustment information in this case is included in the SPS extension, and decoded according to a syntax table shown in FIG. 18. FIG. 18 shows a part that is of the syntax table referred to by the parameter set decoding unit 12 during SPS decoding and pertains to the scale adjustment information.

The virtual reference layer correspondence region direct size (A5WH) is a parameter used to calculate the virtual reference layer correspondence region size used to calculate the inter-layer scale. In a schematic view, the virtual reference layer correspondence region direct size is directly used as the value of the virtual reference layer correspondence region size. The value of the inter-layer scale is calculated as the ratio of the virtual reference layer size to the virtual reference layer correspondence region size according to the same method as that of the process described on the predictive image generating unit 1442.

The parameter set includes the virtual reference layer correspondence region width (srl_virtual_width[i]) and the virtual reference layer correspondence region height (srl_virtual_height[i]) which correspond to the specific reference layer, as the virtual reference layer correspondence region direct size. The meaning of the subscript i is the same as that in the case of the alternative inter-layer scale. It is preferred that the virtual reference layer correspondence region width and height be coded in the parameter set with the same code as that of the height and width of the picture size.

The scale deriving process in the predictive image generating unit 1442 calculates the virtual reference layer correspondence region size according to the following expressions.

VSRLW=srl_virtual_width[i], and VSRLH=srl_virtual_height[i]. In the case where the virtual reference layer correspondence region direct size corresponding to the reference layer used for the inter-layer predictive image generating process does not exist in the parameter set, the value of the reference layer correspondence region size is used as the value of the virtual reference layer correspondence region direct size.

The case of using the virtual reference layer correspondence region direct size has an advantage of simplifying the process of deriving the virtual reference layer correspondence region size in comparison with the method described on the predictive image generating unit 1442.

The virtual reference layer correspondence region difference size (A5WHd) is a parameter used to calculate the virtual reference layer correspondence region size used to calculate the inter-layer scale. In a schematic view, the virtual reference layer correspondence region size is calculated by adding the virtual reference layer correspondence region difference size to the reference layer correspondence region size. The value of the inter-layer scale is calculated as the ratio of the virtual reference layer size to the virtual reference layer correspondence region size according to the same method as that of the process described on the predictive image generating unit 1442.

The parameter set includes the virtual reference layer correspondence region difference width (srl_virtual_width_diff[i]) and the virtual reference layer correspondence region difference height (srl_virtual_height_diff[i]) which correspond to the specific reference layer, as the virtual reference layer correspondence region difference size. The meaning of the subscript i is the same as that in the case of the alternative inter-layer scale.

The scale deriving process in the predictive image generating unit 1442 calculates the virtual reference layer correspondence region size according to the following expressions.

VSRLW=currPicW−SRLLOffset−SRLROffset+srl_virtual_width_diff[i], and VSRLH=currPicH−SRLTOffset−SRLBOffset+srl_virtual_height_diff[i]. In the case where the virtual reference layer correspondence region difference size corresponding to the reference layer used for the inter-layer predictive image generating process does not exist in the parameter set, both the width and height of the virtual reference layer correspondence region difference are set to zero. In this case, the virtual reference layer correspondence region size derived by the above expressions coincides with the reference layer correspondence region size.

The case of using the virtual reference layer correspondence region difference size has an advantage of simplifying the process of deriving the virtual reference layer correspondence region size in comparison with the method described on the predictive image generating unit 1442.

The virtual reference layer size difference (A3WHd) is a parameter used to calculate the virtual reference layer size used to calculate the inter-layer scale. In a schematic view, the virtual reference layer size is calculated by adding the virtual reference layer correspondence region size difference to the reference layer size. The value of the inter-layer scale is calculated as the ratio of the virtual reference layer size to the virtual reference layer correspondence region size according to the same method as that of the process described on the predictive image generating unit 1442.

The parameter set includes the virtual reference layer difference width (rl_virtual_width_diff[i]) and the virtual reference layer difference height (rl_virtual_height_diff[i]) which correspond to the specific reference layer, as the virtual reference layer size difference. The meaning of the subscript i is the same as that in the case of the alternative inter-layer scale.

The scale deriving process in the predictive image generating unit 1442 calculates the virtual reference layer correspondence region size according to the following expressions.

rlVirtualW=refPicW+rl_virtual_width_diff[i], and rlVirtualH=refPicH+rl_virtual_height_diff[i], where refPicW and refPicH correspond to the width and height of the reference layer picture size used for the predictive image generating process, respectively.

In the case where the virtual reference layer size difference corresponding to the reference layer used for the inter-layer predictive image generating process does not exist in the parameter set, both the width and height of the virtual reference layer size difference are set to zero. In this case, the virtual reference layer size derived by the above expressions coincides with the reference layer size.

The case of using the virtual reference layer correspondence region difference size has an advantage that can reduce the amount of code of the scale adjustment information in the parameter set, in comparison with the method of directly transmitting the virtual reference layer size described on the predictive image generating unit 1442.

The parameters pertaining to deriving of various types of inter-layer scales included in the scale adjustment information have thus been described. Preferable combinations of the parameters are herein listed.

First, the parameters pertaining to the inter-layer scale deriving, which have already been described above, are listed again.

A2TL: extended reference layer top left additional offset;
A2BR: extended reference layer bottom right additional offset;
A3WH: virtual reference layer size;
A3WHd: virtual reference layer size difference;
A4S: alternative inter-layer scale;
A4Sd: alternative inter-layer scale difference;
A5WH: virtual reference layer correspondence region size; and
A5WHd: virtual reference layer correspondence region size difference.

Next, preferable combinations of parameters that constitute the scale adjustment information are listed using the aforementioned symbols.

Comb1: A2TL, A2BR, A3WH;
Comb2: A2TL, A2BR, A3WHd;
Comb3: A5WH, A3WH;
Comb4: A5WH, A3WHd;
Comb5: A5WHd, A3WH;
Comb6: A5WHd, A3WHd;
Comb7: A4S; and
Comb8: A4Sd.

The scale adjustment information including any of the combinations of the parameters are included in the parameter set, which can achieve a function of maintaining the inter-layer scale before and after transformation of the hierarchically coded data.

The scale adjustment information described with reference to FIG. 11 in the description of the parameter set decoding unit 12 of the hierarchical video decoding apparatus 1 corresponds to the aforementioned Comb1.

The method of deriving the corresponding reference position using the scale adjustment information included in the parameter set in the predictive image generating unit 1442 of the hierarchical video decoding apparatus 1 has thus been described. The method is herein described that derives the corresponding reference position additionally using the inter-layer phase correspondence information transmitted for the sake of correcting the positional relationship between the higher layer pixel and the lower layer pixel in units less than an integer pixel.

The extended reference layer top left additional offset described with reference to FIG. 11 is used as the inter-layer phase correspondence information. In this case, the extended reference layer top left additional offset is a configuration element of the scale adjustment information and is also a configuration element of the inter-layer phase correspondence information.

The inter-layer scale is derived according to the method described on the predictive image generating unit 1442. Hereinafter, the description is made assuming that the inter-layer scales in integer representation (scaleIntX, scaleIntY) are used. The horizontal component xRef16 and the vertical component yRef16 of the corresponding reference position in $\frac{1}{16}$-pixel accuracy are calculated using the inter-layer scale according to the procedures specified in the following steps.

Step S401: xRefOrg16 and yRefOrg16 which correspond to the horizontal component and the vertical component of the corresponding reference position on the virtual reference layer picture, respectively, are derived according to the following expressions.

xRefOrg16=((xP−SRLLOffset+srl_add_left_offset[i])*scaleIntX+(1<<11))>>12, and
yRefOrg16=((yP−SRLTOffset+srl_add_top_offset[i])*scaleIntY+(1<<11))>>12.

According to the above expression, the value of $\frac{1}{16}$-pixel accuracy adjustment of the value obtained by multiplying the position in the horizontal direction of the target pixel on the target layer with reference to the top left pixel of the virtual reference layer correspondence region (xP−SRLLOffset+srl_add_left_offset[i]) by the horizontal component of the inter-layer scale (scaleIntX) is set in the horizontal component (xRefOrg16) of the corresponding reference position on the virtual reference layer picture. The vertical component is also set in an analogous manner.

Step S402: xRefOffset and yRefOffset, which correspond to the horizontal component and the vertical component of the position of the top left pixel of the reference layer picture, respectively, with reference to the top left pixel of the virtual reference layer picture are derived according to the following expressions.

xRefOffset=(srl_add_left_offset[i]*scaleIntX+(1<<15))>>16, and yRefOffset=(srl_add_top_offset[i]*scaleIntY+(1<<15))>>16.

According to the above expression, the value of one-pixel accuracy adjustment of the value obtained by multiplying the value of the extended reference layer left offset (srl_add_left_offset[i]) by the horizontal component of the inter-layer scale (scaleIntX) is set in the horizontal component (xRefOffset) of the top left pixel position of the reference layer picture. The vertical component is also set in an analogous manner.

Step S403: The horizontal component xRef16 and the vertical component yRef16 of the corresponding reference position in $\frac{1}{16}$-pixel accuracy are derived according to the following respective expressions.

xRef16=xRefOrg16−(xRefOffset<<4), and
yRef16=yRefOrg16−(yRefOffset<<4).

The corresponding reference position deriving process is thus finished.

The corresponding reference position deriving process described above derives the corresponding reference position using the scale adjustment information and the inter-layer phase correspondence information. Consequently, the inter-layer scale and the positional relationship between the pixel on the target layer and the pixel on the reference layer can be maintained before and after the transformation, even in the case of transforming the hierarchically coded data to be typified by the region of interest extraction.

Any of the combinations of various parameters described in Variation Example 1 may be used as the scale adjustment information in the case of deriving the corresponding reference position using the scale adjustment information and the inter-layer phase correspondence information. Among these alternatives, in particular, it is preferred to use Comb1 utilized in the above description or the scale adjustment information corresponding to Comb1, that is, the scale adjustment information that includes the extended reference layer top left additional offset and the extended reference layer top right additional offset. In this case, the extended reference layer top left additional offset can be shared by usage as the scale adjustment information and the usage as the inter-layer phase correspondence information. Consequently, the sharing has an advantage that the amount of code of the parameter set is small.

Figure 19:
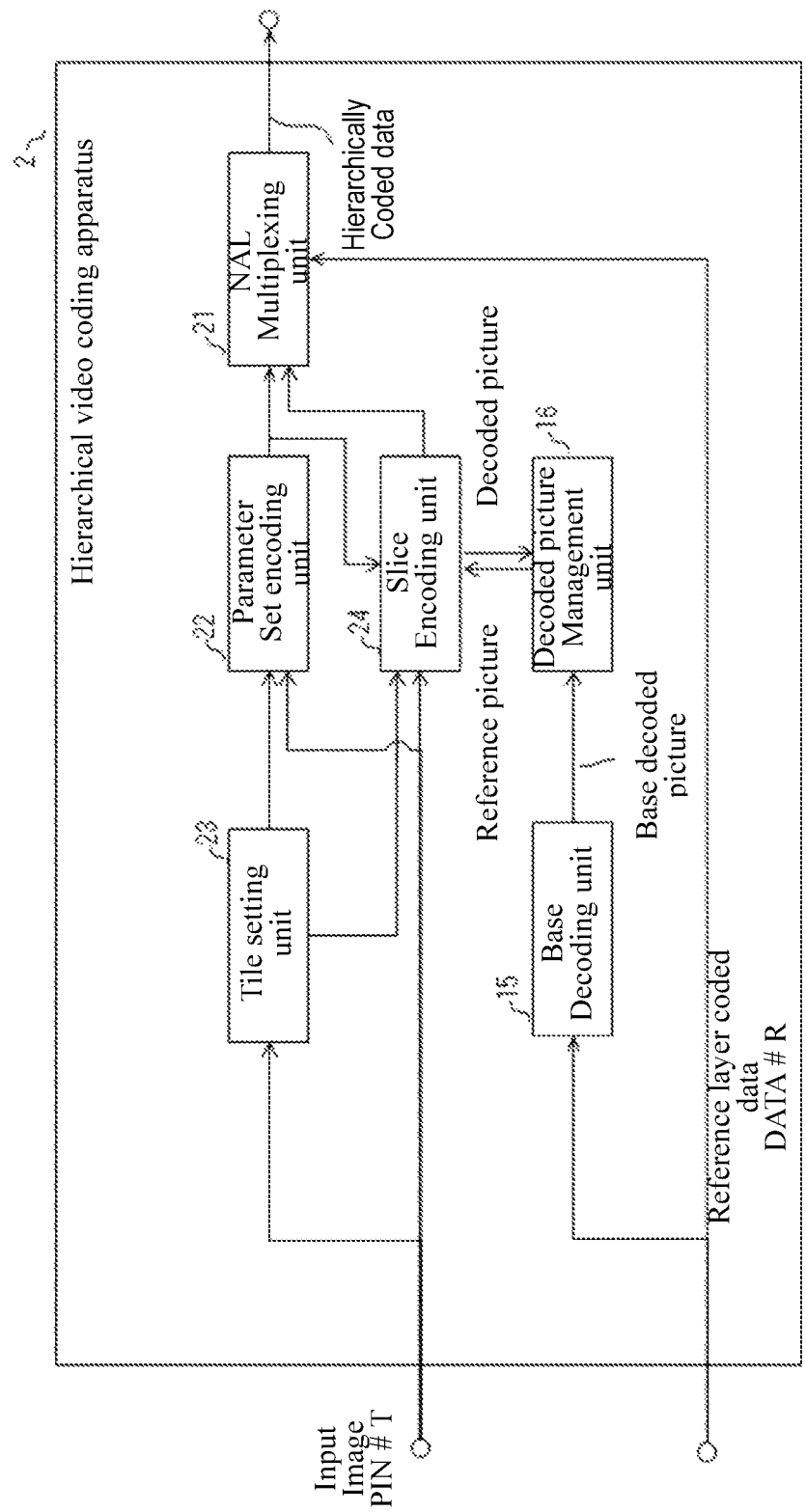
FIG. 19 is a functional block diagram showing the schematic configuration of a hierarchical video coding apparatus according to one embodiment of the present disclosure.

Referring to FIG. 19, the schematic configuration of the hierarchical video coding apparatus 2 is described. FIG. 19 is a functional block diagram showing the schematic configuration of the hierarchical video coding apparatus 2. The hierarchical video coding apparatus 2 codes the input image PIN#T on the target layer with reference to the reference layer coded data DATA#R, and generates the DATA on the target layer. It is assumed that the reference layer coded data DATA#R has been coded by the hierarchical video coding apparatus corresponding to the reference layer.

As shown in FIG. 19, the hierarchical video coding apparatus 2 includes an NAL multiplexing unit 21, a parameter set encoding unit 22, a tile setting unit 23, a slice encoding unit 24, a decoded picture management unit 16, and a base decoding unit 15.

The NAL multiplexing unit 21 stores, in the NAL unit, the input target layer coded data DATA#T and reference layer coded data DATA#R to thereby generate the hierarchical video coded data DATA, and outputs the data to the outside.

The parameter set encoding unit 22 sets the parameter sets (VPS, SPS and PPS) used to code the input image on the basis of the input tile information and the input image, packetizes the set as a part of the target layer coded data DATA#T in a form of VCL NAL, and supplies the data to the NAL multiplexing unit 21.

The parameter set coded by the parameter set encoding unit 22 includes at least picture information, display region information, and scale adjustment information, which have been described in relation to the hierarchical video decoding apparatus 1.

The tile setting unit 23 sets the tile information on the picture on the basis of the input image, and supplies the information to the parameter set encoding unit 22 and the slice encoding unit 24. For example, tile information is set that represents that the picture size is split into M×N tiles. Here, M and N are freely selected positive integers.

The slice encoding unit 24 codes a part of the input image corresponding to the slice constituting the picture on the basis of the input image to be input, the parameter set, the tile information, and the reference picture recorded in the decoded picture management unit 16, generates the coded data for the portion, and supplies the data as a part of the target layer coded data DATA#T to the NAL multiplexing unit 21. The details of the slice encoding unit 24 are described later.

The decoded picture management unit 16 is the same configuration element as the decoded picture management unit 16 included in the hierarchical video decoding apparatus 1, having been described above. However, the decoded picture management unit 16 included in the hierarchical video coding apparatus 2 is not required to output a picture recorded in an internal DPB as an output picture. Consequently, such output may be omitted. The description of "decoding" with respect to the decoded picture management unit 16 of the hierarchical video decoding apparatus 1 is replaced with "coding", which is applicable to the decoded picture management unit 16 of the hierarchical video coding apparatus 2.

The base decoding unit 15 is the same configuration element as that of the base decoding unit 15 included in the hierarchical video decoding apparatus 1. The detailed description of this element is omitted.

Figure 20:
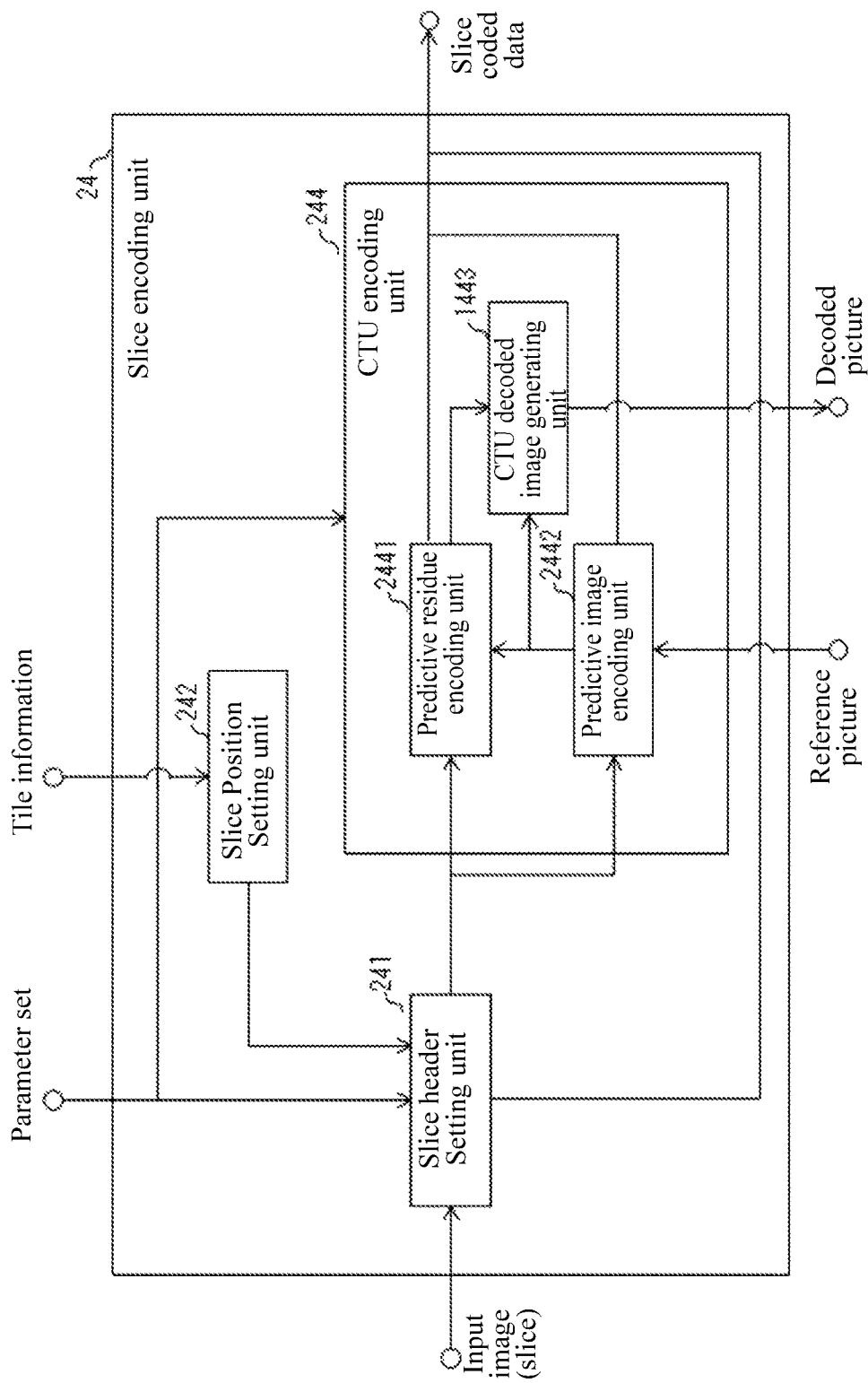
FIG. 20 is a functional block diagram exemplifying a configuration of a slice encoding unit included in the hierarchical video coding apparatus.

Referring to FIG. 20, the details of the configuration of the slice encoding unit 24 are described. FIG. 20 is a functional block diagram showing the schematic configuration of the slice encoding unit 24.

As shown in FIG. 20, the slice encoding unit 24 includes a slice header setting unit 241, a slice position setting unit 242, and a CTU encoding unit 244. The CTU encoding unit 244 internally includes a predictive residue encoding unit 2441, a predictive image encoding unit 2442, and a CTU decoded image generating unit 1443.

The slice header setting unit 241 generates a slice header used to code the input data that is input in units of slices, on the basis of the input parameter set and the slice position information. The generated slice header is output as a part of the slice coded data, and supplied to the CTU encoding unit 244 together with the input data.

The slice header generated by the slice header setting unit 241 includes at least SH slice position information.

The slice position setting unit 242 determines the slice position in the picture on the basis of the input tile information, and outputs the position to the slice header setting unit 241.

The CTU encoding unit 244 codes the input image (target slice part) in units of CTUs, on the basis of the input parameter set and slice header, generates the slice data corresponding to the target slice, and the decoded image (decoded picture), and outputs these items. CTU coding is performed by the predictive image encoding unit 2442, the predictive residue encoding unit 2441, and the CTU decoded image generating unit.

The predictive image encoding unit 2442 determines the predictive scheme and the prediction parameter of the target CTU included in the target slice, generates the predictive image on the basis of the determined predictive scheme, and supplies the image to the predictive residue encoding unit 2441 and the CTU decoded image generating unit 1443. Information on the predictive scheme and the prediction parameter is variable-coded as PT information, and output as slice data included in the slice coded data. The predictive schemes selectable by the predictive image encoding unit 2442 include at least inter-layer image prediction.

In the case where the inter-layer image prediction is selected as the predictive scheme, the predictive image encoding unit 2442 performs the corresponding reference position deriving process to determine the pixel position on the reference layer corresponding to the prediction target pixel, and in turn determines the predictive pixel value through an interpolation process based on this position. Each of the process described on the predictive image generating unit 1442 of the hierarchical video decoding apparatus 1 can be applied as the corresponding reference position deriving process. For example, the process of deriving the corresponding reference pixel is applied on the basis of the scale adjustment information which is included in the parameter set and has been described with reference to FIG. 1.

The predictive residue encoding unit 2441 outputs, as a part of the slice data included in the slice coded data, quantization transform coefficients (TT information) obtained by transforming and quantizing the difference between the input image and the predictive image, having been input. The predictive residue is restored by applying inverse transformation and inverse quantization to the quantization transform coefficients, and the restored predictive residue is output to the CTU decoded image generating unit 1443.

The CTU decoded image generating unit 1443 has the same function as the configuration element of the hierarchical video decoding apparatus 1 having the identical name. Consequently, the identical symbol is assigned and the description thereof is omitted.

The hierarchical video coding apparatus 2 (hierarchical image coding apparatus) according to this embodiment described above includes the parameter set encoding unit 22 that codes the parameter set, and the predictive image encoding unit 2442 that refers to the decoded pixel of the reference layer picture and generates the predictive image through the inter-layer prediction. The parameter set encoding unit 22 codes the scale adjustment information. The predictive image encoding unit 2442 derives the reference position corresponding to the pixel on the target layer using the inter-layer scale value derived from the scale adjustment information.

Consequently, the hierarchical video coding apparatus 1 can generate the coded data capable of deriving the same inter-layer scale before and after transformation even in the case of transforming the hierarchically coded data to be typified by the region of interest extraction. Thus, the correctness of the positional relationship between the higher layer pixel and the lower layer pixel is maintained in the transformed coded data, thereby reducing the predictive residue in the inter-layer prediction. Consequently, the coded data with a smaller amount of code can be generated.

Figure 21:
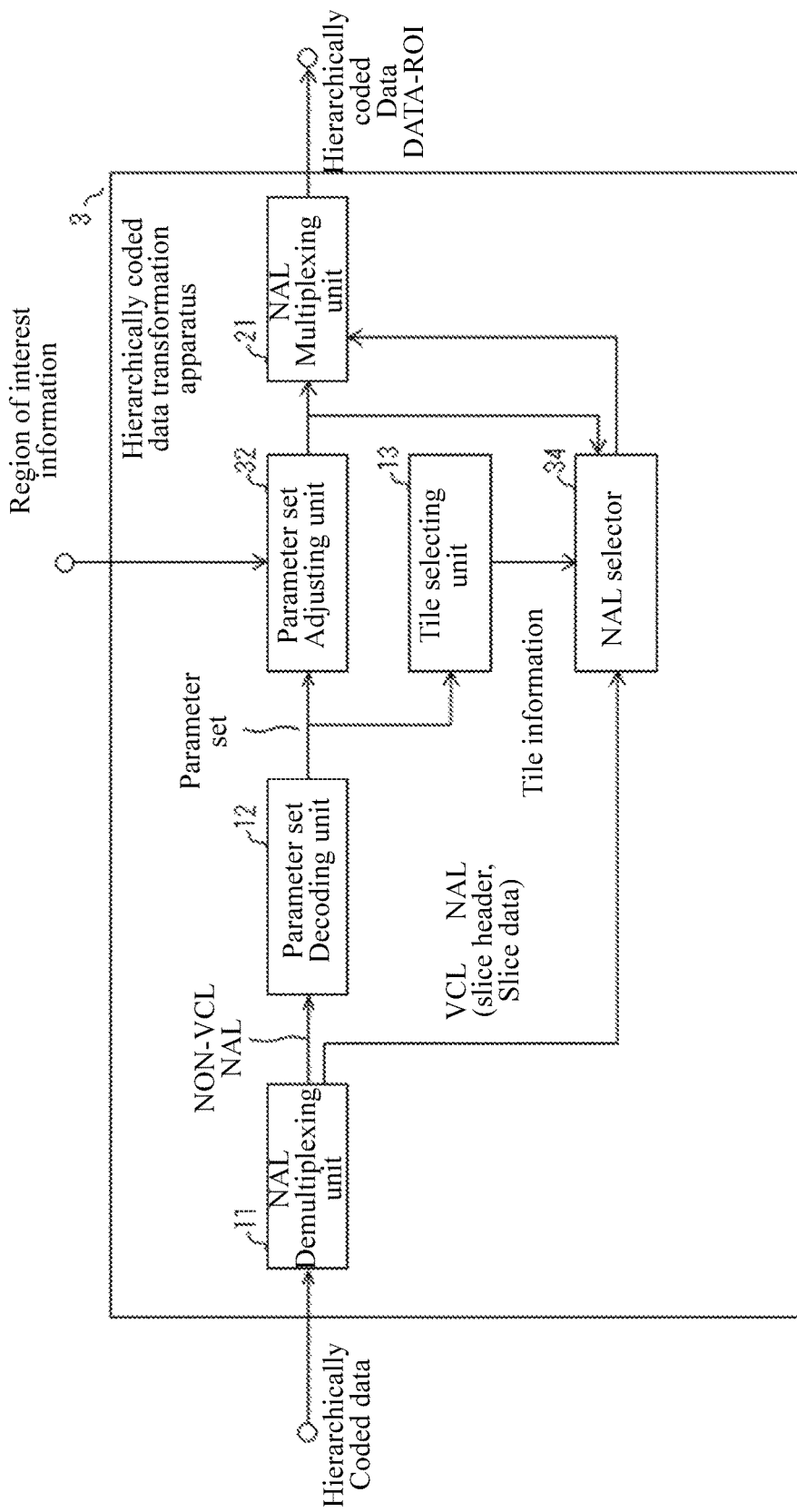
FIG. 21 is a functional block diagram showing a schematic configuration of a hierarchical coded data transformation apparatus according to one embodiment of the present disclosure.

Referring to FIG. 21, a schematic configuration of a hierarchical coded data transformation apparatus 3 is described. FIG. 21 is a functional block diagram showing the schematic configuration of hierarchical coded data transformation apparatus 3. The hierarchical coded data transformation apparatus 3 transforms the input DATA, and generates hierarchically coded data DATA-ROI pertaining to the input region of interest information. The DATA is the hierarchically coded data generated by the hierarchical video coding apparatus 2. Input of the hierarchically coded data DATA-ROI into the hierarchical video decoding apparatus 1 allows a video on a higher layer pertaining to the region of interest information to be reproduced.

As shown in FIG. 21, the hierarchical coded data transformation apparatus 3 includes an NAL demultiplexing unit 11, an NAL multiplexing unit 21, a parameter set decoding unit 12, a tile setting unit 13, a parameter set adjusting unit 32, and an NAL selector 34.

The NAL demultiplexing unit 11, the parameter set decoding unit 12, and the tile setting unit 13 have the same functions as the configuration elements which are included in the hierarchical video decoding apparatus 1 and have the identical names. Consequently, the identical symbols are assigned and the description thereof is omitted.

The NAL multiplexing unit 21 has the same function as the configuration element which is included in the hierarchical video coding apparatus 2 and has the identical name. Consequently, the identical symbol is assigned and the description thereof is omitted.

The parameter set adjusting unit 32 adjusts the input parameter set information on the basis of the input region of interest information and tile information, and outputs the information. In a schematic view, the parameter set adjusting unit 32 adjusts the picture information, the display region information, the inter-layer pixel correspondence information, the scale adjustment information, and the PPS tile information, which are included in the parameter set.

The region of interest information is a partial region of a picture designated by a user (e.g., a viewer of a reproduced video) in pictures constituting a video. The region of interest information is designated by a rectangular region, for example. In this case, for example, positional offsets of the top side, bottom side, left side or right side of the rectangle representing the region of interest from the corresponding sides (the top side, bottom side, left side or right side) of the entire picture can be designated as the region of interest information. A region having a shape other than a rectangle (e.g., a circle, polygon, a region representing an object extracted through object extraction) can be used as the region of interest. In the following description, the rectangular region of interest is assumed for the sake of simplifying the description. In the case of application of the details described below to a region other than a rectangle, a rectangle that involves the region of interest and has the minimum area can be regarded as the region of interest and applied, for example.

Figure 22:
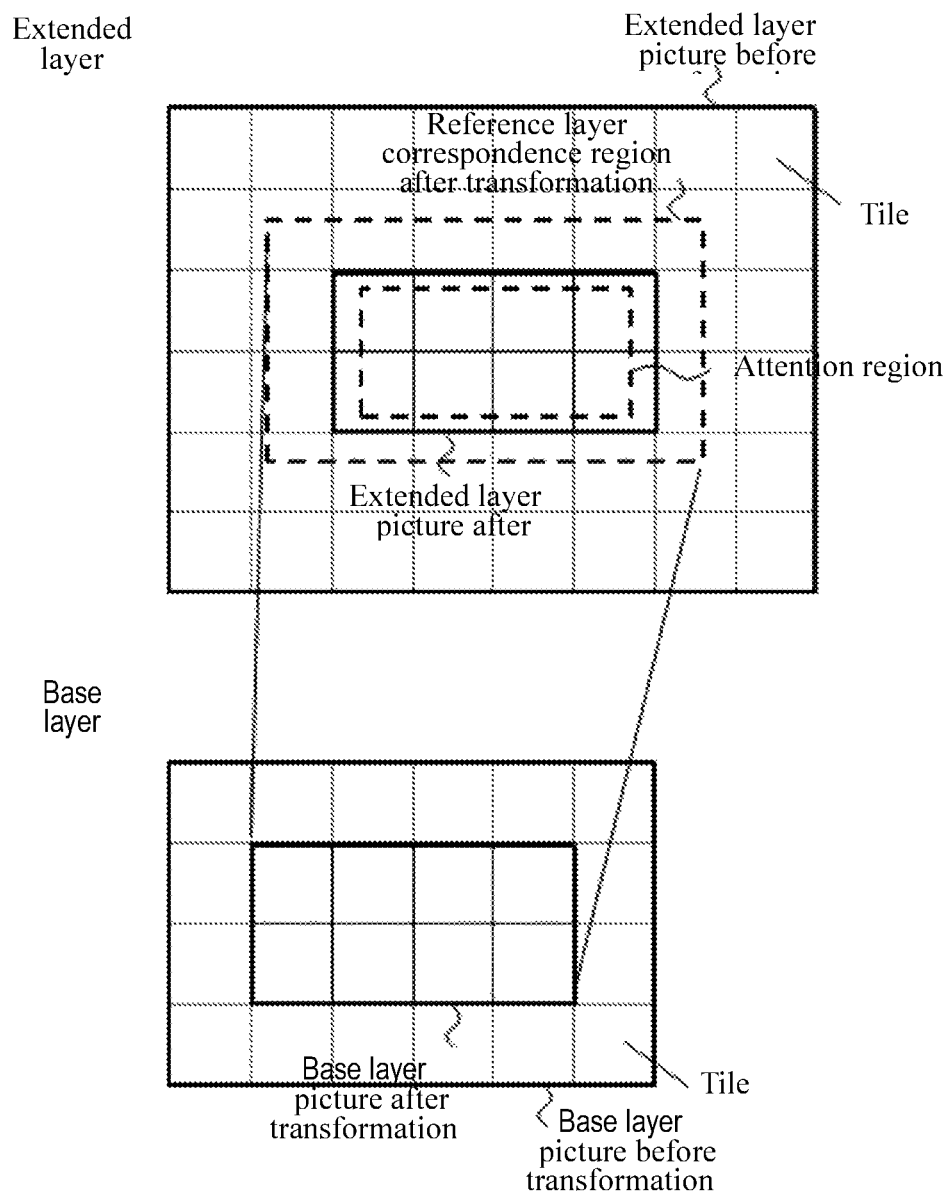
FIG. 22 is a diagram exemplifying the relationship between the picture, the region of interest, and the tiles before and after transformation.

First, an overview of parameter set adjustment through the transform process by the hierarchical coded data transformation apparatus 3 is described with reference to FIG. 22. FIG. 22 is a diagram exemplifying the relationship between the picture, the region of interest, and the tiles before and after transformation. FIG. 22 shows the relationship between pictures before and after transformation in the case of transforming the hierarchically coded data (hierarchically coded data before transformation) including two layers, which are the extended layer and the base layer, and the hierarchically coded data (hierarchically coded data after transformation) including the region of interest. The extended layer of the hierarchically coded data before transformation is data corresponding to an extended layer picture before transformation. The base layer is data corresponding to a base layer picture before transformation. Likewise, the extended layer of the hierarchically coded data after transformation is data corresponding to an extended layer picture after transformation. The base layer is data corresponding to a base layer picture after transformation.

In a schematic view, the hierarchical coded data transformation apparatus 3 removes, from input hierarchically coded data before transformation, tiles that does not have a region overlapping with the region of interest on the extended layer, and adjusts the related parameter set, thereby generating the hierarchically coded data after transformation. The hierarchical video decoding apparatus can receive the hierarchically coded data after transformation as an input, and generate the decoded image pertaining to the region of interest.

The parameter set adjusting unit 32 refers to the input region of interest information and tile information, and updates the PPS tile information on the extended layer such that the corresponding part of the region can include only the tile (extraction target tile) overlapping with the region of interest. The PPS tile information on the extended layer is updated on the basis of the extraction target tile information. In the case with one extraction target tile, tiles_enabled_flag is adjusted to zero. In the case of at least two extraction target tiles, the adjustment process can be omitted. Next, the (num_tile_columns_minus1) representing the number of tile rows, and (num_tile_rows_minus1) representing the number of tile columns are adjusted on the basis of the numbers of extraction target tiles included in the horizontal direction and the vertical direction of the picture. Next, in the case where the tile size is not uniform (uniform_spacing_flag is zero), the bit sequence corresponding to the syntax that pertains to the width of the tile column with no extraction target tile and the height of the tile row with no extraction target tile is removed from the parameter set.

In addition, the parameter set adjusting unit 32 removes tiles unnecessary for decoding the tile extracted on the extended layer from among tiles included in the extended layer picture before transformation. For example, the PPS tile information on the base layer is updated such that the region (reference layer correspondence region after transformation) on the extended layer corresponding to the base layer picture after transformation can involve the extended layer picture after transformation.

The parameter set adjusting unit 32 regards the region corresponding to the set of the extraction target tiles on the extended layer as the extended layer picture size after transformation, and adjusts the picture information. The width and height of the extended layer picture after transformation are regarded as the values of pic_width_in_luma_samples and pic_height_in_luma_samples, respectively, on the extended layer SPS.

In addition, the parameter set adjusting unit 32 regards the region corresponding to the set of the extraction target tiles on the base layer as the base layer picture size after transformation, and adjusts the picture information. The width and height of the base layer picture after transformation are regarded as the values of pic_width_in_luma_samples and pic_height_in_luma_samples, respectively, on the base layer SPS.

The parameter set adjusting unit 32 adjusts the inter-layer pixel correspondence information included in the parameter set in consideration of the change in picture size. Furthermore, all the inter-layer pixel correspondence offsets included in the inter-layer pixel correspondence information are adjusted. The extended reference layer left offset (scaled_ref_layer_left_offset[i]) that constitutes the inter-layer pixel correspondence offset is set to a value corresponding to the distance between the top left pixel of the reference layer correspondence region after transformation and the top left pixel of the extended layer picture after transformation. For example, when the reference layer correspondence region after transformation involves the extended layer picture after transformation, the extended reference layer left offset is set to have a negative value. When the unit for the extended reference layer left offset is two-pixel unit, the extended reference layer left offset is set to have a negative integer whose absolute value is a value in two-pixel unit representation of the distance. Likewise, the values of the other extended reference layer offsets that correspond to the top, right and bottom are set in an analogous manner.

The parameter set adjusting unit 32 adjusts the scale adjustment information included in the parameter set in consideration of the change in picture size. In a schematic view, the scale adjustment information is updated so that the inter-layer scales derived during decoding the hierarchically coded data before and after transformation coincide with each other.

For example, in the case of deriving the inter-layer scale as the ratio between the virtual reference layer correspondence region size and the virtual reference layer size, the scale is corrected such that the virtual reference layer correspondence region size can coincide with the size of the extended layer picture before transformation, and the virtual reference layer size can coincide with the size of the extended layer picture before transformation.

For example, as the scale adjustment information, in case of using the definition described with reference to FIG. 11, the value corresponding to the distance between the top left pixel of the extended layer picture before transformation and the top left pixel of the reference layer correspondence region after transformation is set as the value of the extended reference layer top left additional offset. Likewise, the value corresponding to the distance between the bottom right pixel of the extended layer picture before transformation and the bottom right pixel of the reference layer correspondence region after transformation is set as the value of the extended reference layer bottom right additional offset. The width and height of the virtual reference layer width are set to the width and height of the extended layer picture before transformation, respectively.

The parameter set adjusting unit 32 rewrites the display region information of SPS included in the input parameter set in order to coincide with the region of interest indicated by the input region of interest information. The display region information is rewritten according to the procedures specified in the following steps.

Step S301: It is determined whether the region of interest coincides with the entire picture or not. In the case with coincidence, the processing proceeds to step S302. In the case without coincidence, the processing proceeds to step S303.

Step S302: When the value of the display region flag having not been overwritten is one, the value of the display region flag is overwritten to zero, and the display region offsets (conf_win_left_offset, conf_win_right_offset, conf_win_top_offset, conf_win_bottom_offset) are removed from the SPS, and then the processing is finished.

Step S303: The value of the display region flag is overwritten to one. The display region offsets are set to the values of positional offsets from the respective corresponding sides of the rectangular picture representing the region of interest. For example, the positional offset from the top side of the picture of the top side of the region of interest is set to the value of the display region top offset (conf_win_top_offset). When the value of the display region flag having not been rewritten is one, the original value of the region of interest offset is overwritten with the value of the set region of interest offset. When the value of the display region flag having not been rewritten is one, the set region of interest offset is inserted immediately after the display region flag of the SPS.

The NAL selector 34 selects the input VCL NAL on the basis of the input region of interest information and tile information. The VCL NAL having been selected is sequentially output to the NAL multiplexing unit 21. The VCL NAL having not been selected is discarded.

The VCL NAL selected by the NAL selector 34 is a VCL NAL that includes a slice header and slice data that pertain to the slice included in the extraction target tile. The NAL selector 34 determines whether the slice is included in the extraction target tile or not on the basis of the slice address included in the slice header and the tile information. When the slice is included, the VCL NAL including this slice is selected. When the slice is not included, the VCL NAL is discarded.

The hierarchical coded data transformation process by the hierarchical coded data transformation apparatus 3 is achieved through sequentially executing procedures described in the following steps.

Step S501: The NAL demultiplexing unit 11 demultiplexes the input hierarchically coded data DATA. The part pertaining to the parameter set (non-VCL NAL) is output to the parameter decoding unit 12. The VCL NAL which is a part pertaining to the slice layer (the slice header and the slice data) is output to the NAL selector 34.

Step S502: The parameter set decoding unit 12 decodes the input non-VCL NAL to obtain the parameter sets (VPS, SPS and PPS), and supplies the sets to the parameter set adjusting unit 32 and the tile setting unit 13.

Step S503: The tile setting unit 13 derives the tile information from the input parameter set, and outputs the information to the parameter set adjusting unit 32 and the NAL selector 34.

Step S504: The parameter set adjusting unit 32 adjusts the input parameter set information on the basis of the input region of interest information and tile information, and outputs the information.

Step S505: The NAL selector 34 selects a part of the input VCL NALs on the basis of the input tile information and region of interest information, and outputs the selected VCL NAL to the NAL multiplexing unit 21.

Step S506: The NAL multiplexing unit 21 adopts the input adjusted parameter set, and the adjusted slice header and slice data as the adjusted coded data on the target layer, multiplexes the adopted items with the input reference layer coded data DATA#R, and outputs the multiplexed data as the hierarchically coded data DATA-ROI to the outside.

The hierarchical coded data transformation apparatus 3 according to this embodiment described above includes the NAL selector 34 that adjusts a part of the coded data (VCL NAL) on the video layer included in the coded data on the target layer (higher layer) on the basis of the region of interest information, and the parameter set adjusting unit 32. The NAL selector 34 selects the region overlapping with the region of interest as the extraction target tile on the basis of the region of interest indicated by the region of interest information. The coded data on the video layer pertaining to the slice included in the selected extraction target tile is contained in the transformed hierarchically coded data. The parameter set adjusting unit 32 adjusts the picture information, the PPS tile information, the display information, the inter-layer pixel correspondence information, and the scale adjustment information on the basis of the region of interest information and the tile information.

The hierarchical coded data transformation apparatus 3 described above can transform the input hierarchically coded data, extracts the VCL NAL pertaining to the extraction target tile (the tile having a region overlapping with the region of interest) on the higher layer, and constitute the transformed hierarchically coded data. The VCL NAL pertaining to the tile that does not have the region overlapping with the region of interest is discarded. Consequently, the hierarchically coded data having been transformed has a smaller amount of code than the hierarchically coded data having not been transformed. The hierarchical coded data transformation apparatus 3 adjusts the picture information, the PPS tile information, and the display information so as to cause the parameter set to conform with the extraction target tile. The transformed hierarchically coded data can be decoded by the hierarchical video decoding apparatus, and the decoded picture pertaining to the region of interest can be displayed. In addition, the inter-layer pixel correspondence information and the scale adjustment information are adjusted. Thus, the inter-layer scale, and the correspondence relationship between the higher layer pixel and the reference layer pixel are maintained in the hierarchically coded data before and after transformation. Consequently, the predictive image through the inter-layer prediction generated by the coded data having not been transformed, and the predictive image through the inter-layer prediction generated by the coded data having been transformed can be maintained to have a certain similarity.

The system that displays the region of interest information (region of interest display system SYS) can be configured by combining the aforementioned hierarchical video decoding apparatus 1, hierarchical video coding apparatus 2 and hierarchical coded data transformation apparatus 3.

Figure 23:
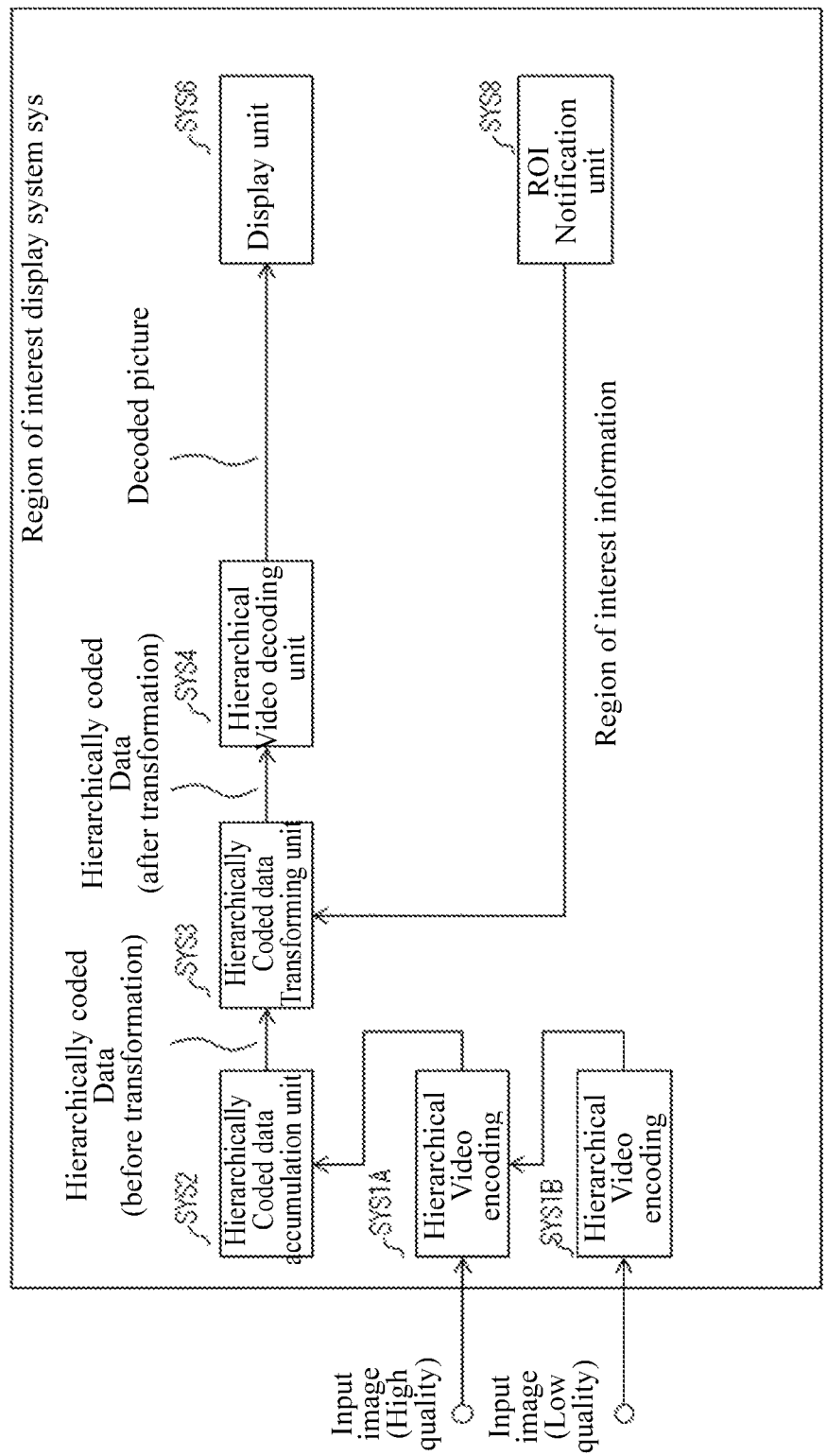
FIG. 23 is a block diagram showing a configuration of a region of interest display system achieved by combining the hierarchical video decoding apparatus, the hierarchical video coding apparatus and the hierarchical coded data transformation apparatus.

Referring to FIG. 23, description is made that indicates that the combination of the aforementioned hierarchical video decoding apparatus 1, hierarchical video coding apparatus 2 and hierarchical coded data transformation apparatus 3 can constitute the region of interest display system. FIG. 23 is a block diagram showing the configuration of the region of interest display system achieved by combining the hierarchical video decoding apparatus 1, the hierarchical video coding apparatus 2 and the hierarchical coded data transformation apparatus 3. In a schematic view, the region of interest display system SYS hierarchically codes input images with different qualities and accumulates the coded images, transforms the accumulated hierarchically coded data and supplies the data according to the region of interest information from the user, and decodes the transformed hierarchically coded data, thereby displaying the reproduced image with a high quality pertaining to the region of interest (ROI).

As shown in FIG. 23, the region of interest display system SYS includes, as configuration elements a hierarchical video encoding unit SYS1A, a hierarchical video encoding unit SYS1B, a hierarchically coded data accumulation unit SYS2, a hierarchically coded data transforming unit SYS3, a hierarchical video decoding unit SYS4, a display unit SYS6, and an ROI notification unit SYS8.

The hierarchical video coding apparatus 2 described above can be utilized as the hierarchical video decoding units SYS1A and SYS1B.

The hierarchically coded data accumulation unit SYS2 accumulates the hierarchically coded data, and supplies the hierarchically coded data according to a request. A computer that includes a recording medium (a memory, a hard disk, and an optical disk) can be utilized as the hierarchically coded data accumulation unit SYS2.

The hierarchically coded data transforming unit 3 described above can be utilized as the hierarchically coded data transforming unit SYS3. Consequently, the hierarchically coded data transforming unit SYS3 can set the scale information included in the input hierarchically coded data to an appropriate value in conformity with the input region of interest.

The hierarchical video decoding apparatus 1 described above can be utilized as the hierarchical video decoding unit SYS4. Consequently, the hierarchical video decoding unit SYS4 can decode the scale information from the parameter set, and execute the inter-layer prediction with reference to the scale information.

The display unit SYS6 displays the decoded image at a predetermined display position in a predetermined display region. For example, the display region is a television screen. The display position is the entire screen. It is preferred that the display unit SYS6 enlarge or reduce the input decoded image to have a size coinciding with the size of the display region, and display the image.

The ROI notification unit SYS8 notifies the region of interest information designated by the user, according to a predetermined method. For example, the user can transmit the region of interest to the ROI notification unit by designating the region corresponding to the region of interest in the display region where the entire display image is displayed. Without designation by the user, the ROI notification unit SYS8 notifies the information indicating absence of the region of interest as the region of interest information.

The process by the region of interest display system can be divided into a process of generating and accumulating the hierarchically coded data, and a process of generating and reproducing the region of interest data.

The process of generating and accumulating the hierarchically coded data generates the hierarchically coded data from input images with different qualities and accumulates the data. The process of generating and accumulating the hierarchically coded data is performed according to procedures specified in the following steps.

Step T101: The hierarchical video encoding unit SYS1B codes the input image with a low quality, and supplies the generated hierarchically coded data to the hierarchical video decoding unit SYS1A. That is, the hierarchical video encoding unit SYS1B generates the hierarchically coded data that is to be used as the reference layer (lower layer) in the hierarchical video decoding unit SYS1A from the input image, and outputs the data.

Step T102: The hierarchical video decoding unit SYS1A adopts the input hierarchically coded data as the coded data on the reference layer, codes the input image with a high quality, generates the hierarchically coded data, and outputs the data to the hierarchically coded data accumulation unit SYS2.

Step T103: The hierarchically coded data accumulation unit SYS2 assigns an appropriate index to the input hierarchically coded data, and records the data in the internal recording medium.

The process of generating and reproducing the region of interest data reads the hierarchically coded data from the hierarchically coded data accumulation unit SYS2, transforms the hierarchically coded data corresponding to the region of interest, decodes the transformed hierarchically coded data, and reproduces and displays the data. The process of generating and reproducing the region of interest data is executed according to the procedures specified in the following steps.

Step T201: The hierarchically coded data pertaining to the video selected by the user is supplied from the hierarchically coded data accumulation unit SYS2 to the hierarchically coded data transforming unit SYS3.

Step T202: The ROI notification unit SYS8 notifies the hierarchically coded data transforming unit SYS3 of the region of interest information designated by the user.

Step T203: The hierarchically coded data transforming unit SYS3 transforms the input hierarchically coded data on the basis of the input region of interest information, and outputs the data to the hierarchical video decoding unit SYS4.

Step T204: The hierarchical video decoding unit SYS4 decodes the input hierarchical video coded data (after transformation), and outputs the obtained decoded picture on the higher layer to the display unit SYS6.

Step T205: The display unit SYS6 displays the input decoded image.

The region of interest display system SYS according to this embodiment includes a ROI notification unit SYS8 that supplies the ROI information, a hierarchically coded data transforming unit SYS3 that transforms the hierarchically coded data on the basis of the ROI information, and generates the hierarchically coded data after transformation, a hierarchical video decoding unit SYS4 that decodes the hierarchically coded data after transformation, and outputs the decoded pictures on the higher layer and the lower layer, and a display unit SYS6.

The region of interest display system SYS can display the decoded picture in the region designated by the ROI information. Here, the decoded picture in the region designated by the ROI information is decoded from the higher layer coded data in the hierarchically coded data, using the inter-layer image prediction that uses the inter-layer scale derived on the basis of the scale adjustment information. Consequently, the image quality is high. In addition, the hierarchically coded data transformed on the basis of the region of interest has a smaller amount of code than the hierarchically coded data having not been transformed. Consequently, use of the region of interest display system SYS can reproduce the decoded picture with a high quality pertaining to the ROI while reducing the band required to transmit the hierarchically coded data.

The aforementioned hierarchical video coding apparatus 2 and the hierarchical video decoding apparatus 1 can be used in a manner mounted on various apparatuses for video transmitting, receiving, recording and reproducing. The video may be natural video taken by a camera and the like, and artificial video (computer generated (CG) and graphical user interface (GUI)) generated by a computer and the like.

Figure 24A:
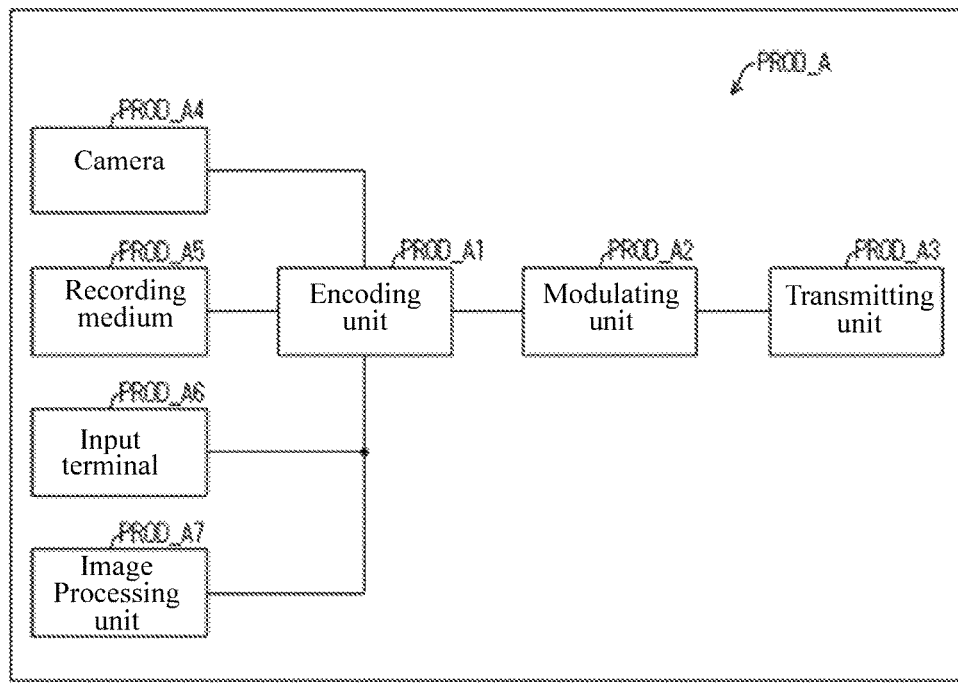
FIG. 24A and FIG. 24B diagrams are showing configurations of a transmitting apparatus mounted with the hierarchical video coding apparatus, and a receiving apparatus mounted with the hierarchical video decoding apparatus.
Figure 24B:
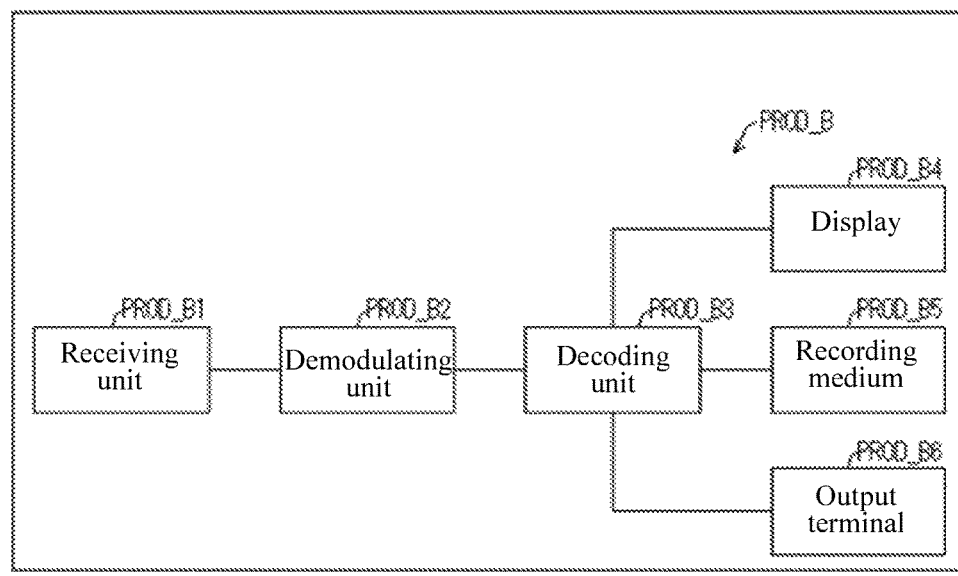

Referring to FIG. 24A and FIG. 24B, they are described that the aforementioned hierarchical video coding apparatus 2 and the hierarchical video decoding apparatus 1 can be used for video transmitting and receiving. FIG. 24A is a block diagram showing the configuration of a transmitting apparatus PROD_A mounted with the hierarchical video coding apparatus 2.

As described in FIG. 24A, the transmitting apparatus PROD_A includes an encoding unit PROD_A1 that obtains coded data by coding video, a modulating unit PROD_A2 that obtains a modulated signal by modulating carrier waves using coded data obtained by the encoding unit PROD_A1, and a transmitting unit PROD_A3 that transmits the modulated signal obtained by the modulating unit PROD_A2. The aforementioned hierarchical video coding apparatus 2 is used as the encoding unit PROD_A1.

The transmitting apparatus PROD_A may further include a camera PROD_A4 that serves as a supply source of video to be input into the encoding unit PROD_A1 and takes video, a recording medium PROD_A5 that records video, an input terminal PROD_A6 for receiving video from the outside, and an image processing unit A7 that generates or processes images. In FIG. 24A, the configuration where the transmitting apparatus PROD_A is provided with all of these elements is illustrated. However, some of these may be omitted.

The recording medium PROD_A5 may record un-coded video. Alternatively, this medium may record video coded according to a coding scheme for recording that is different from the coding scheme for transmission. In the latter case, it is preferred that a decoder (not shown) that decodes coded data read from the recording medium PROD_A5 according to a coding scheme for recording intervene between the recording medium PROD_A5 and the encoding unit PROD_A1.

FIG. 24B is a block diagram showing the configuration of a receiving apparatus PROD_B mounted with the hierarchical video decoding apparatus 1. As described in FIG. 24B, the receiving apparatus PROD_B includes a receiving unit PROD_B1 that receives a modulated signal, a demodulating unit PROD_B2 that obtains a coded data by demodulating the modulated signal received by the receiving unit PROD_B1, and a decoding unit PROD_B3 that obtains video by decoding the coded data obtained by the demodulating unit PROD_B2. The aforementioned hierarchical video decoding apparatus 1 is used as the decoding unit PROD_B3.

The receiving apparatus PROD_B may further include a display PROD_B4 that serves as a supply destination of video to be output from the decoding unit PROD_B3 and displays video, and a recording medium PROD_B5 for recording video, and an output terminal PROD_B6 for outputting video to the outside. In FIG. 24B, the configuration where the receiving apparatus PROD_B is provided with all of these elements is illustrated. However, some of these may be omitted.

The recording medium PROD_B5 may be for recording un-coded video. Alternatively, this medium may record video coded according to a coding scheme for recording that is different from the coding scheme for transmission. In the latter case, it is preferred that an encoder (not shown) that codes video obtained from the decoding unit PROD_B3 according to the coding scheme for recording intervene between the decoding unit PROD_B3 and the recording medium PROD_B5.

The transmission medium that transmits the modulated signal may be wireless or wired medium. The transmission manner that transmits the modulated signal may be broadcast (here, indicating a transmission manner where the transmission destination has not preliminarily been specified). This manner may be communication (here, indicating a transmission manner where the transmission destination has been preliminarily specified). That is, the transmission of the modulated signal may be achieved by any of wireless broadcast, wired broadcast, wireless communication, and wired communication.

For example, a broadcast station for terrestrial digital broadcast (broadcast facilities and the like)/receiving unit (television receiving unit and the like) is an example of the transmitting apparatus PROD_A/receiving apparatus PROD_B for transmitting and receiving the modulated signal through wireless broadcasting. A broadcast station for cable television broadcast (broadcast facilities and the like)/receiving unit (television receiving unit and the like) is an example of the transmitting apparatus PROD_A/receiving apparatus PROD_B for transmitting and receiving the modulated signal through wired broadcasting.

A server (workstation etc.)/client (television receiving unit, personal computer, smartphone, etc.) for video on demand (VOD) service or video sharing service using the Internet is an example of the transmitting apparatus PROD_A/receiving apparatus PROD_B for transmitting and receiving the modulated signal through communication (typically, any of wireless and wired transmission media is used in local area network (LAN), and a wired transmission medium is used in wide area network (WAN)). Here, the personal computer may be any of a desktop personal computer, a laptop personal computer, and a tablet personal computer. The smartphone may be a multi-functional mobile phone.

A client of a video sharing service has not only a function of decoding the coded data downloaded from a server and displaying the data, but also a function of coding video taken by a camera and uploading the video to the server. That is, the client of the video sharing service functions as both of a transmitting apparatus PROD_A and a receiving apparatus PROD_B.

Figure 25A:
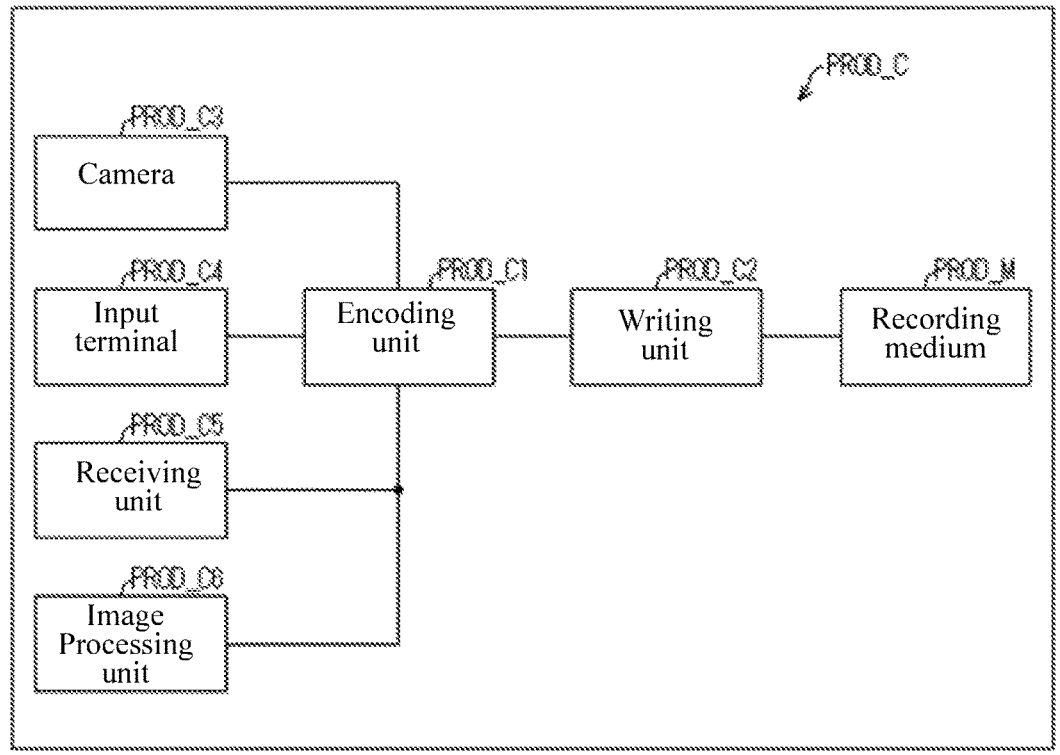
FIG. 25A and FIG. 25B diagrams are showing configurations of a recording apparatus mounted with the hierarchical video coding apparatus, and a reproducing apparatus mounted with the hierarchical video decoding apparatus.
Figure 25B:
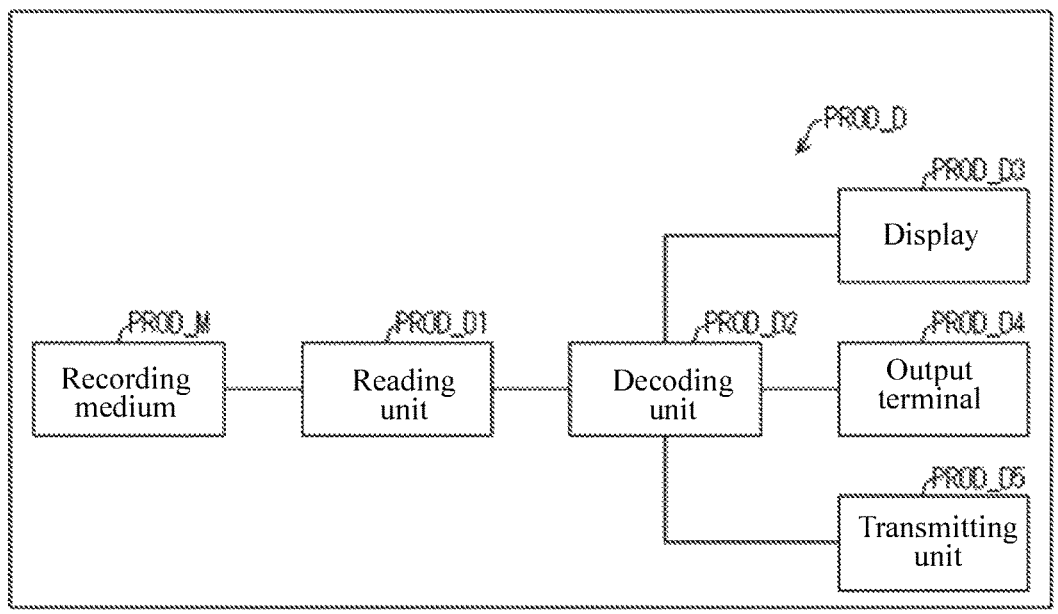

Referring to FIG. 25A and FIG. 25B, it is described that the aforementioned hierarchical video coding apparatus 2 and the hierarchical video decoding apparatus 1 can be used for video recording and reproducing. FIG. 25A is a block diagram showing the configuration of a recording apparatus PROD_C mounted with the hierarchical video coding apparatus 2.

As shown in FIG. 25A, the recording apparatus PROD_C includes an encoder PROD_C1 that obtains coded data by coding video, and a writing unit PROD_C2 that writes, in a recording medium PROD_M, the coded data obtained by the encoder PROD_C1. The aforementioned hierarchical video coding apparatus 2 is used as the encoder PROD_C1.

The recording medium PROD_M may be (1) what is embedded in the recording apparatus PROD_C, such as an hard disk drive (HDD) or an solid state drive (SSD), (2) what is connected to the recording apparatus PROD_C, such as an secure digital (SD) memory card or a universal serial bus (USB) flash memory, (3) what is inserted in a drive apparatus (not shown) embedded in the recording apparatus PROD_C, such as a digital versatile disc (DVD) or a BLU-RAY DISC.

The recording apparatus PROD_C may further include a camera PROD_C3 that serves as a supply source of video to be input into the encoder PROD_C1 and takes video, an input terminal PROD_C4 for receiving video from the outside, a receiving unit PROD_C5 for receiving video, and an image processing unit PROD_C6 that generates or processes images. In FIG. 25A, the configuration where the recording apparatus PROD_C is provided with all of these elements is illustrated. However, some of these may be omitted.

The receiving unit PROD_C5 may be for receiving un-coded video. Alternatively, this receiving unit PROD_C5 may receive coded data coded according to a coding scheme for transmitting that is different from the coding scheme for recording. In the latter case, it is preferred that a decoder for transmission (not shown) that decodes coded data coded according to a coding scheme for transmission intervene between the receiving unit PROD_C5 and the encoder PROD_C1.

Examples of such a recording apparatus PROD_C include a DVD recorder, a BLU-RAY DISC recorder, and an HDD recorder (in this case, the input terminal PROD_C4 or the receiving unit PROD_C5 serves as a main supply source of video). Alternatively, a camcorder (in this case, the camera PROD_C3 serves as a main supply source of video), a personal computer (in this case, the receiving unit PROD_C5 or the image processing unit PROD_C6 serves as a main supply source of video), a smartphone (in this case, the camera PROD_C3 or the receiving unit PROD_C5 serves as a main supply source of video) are examples of such a recording apparatus PROD_C.

FIG. 25B is a block diagram showing the configuration of a reproducing apparatus PROD_D mounted with the aforementioned hierarchical video decoding apparatus 1. As shown in FIG. 25B, the reproducing apparatus PROD_D includes a reading unit PROD_D1 that reads coded data written in the recording medium PROD_M, and a decoding unit PROD_D2 that obtains video by decoding the coded data read by the reading unit PROD_D1. The aforementioned hierarchical video decoding apparatus 1 is used as the decoding unit PROD_D2.

The recording medium PROD_M may be (1) what is embedded in the reproducing apparatus PROD_D, such as an HDD or an SSD, (2) what is connected to the reproducing apparatus PROD_D, such as an SD memory card or a USB flash memory, (3) what is inserted in a drive apparatus (not shown) embedded in the reproducing apparatus PROD_D, such as a DVD or a BLU-RAY DISC.

The reproducing apparatus PROD_D may further include a display PROD_D3 that serves as a supply destination of video to be output from the decoding unit PROD_D2 and displays video, and an output terminal PROD_D4 for outputting the video to the outside, and a transmitting unit PROD_D5 that transmits the video. In FIG. 25B, the configuration where the reproducing apparatus PROD_D is provided with all of these elements is illustrated. However, some of these may be omitted.

The transmitting unit PROD_D5 may be for transmitting un-coded video. Alternatively, this transmitting unit may transmit coded data coded according to a coding scheme for transmitting that is different from the coding scheme for recording. In the latter case, it is preferred that an encoder (not shown) that codes video according to a coding scheme for transmission intervene between the decoding unit PROD_D2 and the transmitting unit PROD_D5.

Such a reproducing apparatus PROD_D may be, for example, a DVD player, a BLU-RAY DISC player, an HDD player or the like (in this case, the output terminal PROD_D4 to which a television receiving unit or the like is connected serves as a main supply destination of video). A television receiving unit (in this case, the display PROD_D3 serves as a main supply destination of video), a digital signage (also called an electronic signage or electronic bulletin board, and the display PROD_D3 or the transmitting unit PROD_D5 serves as a main supply destination of video), a desktop personal computer (in this case, the output terminal PROD_D4 or the transmitting unit PROD_D5 serves as a main supply destination of video), a laptop or tablet personal computer (in this case, the display PROD_D3 or the transmitting unit PROD_D5 serves as a main supply destination of video), a smartphone (in this case, the display PROD_D3 or the transmitting unit PROD_D5 serves as a main supply destination of video) and the like are examples of such a reproducing apparatus PROD_D.

Finally, each of the blocks of the hierarchical video decoding apparatus 1 and the hierarchical video coding apparatus 2 may be achieved by a logic circuit formed on an integrated circuit (IC chip) in a hardware manner, or achieved in a software manner using a central processing unit (CPU).

In the latter case, each of the apparatuses includes a CPU that executes instructions of control programs that achieve functions, read-only memory (ROM) that stores the programs, random access memory (RAM) on which the program are deployed, and a storing apparatus (recording medium), such as memory, which stores the programs and various data. The object of the present disclosure can be achieved also by supplying each of the apparatuses with a recording medium that computer-readably records the program code (executable programs, intermediate code programs, or source programs) of the control programs which are of each of the apparatuses and are software for achieving the functions described above, and by allowing the computer (CPU or micro processing unit (MPU)) to read and execute the program code recorded in the recording medium.

The recording medium may be, for example, tape, such as magnetic tape or cassette tape, disks including a magnetic disk, such as floppy disk/hard disk, and an optical disk, such as compact disc read-only memory (CD-ROM)/magneto-optical (MO)/mini disc (MD)/DVD/CD recordable (CD-R), cards, such as an IC card (including a memory card)/optical card, semiconductor memories, such as mask ROM/erasable programmable read-only memory (EPROM)/electrically erasable and programmable read-only memory (EEPROM)/flash ROM, or logic circuits including programmable logic device (PLD) or field programmable gate array (FPGA).

Each of the apparatuses may be configured to be connectable to a communication network, and supply the program code via the communication network. The communication network is any element that can transmit the program code. The element is not limited. For example, the Internet, an intranet, an extranet, LAN, integrated services digital network (ISDN), value-added network (VAN), community antenna television (CATV) communication network, virtual private network, telephone network, mobile communication network, satellite communication network and the like can be used. The transmission medium constituting the communication network may be any medium that can transmit the program code. The medium is not limited to a specific configuration or type. For example, any of wired elements, such as Institute of Electrical and Electronic Engineers (IEEE) 1394, USB, power-line carrier, cable television line, telephone line, asymmetric digital subscriber line (ADSL) circuit, or any of wireless elements that include an infrared element, such as infrared data association (IrDA) or a remote control, BLUETOOTH, IEEE802.11 wireless, high data rate (HDR), near field communication (NFC), Digital Living Network Alliance (DLNA), mobile phone network, satellite circuit, or terrestrial digital network can be used. The present disclosure may be achieved in a form of a computer data signal embedded in carrier waves embodied through electronic transmission of the program code.

The present disclosure is not limited to each embodiment described above. Various changes can be made in a range represented in the claims. Any embodiment obtained by combining types of technical measures disclosed in various embodiments are also included in the technical scope of the present disclosure.

INDUSTRIAL APPLICABILITY

The present disclosure is suitably applicable to a hierarchical video decoding apparatus that decodes coded data where image data is hierarchically coded, and a hierarchical video coding apparatus that generates the coded data where image data is hierarchically coded. The present disclosure is also suitably applicable to the data structure of hierarchically coded data generated by the hierarchical video coding apparatus and referred to by the hierarchical video decoding apparatus.

DESCRIPTION OF SYMBOLS

1 . . . Hierarchical video decoding apparatus (image decoding apparatus);
11 . . . NAL demultiplexing unit;
12 . . . Parameter set decoding unit;
13 . . . Tile setting unit;
14 . . . Slice decoding unit;
141 . . . Slice header decoding unit;
142 . . . Slice position setting unit;
144 . . . CTU decoding unit;
1441 . . . Predictive residue restoring unit;
1442 . . . Predictive image generating unit;
1443 . . . CTU decoded image generating unit;
15 . . . Base decoding unit;
151 . . . Base NAL demultiplexing unit;
152 . . . Base parameter set decoding unit;
153 . . . Base tile setting unit;
154 . . . Base slice decoding unit;
156 . . . Base decoded picture management unit;
16 . . . Decoded picture management unit;
2 . . . Hierarchical video coding apparatus (image coding apparatus);
21 . . . NAL multiplexing unit;
22 . . . Parameter set encoding unit;
23 . . . Tile setting unit;
24 . . . Slice encoding unit;
241 . . . Slice header setting unit;
242 . . . Slice position setting unit;
244 . . . CTU encoding unit;
2441 . . . Predictive residue encoding unit;
2442 . . . Predictive image encoding unit;
3 . . . Hierarchical coded data transformation apparatus (coded data transformation apparatus);
32 . . . Parameter set adjusting unit; and
34 . . . NAL selector.

What is claimed is:

1. An image decoding apparatus that decodes coded data on a higher layer included in hierarchically coded data, and restores a decoded picture on the higher layer which is a target layer, comprising:
a hardware processor; and
a non-transitory memory coupled to the hardware processor,
wherein the hardware processor is configured to execute instructions in the non-transitory memory to perform the following operations:
decode a parameter set;
generate a predictive image through inter-layer prediction according to a decoded pixel of a picture on a reference layer;
decode scale adjustment information pertaining to the reference layer; and
derive a reference position on the reference layer corresponding to a pixel of the target layer, using an inter-layer scale derived based on the scale adjustment information.

2. The image decoding apparatus according to claim 1, wherein a virtual reference layer size difference is derived based on the scale adjustment information.

3. The image decoding apparatus according to claim 2, wherein a value of the inter-layer scale derived by the hardware processor is an approximate value of a ratio between a virtual reference layer correspondence region size and a virtual reference layer size, and wherein the virtual reference layer size is a sum of a reference layer picture size and the virtual reference layer size difference.

4. The image decoding apparatus according to claim 3, wherein when the scale adjustment information is not included in the parameter set, a value of the scale adjustment information is set by the hardware processor such that the virtual reference layer size and the reference layer picture size are coincided with each other.

5. The image decoding apparatus according to claim 1, wherein the decoded picture on the higher layer have a higher resolution than a decoded picture on the reference layer.

6. The image decoding apparatus according to claim 1, wherein the decoded picture on the higher layer have a higher frame rate than a decoded picture on the reference layer.

7. The image decoding apparatus according to claim 1, wherein the decoded picture on the higher layer have a higher image quality than a decoded picture on the reference layer.

8. The image decoding apparatus according to claim 1, wherein the reference position is represented in an accuracy that is less than a unit of pixels on the reference layer.

9. The image decoding apparatus according to claim 1, wherein the hardware processor is further configured to execute an interpolation filter process to generate a predictive pixel value of the pixel of the target layer, by receiving the reference position as an input.

10. An image coding apparatus generating coded data on a higher layer from an input image, comprising:
a hardware processor; and
a non-transitory memory coupled to the hardware processor, wherein the hardware processor is configured to execute instructions in the non-transitory memory to perform the following operations:
  decode a parameter set;
  generate a predictive image through inter-layer prediction according to a decoded pixel of a picture on a reference layer;
  encode scale adjustment information;
  derive a reference position corresponding to a decoded pixel of the target layer, using an inter-layer scale value derived from the scale adjustment information; and
  derive a virtual reference layer size difference based on the scale adjustment information.

11. The image coding apparatus according to claim 10, wherein the value of the inter-layer scale derived by the hardware processor is an approximate value of a ratio between a virtual reference layer correspondence region size and a virtual reference layer size, and wherein the virtual reference layer size is a sum of a reference layer picture size and the virtual reference layer size difference.

12. The image coding apparatus according to claim 11, wherein when the scale adjustment information is not included in the parameter set, a value of the scale adjustment information is set by the hardware processor such that the virtual reference layer size and the reference layer picture size are coincided with each other.

13. The image coding apparatus according to claim 10, wherein a decoded picture on the higher layer have a higher resolution than the decoded picture on the reference layer.

14. The image coding apparatus according to claim 10, wherein a decoded picture on the higher layer have a higher frame rate than the decoded picture on the reference layer.

15. The image coding apparatus according to claim 10, wherein a decoded picture on the higher layer have a higher image quality than the decoded picture on the reference layer.

16. The image coding apparatus according to claim 10, wherein the reference position is represented in an accuracy that is less than a unit of pixels on the reference layer.

17. The image coding apparatus according to claim 10, wherein the hardware processor is further configured to execute an interpolation filter process to generate a predictive pixel value of the pixel of the target layer by receiving the reference position as an input.

* * * * *